US012267906B2

(12) United States Patent
Deenoo et al.

(10) Patent No.: US 12,267,906 B2
(45) Date of Patent: *Apr. 1, 2025

(54) LIGHT CONNECTIVITY AND AUTONOMOUS MOBILITY

(71) Applicant: InterDigital Patent Holdings, Inc., Wilmington, DE (US)

(72) Inventors: Yugeswar Deenoo, Chalfont, PA (US); Ghyslain Pelletier, Montreal (CA); Ping Hsuan Tan, Montreal (CA); Martino M. Freda, Laval (CA)

(73) Assignee: InterDigital Patent Holdings Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/779,405

(22) Filed: Jul. 22, 2024

(65) Prior Publication Data

US 2024/0381478 A1    Nov. 14, 2024

Related U.S. Application Data

(63) Continuation of application No. 18/215,522, filed on Jun. 28, 2023, which is a continuation of application
(Continued)

(51) Int. Cl.
*H04W 68/02*    (2009.01)
*H04W 36/08*    (2009.01)
(Continued)

(52) U.S. Cl.
CPC .......... *H04W 76/27* (2018.02); *H04W 68/02* (2013.01); *H04W 76/11* (2018.02); *H04W 76/28* (2018.02);
(Continued)

(58) Field of Classification Search
CPC ..... H04W 76/27; H04W 68/02; H04W 76/11; H04W 76/28; H04W 36/087; H04W 36/302; H04W 72/23
See application file for complete search history.

(56) References Cited

U.S. PATENT DOCUMENTS

2012/0208545 A1*  8/2012 Yang ................... H04W 74/002
                                                       455/450
2012/0275380 A1   11/2012 Chin et al.
(Continued)

FOREIGN PATENT DOCUMENTS

CN    102204378 A    9/2011
CN    103380652 A    10/2013
(Continued)

OTHER PUBLICATIONS

"Metis II, Mobile and wireless communications Enablers for the Twenty-twenty Information Society-II, Deliverable D6. 1 Draft Asynchronous Control Functions and Overall Control Plane Design, Version v1.0, Jun. 30, 2016" (hereinafter as Metis) (Year: 2016).*
(Continued)

*Primary Examiner* — Walli Z Butt
*Assistant Examiner* — Thad N Defauw
(74) *Attorney, Agent, or Firm* — Flaster Greenberg, P.C.

(57) ABSTRACT

Light and/or Inactive state connectivity and/or autonomous mobility techniques are contemplated. A WTRU may, for example, have an inactive/idle mode, a light connected/loosely connected/Inactive mode and/or a connected/fully connected/Active mode. A WTRU in light connected mode may have a WTRU context stored in a RAN. A WTRU may perform an area monitoring procedure while in light connected state. A WTRU may engage in autonomous mobility during light connectivity. A WTRU may move within a logical area (e.g., a RAN paging area), perhaps without notifying the network. The WTRU may provide notice when
(Continued)

it has moved outside a logical area (e.g., update RAN paging area). Mobility in light connected state may be network controlled (e.g., to enable handover when data transfer may be allowed and/or ongoing). A WTRU may be reachable during a light connectivity state. A WTRU may engage in autonomous mobility during light connectivity and/or an Inactive state.

18 Claims, 7 Drawing Sheets

Related U.S. Application Data

No. 16/324,025, filed as application No. PCT/US2017/046001 on Aug. 9, 2017, now Pat. No. 11,723,106.

(60) Provisional application No. 62/475,117, filed on Mar. 22, 2017, provisional application No. 62/453,128, filed on Feb. 1, 2017, provisional application No. 62/442,109, filed on Jan. 4, 2017, provisional application No. 62/400,837, filed on Sep. 28, 2016, provisional application No. 62/372,973, filed on Aug. 10, 2016.

(51) Int. Cl.
*H04W 36/30* (2009.01)
*H04W 76/11* (2018.01)
*H04W 76/27* (2018.01)
*H04W 76/28* (2018.01)
*H04W 72/23* (2023.01)

(52) U.S. Cl.
CPC ........ *H04W 36/087* (2023.05); *H04W 36/302* (2023.05); *H04W 72/23* (2023.01)

(56) References Cited

U.S. PATENT DOCUMENTS

| | | | |
|---|---|---|---|
| 2014/0022978 A1* | 1/2014 | Chen | H04W 72/542 370/312 |
| 2016/0005704 A1 | 1/2016 | Tu et al. | |
| 2016/0057044 A1 | 2/2016 | Koc et al. | |
| 2017/0338907 A1* | 11/2017 | Atungsiri | H04L 1/04 |

FOREIGN PATENT DOCUMENTS

| | | | |
|---|---|---|---|
| CN | 105103606 A | 11/2015 | |
| WO | WO 2011/056254 A1 | 5/2011 | |
| WO | WO 2014/182338 A1 | 11/2014 | |
| WO | WO-2015085273 A1 * | 6/2015 | ........... H04L 5/0048 |

OTHER PUBLICATIONS

Third Generation Partnership Project (3GPP), "Overall Description", Technical Specification Group Radio Access Network; Evolved Universal Terrestrial Radio Access (E-UTRA) and Evolved Universal Terrestrial Radio Access Network (E-UTRAN), Stage 2, Release 13, 3GPP TS 36.300 V13.3.0, Mar. 2016, 295 pages.

Mikko Saily et al, "Mobile and wireless communications Enablers for the Twenty-twenty Information Society-II, Deliverable D6.1 Draft Asynchronous Control Functions and Overall Control Plane Design", Jun. 30, 2016, 120 pages.

3rd Generation Partnership Project; Technical Specification Group Radio Access Network; Evolved Universal Terrestrial Radio Access (E-UTRA); Physical layer procedures (Release 13), 3GPP TS 36.213 V13.2.0, Jun. 2016, 381 pages.

3GPP TS 25.331 V14.1.0 (Dec. 2016) 3rd Generation Partnership Project; Technical Specification Group Radio Access Network; Radio Resource Control (RRC); Protocol specification (Release 14) 2288 pages.

LTE; Evolved Universal Terrestrial Radio Access (E-UTRA) and Evolved Universal Terrestrial Radio Access Network E-UTRAN); Overall description; Stage 2 (3GPP TS 36.300 version 13.3.0 Release 13), ETSI TS 136 300 V13.3.0, Apr. 2016, 300 pages.

3rd Generation Partnership Project; Technical Specification Group Radio Access Network; Evolved Universal Terrestrial Radio Access (E-UTRA); Radio Resource Control (RRC); Protocol specification (Release 13), 3GPP TS 36.331 V13.1.0, Mar. 2016, 9 pages.

Ericsson, State transition and small data transmissions for inactive UEs, 3GPP Tdoc R2-165538; 3GPP TSG-RAN WG2 #95; Gothenburg, Sweden, Aug. 22-26, 2016, 5 pages.

Melis, "Draft Asynchronous Control Functions and Overall Control Plane Design", Jun. 30, 2016, 120 pages.

Huawei El Al, Data transmission in low activity state, 3GPP Tdoc R2-166284; 3GPP TSG-RAN WG2 #95bis; Kaohsiung, Taiwan, Oct. 10-14, 2016, 11 pages.

3GPP TS 25.321 V13.2.0 (Mar. 2016), 3rd Generation Partnership Project; Technical Specification Group Radio Access Network; Medium Access Control (MAC) protocol specification (Release 13), Mar. 21, 2016, 213 pages.

3GPP TS 25.321 V14.0.0 (Dec. 2016), 3rd Generation Technical Specification; Release 14, Dec. 22, 2016, 216 pages.

3GPP TS 25.331 V13.3.0 (Jun. 2016) 3rd Generation Partnership Project; Technical Specification Group Radio Resource Control (RRC); Protocol Specification (Release 13), 2270 pages.

3rd Generation Partnership Project; Technical Specification Group Radio Access Network; Evolved Universal Terrestrial Radio Access (E-UTRA); Medium Access Control (MAC) protocol specification (Release 13), 3GPP TS 36.321 V13.1.0, Mar. 2016, 85 pages.

* cited by examiner

LIGHT CONNECTIVITY AND AUTONOMOUS MOBILITY

CROSS-REFERENCE TO RELATED APPLICATIONS

This application is a continuation of U.S. Non-Provisional patent application Ser. No. 18/215,522, filed Jun. 28, 2023, which is a continuation of U.S. Non-Provisional patent application Ser. No. 16/324,025, filed Feb. 7, 2019, which issued as U.S. Pat. No. 11,723,106 on Aug. 8, 2023, which is the 371 National Stage of International Application No. PCT/US2017/046001, filed Aug. 9, 2017, which claims the benefit of U.S. Provisional Patent Application No. 62/475,117, filed Mar. 22, 2017, U.S. Provisional Patent Application No. 62/453,128, filed Feb. 1, 2017, U.S. Provisional Patent Application No. 62/442,109, filed Jan. 4, 2017, U.S. Provisional Patent Application No. 62/400,837, filed Sep. 28, 2016, and U.S. Provisional Patent Application No. 62/372,973, filed Aug. 10, 2016, the contents of all of which being hereby incorporated by reference as if fully set-forth herein in their respective entirety, for all purposes.

BACKGROUND

Mobile communications are in continuous evolution and are already at the doorstep of their fifth incarnation—5G. As with previous generations, new use cases largely contributed in setting the requirements for the new system. It is expected that the 5G air interface may enable improved broadband performance (IBB), industrial control and communications (ICC), vehicular applications (V2X), and/or massive machine-type communications (mMTC).

Deployments of a 5G network may include stand-alone systems, and/or may include a phased approach, e.g., in combination with existing deployments and/or with existing technologies (such as LTE and/or an evolution thereof). Combinations with existing technologies may involve radio access network components and/or core network components.

SUMMARY

Systems, methods, and/or instrumentalities are disclosed for light connectivity and/or autonomous mobility. A wireless transmit/receive unit (WTRU) may, for example, have an inactive/idle mode, a light connected/loosely connected/Inactive mode and/or a connected/fully connected/Active mode. A WTRU in light connected mode may have a WTRU context stored in a Radio Access Network (RAN). A WTRU may perform an area monitoring procedure while in light connected state. As described herein, a light connected state (and/or lightly connected state) may correspond to an INACTIVE state. A WTRU may engage in autonomous mobility during light connectivity and/or in an INACTIVE state. A WTRU may move within a logical area (e.g., a RAN paging area) without notifying the network, but may provide notice when it has moved outside a logical area (e.g., update RAN paging area). Mobility in light connected state may be network controlled (e.g., to enable handover when data transfer may be allowed and/or ongoing). A WTRU may be reachable during a light connectivity state. A WTRU may engage in autonomous mobility during light connectivity. A WTRU may perform data transfer without leaving light connected state. A WTRU may autonomously transition to a light connectivity state. A network may signal a WTRU to transition a light connectivity state. A transition from inactive to light connectivity may reduce signaling overhead and/or latency/delays that may otherwise occur before a WTRU may perform a first transmission in active mode. A WTRU may transition to connected mode with low latency and/or low overhead.

A WTRU may be in communication with a wireless communication network. The WTRU may comprise a memory. The WTRU may comprise a processor. The processor may be configured to determine to transition to a Radio Resource Control (RRC) INACTIVE state based on a first condition. The processor may be configured to transition to the RRC INACTIVE state upon an occurrence of the first condition. The processor may be configured to determine that uplink (UL) data is to be sent to a node of the wireless communication network. The processor may be configured to determine to transmit the UL data in the RRC INACTIVE state and/or a RRC CONNECTED state based on a second condition being satisfied or unsatisfied. The processor may be configured to determine to remain in the INACTIVE state and send the UL data based on the second condition being satisfied. The processor may be configured to transition to the RRC CONNECTED state and send the UL data based on the second condition being unsatisfied. The WTRU may comprise a transmitter. The transmitter may be configured to transmit the UL data in the RRC INACTIVE state and/or the RRC CONNECTED state to the node of the wireless communication network.

A WTRU in a light connected mode may perform a data transfer without entering an active mode, for example, using one or more initial access messages between the WTRU and the network before the WTRU enters the active mode.

A WTRU may transition to a light connected state, for example, based on volume of data transmission, inactivity, type of service, a configured behavior, received downlink (DL) paging and/or a default initialization state.

WTRU actions in a light connected state may include, for example, activation of a light connectivity configuration, WTRU identity associated with light connected state, handling radio resources and/or enabling functions based on location relative to a logical area.

WTRU reachability for a light connected stated may include, for example, realizing a RAN paging area (PA), triggers to perform a RAN PA update and/or interaction between RAN paging area and tracking area.

Low-latency transition to a connected mode from light connected state may include, for example, non-abstract syntax notation (ASN) signaling, dedicated resources for fast reconnection, piggybacking reconnection with data and/or on-demand system information.

Reconnection failures may be handled, for example, using a pre-existing context in the RAN and/or core network.

Light connectivity state may be exited based on WTRU-based rules, such as elapsed time, inactivity, WTRU location, mobility state, arrival of unsupported services (e.g., new data becoming available for a service that is not supported in the light connectivity state, or the establishment thereof), RAN paging failure and/or unsupported cell. WTRU state mismatch with the core network control function may be handled during load balancing.

WTRU measurement procedures for light connectivity state, may include, for example, using reference signals different from those for connected mode measurements, evaluating a quality of a RAN paging channel and/or power consumption reduction, such as restriction of neighbor measurements in light connected state.

WTRU autonomous mobility may include, for example, triggering events, prioritization rules, timing of paging reception, WTRU configuration handling based on association between a received configuration and an edge control function, implicit information based on a presence of a reference signal, broadcast information and/or WTRU location. Procedures are provided for mobility and/or context reuse for inter-radio access technology (inter-RAT) light connectivity.

WTRU context handling (e.g., layer 2 and/or layer 2 configuration) in light connected state may be a function of, for example, location, deployment, active services/slice/flow, validity time, and/or data activity. There may be a per-transaction persistence of a layer 2 state.

Data transfer during light connectivity may include, for example, restrictions on data volume, validity of configured resources, type of service, direction of transfer, type of protocol data unit (PDU) and/or location.

RAN paging message handling may include, for example, determination of RAN paging channel resources, a relation between RAN and core network (CN) paging and/or WTRU identity in paging messages.

WTRU data transmission in light connected state may use initial access messages, which may include, for example, data transmission in a random access resource, data transmission in a contention based resource and/or data transmission in message 3 (MSG3).

Inter-RAT state transition may be provided. WTRU behavior may be affected during an inactive state, for example, by providing for WTRU behavior during an extended scheduling period in an inactive state.

A WTRU may determine that one or more security parameters associated with a key derivation are invalid, insufficient, and/or outdated. The WTRU may initiate, based on the determination that the one or more security parameters are invalid, insufficient, and/or outdated, a recovery procedure to enable a security level.

DETAILED DESCRIPTION

A detailed description of illustrative embodiments will now be described with reference to the various Figures. Although this description provides a detailed example of possible implementations, it should be noted that the details are intended to be examples and in no way limit the scope of the application.

Figure 1A:
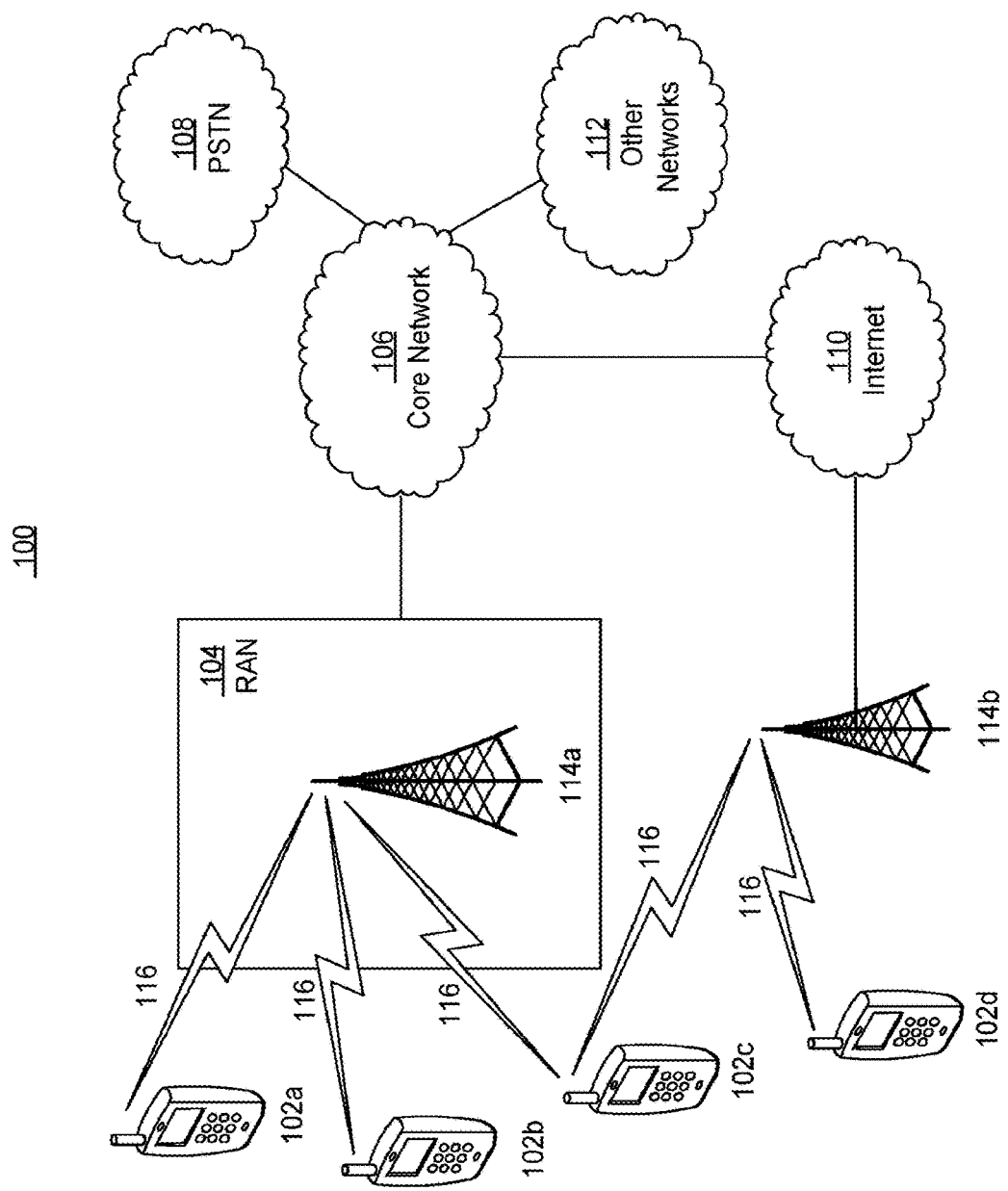
FIG. 1A is a system diagram illustrating an example communications system in which one or more disclosed devices, systems, and/or techniques may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc.

The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VOIP) services to one or more of the WTRUs 102a, 102b, 102c, 102d. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
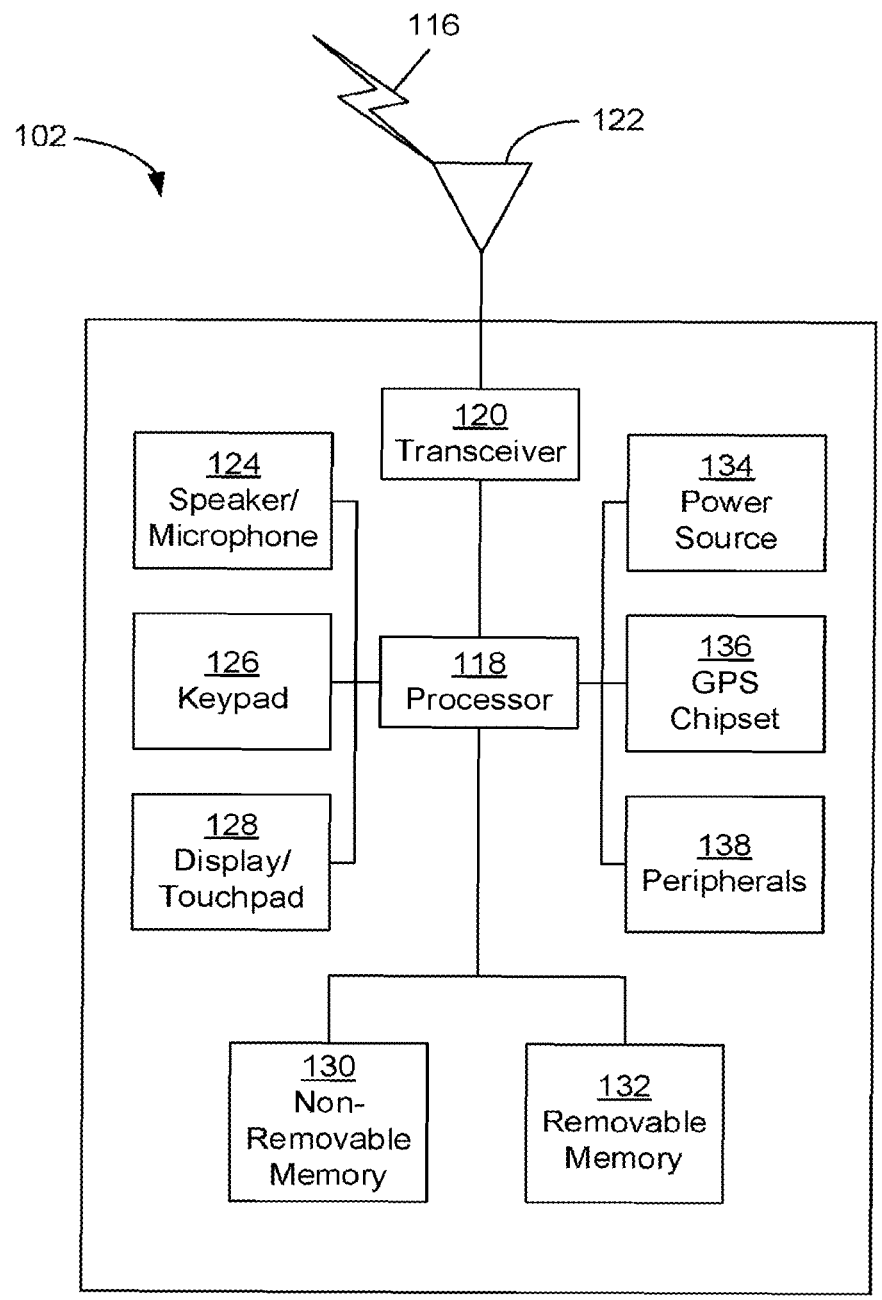
FIG. 1B is a system diagram illustrating an example wireless transmit/receive unit (WTRU) that may be used within the communications system illustrated in FIG. 1A according to one or more devices, systems, processes, and/or techniques described herein.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
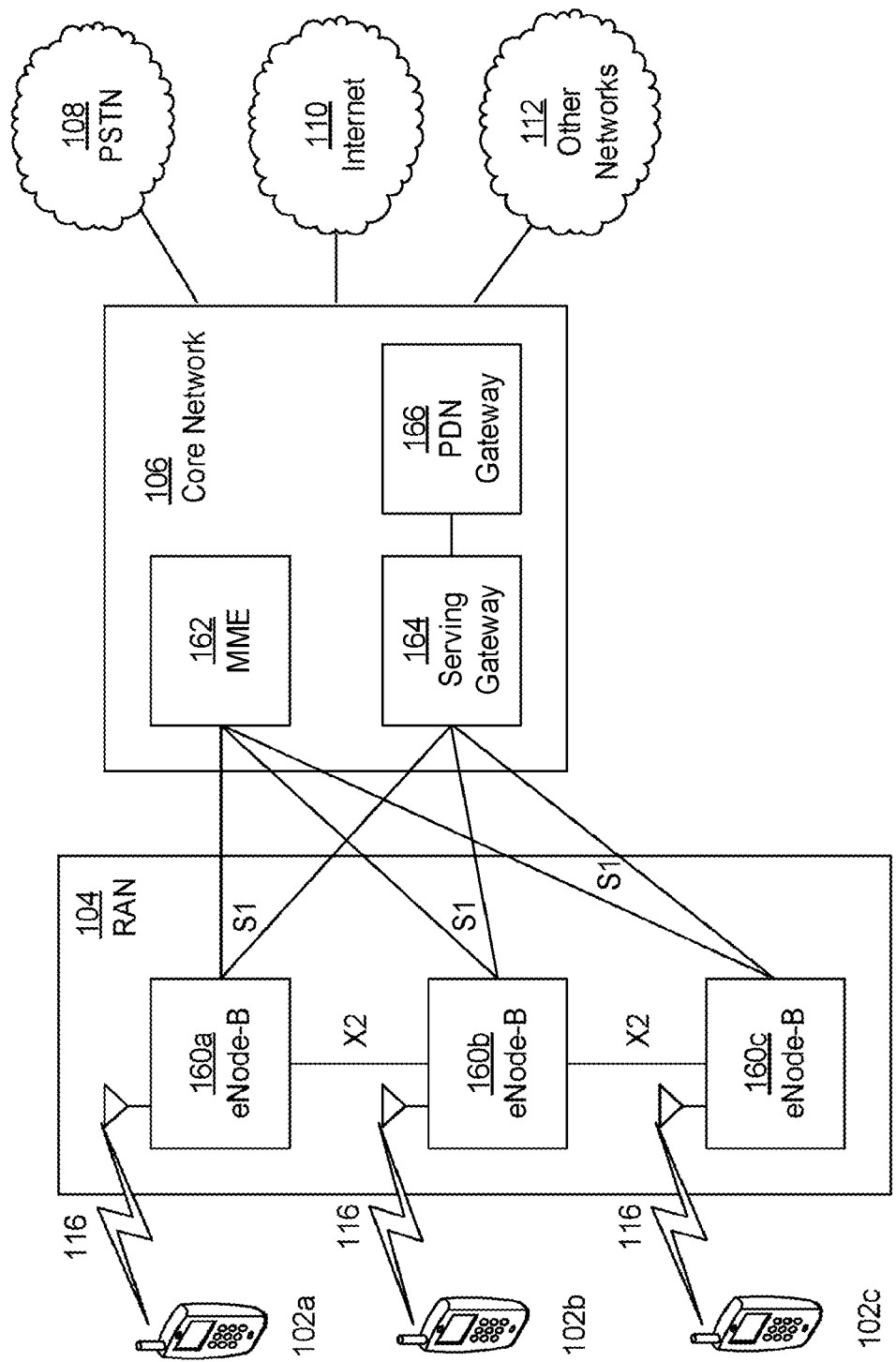
FIG. 1C is a system diagram illustrating an example radio access network (RAN) and an example core network (CN) that may be used within the communications system illustrated in FIG. 1A according to one or more devices, systems, processes, and/or techniques described herein.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network. In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHZ, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHZ, 2 MHZ, 4 MHZ, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHZ, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHZ to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
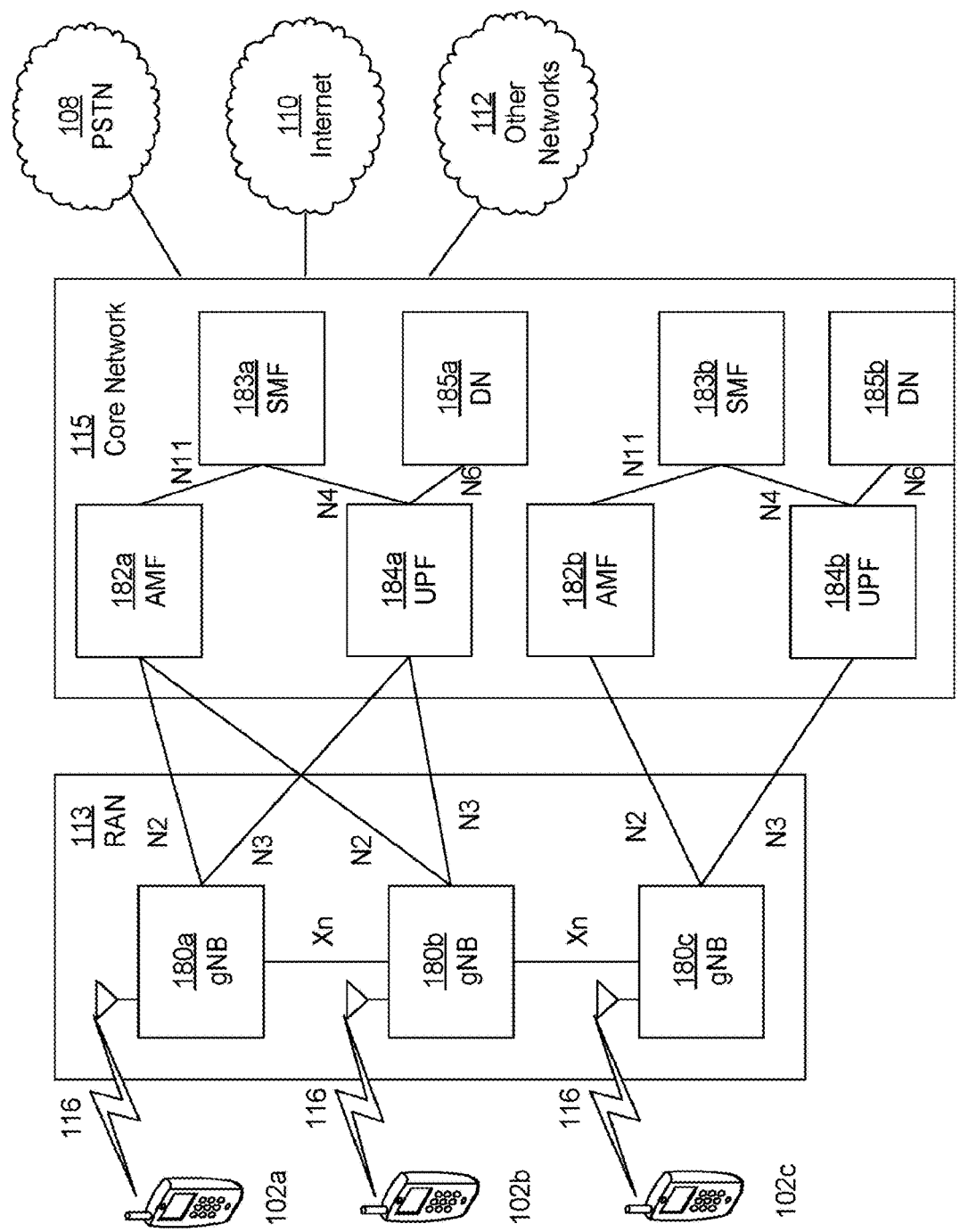
FIG. 1D is a system diagram illustrating a further example RAN and a further example CN that may be used within the communications system illustrated in FIG. 1A according to one or more devices, systems, processes, and/or techniques described herein.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of Figures IA-ID, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

An air interface, e.g., for a new radio (NR) access technology in a 5G system, may support a variety of use cases, such as improved broadband performance (IBB), Industrial control and communications (ICC) and/or vehicular applications (V2X) and/or Massive Machine-Type Communications (mMTC). Use cases may have associated support in an air interface (e.g., 5G air interface).

An air interface may support, for example, ultra-low transmission latency (LLC), ultra-reliable transmission (URC) and/or MTC operation (including narrowband operation).

Support for ultra-low transmission latency (LLC) may comprise, for example, air interface latency such as 1 ms RTT and/or TTIs between 100 us to 250 us. Support may be provided for ultra-low access latency (e.g., time from initial system access until the completion of the transmission of the first user plane data unit). End-to-end (e2e) latency less than 10 ms may be supported, for example, for IC and/or V2X.

Support for ultra-reliable transmission (URC) may comprise, for example, improved transmission reliability, such as 99.999% transmission success and/or service availability. Support may be provided for mobility speed in the range of 0-500 km/h. Packet Loss Ratio of less than $10e^{-6}$ may be supported, for example, for IC and/or V2X.

Support for MTC operation may comprise, for example, air interface support for narrowband operation (e.g., using less than 200 KHz), extended battery life (e.g., up to 15 years of autonomy) and/or minimal communication overhead for small and/or infrequent data transmissions (e.g., low data rate in the range of 1-100 kbps with access latency of seconds to hours).

A 5gFLEX/New Radio (NR) system may be implemented with OFDM and/or other waveforms for uplink and/or downlink. Description of examples herein may be non-limiting. Examples may be applicable and/or adaptable to other waveforms and/or wireless technologies.

OFDM may be used as a signal format for data transmissions, e.g., in LTE and/or IEEE 802.11. OFDM may efficiently divide spectrum into multiple parallel orthogonal subbands. A (e.g., one or more, or each) subcarrier may be shaped using a rectangular window in the time domain, which may lead to sinc-shaped subcarriers in the frequency domain. OFDMA may rely on (e.g., perfect) frequency synchronization and/or tight management of uplink timing alignment within the duration of the cyclic prefix, for example, to maintain orthogonality between signals and/or to minimize intercarrier interference. Tight synchronization may be difficult, for example, in a system where a WTRU may be simultaneously connected to multiple access points.

Additional power reduction may be applied to uplink transmissions, for example, to comply with spectral emission requirements for adjacent bands. Fragmented spectrum may be aggregated for WTRU transmissions.

OFDM (CP-OFDM) performance may be improved, for example, by more stringent RF requirements for implementations, such as operation using a large amount of contiguous spectrum that might not require/use aggregation. A CP-based OFDM transmission scheme may provide a downlink physical layer for 5G similar to a 4G system with modifications to pilot signal density and/or location.

5gFLEX radio access may be characterized by a very high degree of spectrum flexibility that enables deployment in different frequency bands with different characteristics, which may include different duplex arrangements, different and/or variable sizes of available spectrum, such as contiguous and/or non-contiguous spectrum allocations in the same or different bands. 5gFLEX radio access may support variable timing aspects, such as support for multiple TTI lengths and/or asynchronous transmissions.

Multiple duplexing schemes (e.g., TDD, FDD) may be supported. Supplemental downlink operation may be supported, e.g., for FDD operation, for example, using spectrum aggregation. FDD operation may support full-duplex FDD and/or half-duplex FDD operation. DL/UL allocation may be dynamic (e.g., might not be based on a fixed DL/UL frame configuration), e.g., for TDD operation. The length of a DL and/or a UL transmission interval may be set per transmission opportunity.

A WTRU may be configured to receive and/or detect one or more system signatures. A system signature may include a signal structure using a sequence. A signal may be similar to a synchronization signal (SS), e.g., similar to LTE Primary Synchronization Signal (PSS) and/or Secondary Synchronization Signal (SSS). A signature may be specific to (e.g., may uniquely identify) a particular node (and/or Transmission Reception Point (TRP)) within a given area and/or it may be common to a plurality of nodes (and/or TRPs) within an area, which aspect might not be known and/or relevant to a WTRU. A WTRU may determine and/or detect a system signature sequence and/or may further determine one or more parameters associated with the system. For example, a WTRU may further derive an index therefrom and/or may use the index to retrieve associated parameters, e.g., within a table, such as an access table. For example, a WTRU may use received power associated with a signature for open-loop power control, e.g., to set an initial transmission power when a WTRU determines that it may access (and/or transmit) using applicable resources of the system. For example, a WTRU may use the timing of a received signature sequence, e.g., to set the timing of a transmission (e.g., a preamble on a PRACH resource) when the WTRU determines that it may access (and/or transmit) using applicable resources of the system.

A system signature may include any type of signal received by a WTRU for one or more purposes described herein.

A WTRU may be configured with a list of one or more entries. A list may be referred to as an access table. A list may be indexed, e.g., where an (e.g., one or more, or each) entry may be associated with a system signature and/or to a sequence thereof. An access table may provide initial access parameters for one or more areas. An (e.g., one or more, or each) entry may provide one or more parameters that may be useful for performing an initial access to the system. Parameters may include at least one of a set of one or more random access parameters (e.g., including applicable physical layer resources, such as PRACH resources) in time and/or frequency, initial power level and/or physical layer resources for reception of a response. Parameters may (e.g., further) include access restrictions (e.g., PLMN identity and/or CSG information). Parameters may (e.g., further) include routing-related information, such as one or more applicable routing areas. An entry may be associated with (and/or indexed by) a system signature. An such entry may be common to a plurality of nodes (and/or TRPs). A WTRU may receive an access table, for example, via a transmission using dedicated resources (e.g., by RRC configuration) and/or by a transmission using broadcast resources. In the latter case, the periodicity of the transmission of an access table may be relatively long (e.g., up to 10240 ms), which may be longer than the periodicity of the transmission of a signature (e.g., in the range of 100 ms).

An access table may include any type of system information received by a WTRU for one or more purposes described herein.

A radio access network (RAN) slice may include one or more, or all, radio access network functions and/or transport network functions and/or resources, e.g., radio resources and/or backhaul/fronthaul resources along with core network functions/resources that may be used and/or required to provide end-to-end services to a user. Network functions may, for example, be virtualized on a general-purpose processor, run as network functions on specialized hardware and/or split between specialized hardware and general purpose hardware. A PLMN may include one or more network slices. A slice may be equivalent to an operator's single, common and/or general purpose network. A RAN slice may include one or more SOMs that may be optimized to support various services that the RAN slice may have to offer.

For example, WTRUs served within a slice may have, for example, one or more of the following aspects in common: services and/or QoE requirements (e.g., ULLRC, cMBB, MMTC); WTRU categories (e.g., CAT 0 to M and/or beyond, additional categories may be defined for >6 GHz to differentiate beamforming capability); coverage requirements (e.g., normal coverage, enhanced coverage); one or more PLMN/Operators; support for specific Uu interface (e.g., LTE, LTE-Evo, 5G below 6 Ghz, 5G above 6 Ghz, Unlicensed); and/or served by same core network slice. The terms "RAN slice" and "slice" may be used interchangeably.

Functions and/or components supporting an NR system may be logically grouped, for example, in terms of an Edge control/Access Plane (AP), a Central Control Plane (CCP) and/or Central User Plane (CUP). Logical grouping may enable different components and/or functions of the system to be isolated from each other. Isolation may enable components and/or functions to be controlled, configured, modified and/or operated separately from each other. Separation may be applied for components and/or functions associated with a specific WTRU, per TRP/NR-eNB, per TRPG, per TRPGs, per group of NR-eNBs, per LCH (and/or equivalent), per slice and/or the like. Further separation between centralized and access-related grouping may enable coordination between different instances of a function (e.g., system information provisioning, bearer configuration and/or equivalent) and/or between different instances of different functions (e.g., core network connectivity and/or user plane/bearer instances). An edge control function may be associated with a scheduler instance. A WTRU may be configured to associate a specific signaling bearer and/or equivalent (e.g., a transport path/method) for control of a MAC entity with the concerned MAC entity. A function may use the transport services of MAC protocols (e.g., as MAC Control Elements) and/or similar.

Central Control Functions (e.g., RAN central control functions) may include functions, protocols and/or context that may be WTRU specific and/or applicable to one or more TRPs/edge control functions. A central control plane may be considered to be an anchor control function that may terminate the control interface towards the core network (e.g., through the configuration/setup of routing paths and/or transport paths, which may, for example, be based on tuples configured for the WTRU). A central control function may include control functions related to selection of core network slice, CN-RAN interfaces, QoS management, security (e.g., master key management and/or key derivation, which may be per group of TRPs/NR-eNBs), WTRU capability management and/or WTRU reachability within RAN.

Next generation air interfaces (e.g., including further evolution of LTE Advanced Pro and/or a New Radio (NR)) may support a wide range of use cases with varying service requirements (e.g., low overhead and/or low data rate power efficient services (mMTC), ultra-reliable low latency services (URLLC) and/or high data rate mobile broadband services (eMBB)) for diverse WTRU capabilities (e.g., low power and/or low bandwidth WTRUs, WTRUs capable of very wide bandwidth (e.g., 80 Mhz), WTRU support for high frequencies (e.g., >6 Ghz), etc.) under various mobility scenarios (e.g., stationary/fixed, high speed trains, etc.) using an architecture that may be flexible enough to adapt to diverse deployment scenarios (e.g., centralized, virtualized, distributed over ideal/non-ideal backhaul, etc.).

Traffic models associated with next generation use cases may be expected to be short and/or long bursts of data with varying inter-arrival times for data packets. A waiting period between consecutive data packets may be referred to as an inactive period. Signaling associated with network controlled mobility (e.g., measurement and/or handover) may be undesirable, for example, when inactive devices may be allowed to stay in connected mode. Signaling overhead associated with state transition on an air interface and/or RAN-core interface may be undesirable, for example, when an inactive device may be pushed to idle mode.

Low latency transition time between inactive and active states (e.g., in addition to signaling reduction) may be implemented to meet control plane latency requirements of next generation systems.

One or more procedures are described for light connectivity and/or WTRU autonomous mobility. A WTRU performing a state transition may include the WTRU initiating a procedure that may lead to a change of state. For example, a WTRU performing a state transition to the CONNECTED state may include the WTRU initiating a RRC procedure that may establish a new RRC connection and/or that may re-establish, resume, and/or reconnect an RRC connection (e.g., using an existing context and/or configuration). A state transition may be autonomously initiated, event-triggered, and/or initiated from the reception of signaling from the network, for example, based on one or more aspects of the WTRU's configuration.

Procedures described herein may be applicable to different arrangements of physical layer resources, different WTRU configurations, different groupings of applicable functions and/or other configurations and/or logical functional grouping without restriction to examples described herein.

Tracking areas may be modeled. A set of resources may be defined in support of WTRU-autonomous mobility. The term of "tracking area" may refer to a logical group of transmission points (e.g., TRPs, eNBs, gNBs, and/or the like), logical group and/or arrangement of physical resources and/or cells. For example, a tracking area may be associated with a (e.g., single) control plane function and/or entity from the network's perspective. For example, a WTRU may be tracked by the network at a granularity of a tracking area. For example, a tracking area may vary depending on the WTRU's RRC state. For example, a logical group may differ for a WTRU in IDLE mode (e.g., MME-based tracking), in lightly connected state (e.g., RAN-based tracking) and/or in CONNECTED mode (e.g., eNB-based management).

Arrangements of physical resources may be modeled. A set of resources may be identified, e.g., to support different WTRU behavior. The term "layer" may refer to an arrangement of (e.g., physical layer) resources associated with a radio access network. An arrangement of resources may be associated with one or more reference signal(s) and/or reference signal processes such as those that may be used to determine an identity of such arrangement of resources.

For example, a layer may comprise one or more reference signal(s) (e.g., received with transmit power above a certain threshold), one or more cell(s), one or more beam(s) and/or beam process(es). These may be associated with one or more eNB(s), gNB(s), TRP(s), TRGP(s), signature(s), and/or carrier(s). Such terms may be used interchangeably and/or equivalently herein unless stated otherwise.

A WTRU may be configured to operate using one or more layer(s). A single layer example may be a WTRU configured to operate using resources associated with a macro cell. A multi-layer example may be a WTRU configured to operate using resources of a second layer associated with small/micro cells.

WTRU states may be modeled. A set of procedures and/or their respective instances may be logically grouped and/or referred to as such. The terms 'state' and 'mode' may be used interchangeably. Procedures described herein may be applicable independent of state. A procedure may be applicable for more than one state. A procedure described herein may be applicable regardless whether states are actually defined.

The term "WTRU state" may be used to describe what specific set(s) of functions and/or specific set of configuration aspects may be enabled (or not) at any given time.

A WTRU state may be realized, for example, as one or more of the following: an RRC state for light connectivity; an RRC state combined with MAC state for a set of resources; and/or a behavior that may be independent of RRC state.

An RRC state for light connectivity may be a state of a protocol, such as a status of an L3/RRC protocol and/or may have configuration aspects that may determine the WTRU actions for an (e.g., any) event that happens at a given time.

An RRC state combined with MAC state for a set of resources may be a combination of protocol states (e.g., a combination of RRC state and MAC state). For example, an RRC state may be a function of WTRU context availability in a network. An RRC state may reflect the status of WTRU connectivity with a central control function. For example, a MAC state may be a function of WTRU transmission status (e.g., a synchronization aspect, the availability of specific resources and/or the like). A MAC state may reflect the status of WTRU connectivity with an edge control function.

A behavior that may be independent of RRC state may be a configuration aspect. For example, a network may configure one or more rules that may determine a number of WTRU actions (e.g., in a specific scenario). Actions may be related to WTRU transition(s) between idle operation, light connected operation and/or fully connected operation. Transition(s) may be performed as a result of an RRC procedure, such as a reconfiguration.

A WTRU may operate, for example, according to one or more of the following states and/or similar: idle mode; light connected/loosely connected/Inactive mode; and/or connected/fully connected/Active mode.

A WTRU in idle mode (e.g., from the network's perspective) might not have a context with the radio access network. A WTRU might not have a context at the edge control function and/or the central control function, for example, in a distributed architecture. A WTRU may monitor paging from the core network at a well-defined DRX cycle. A WTRU may perform measurements and/or autonomous mobility. A WTRU may acquire, store and/or apply system information that may be valid for at least idle mode operations.

A WTRU in light connected/loosely connected/Inactive mode and/or state (e.g., from the network's perspective) may have a WTRU context stored in the RAN. A RAN-core network connection may exist for the WTRU. A WTRU may have context established at the central control function with limited or no context at the edge control function, for example, in a distributed architecture. A WTRU may be tracked at a granularity of a logical area greater than or equal to a cell. A WTRU may be reached by the RAN, for example, via paging message that may originate in the RAN at DRX cycles that may be specific to the light connected state. It is understood that "light connected" and inactive may be used interchangeably herein.

A WTRU (e.g., from its own perspective) might not have an active and/or established connection to the RAN. Mobility in light connected state may be WTRU controlled. A WTRU may move within a logical area without notifying the network. A WTRU may notify the network when it determines that it has moved outside a logical area (e.g., the WTRU may fail to detect the signature/reference signal and/or another property that may identify the concerned area) and/or across a boundary between two different logical areas (e.g., the WTRU may detect a different identity for the current area). Mobility in light connected state may be network controlled (e.g., to enable handover when data transfer may be allowed and/or ongoing).

A WTRU in connected/fully connected/active mode (e.g., from the network's perspective) may have connectivity with the network (e.g., WTRU context may be established at the radio access network and/or a WTRU specific connection may be established between RAN and core network). A WTRU may have context established at a central control function and/or one or more edge control functions, for example, in a distributed architecture. One or more user plane functions/components may be established for the WTRU. WTRU mobility may be tracked at cell level. WTRU assisted, network controlled mobility may be permitted. Network configured, WTRU controlled mobility may be permitted.

A WTRU may be configured to support (e.g., specific) transmission procedures, such as connectionless transfers and/or similar.

A Connectionless transfer may be characterized by non-existence of a WTRU specific RAN-core network connection and/or absence of WTRU context in the RAN. A WTRU may perform connectionless data transfers for data without having to establish an RRC connection at the radio access network, for example, by including context information in the data PDUs and/or by using default context. Context information may include WTRU identity, flow/QoS information, routing information, security, etc. A RAN-core network interface may, for example, use a connectionless interface assisted by the context information in a (e.g., one or more, or each) data PDU and/or use a default tunnel/flow to exchange connectionless data for a WTRU States described herein may represent a standalone/independent state, e.g., with transition logic in between states. States may have relationships with each other. For example, a state may be realized as a substrate and/or as functional elements of another state, where transition between substrates might not imply significantly different RRC function and/or might not trigger RRC behavior. For example, a connectionless transfer may be realized as a substrate and/or an access method for a WTRU in idle and/or light connected state. For example, a light connected state may be seen as/interpreted as a RAN controlled state.

A WTRU context may be modeled. A WTRU context may represent shared/synchronized knowledge between a network and a WTRU regarding the WTRU's capabilities, protocol states and/or parameters/configuration that may be useful for operation of the WTRU. A WTRU context (e.g., from a network perspective) may be created at the RAN, for example, using information from the core network, information obtained from the WTRU, information obtained from a peer RAN node and/or information created by the RAN itself (e.g., during a connection establishment procedure and/or a reconfiguration of the WTRU).

A WTRU context may include, for example, one or more of the following: configuration aspect(s); protocol state aspect(s); and/or capabilities aspect(s).

Configuration aspect(s) may include, for example, one or more identities. An identity may refer to the WTRU's context, to the WTRU itself and/or to a radio level identity (e.g., RNTI). An identity may be useful to associate received control plane information (e.g., location update for RAN-level tracking) with a proper WTRU context.

Configuration aspect(s) may include a measurement configuration. A measurement configuration may be useful, for example, when at least some aspects of the WTRU's mobility may be network controlled.

Configuration aspect(s) may include a security context (e.g., security algorithm, applicable keys and/or sequencing information) associated with the WTRU. A security context may be useful, for example, when security may be applied to control plane signaling (e.g., location update for RAN-level tracking). A security context may be used when resuming user plane data transmissions.

Configuration aspect(s) may include a configuration for logical QoS association/abstraction (e.g., bearer, flow, QoS profile, slice, etc.). This type of configuration may be useful, for example, to determine a priority level associated with downlink data arrival and/or to a scheduling request received by the WTRU. This type of configuration may be used when resuming user plane data transmissions.

Configuration aspect(s) may include radio resource configuration. A radio resource configuration may include configuration of transport and/or physical characteristics of transmission (e.g., transport channel configuration and/or physical channel configuration), configuration for power control, feedback, beam configuration (e.g., beam process, beam sweeping, periodicity, beam mapping to physical resource), additional spectrum resource (e.g., Scell), service specific configuration (e.g., a carrier may be associated with one or more, or a plurality of MACs, and/or one or more, or each, MAC for a service type), link supervision configuration, RAN paging area configuration, plurality of DRX config (e.g., RAN level DRX, CN level DRX, service specific DRX, etc.). A radio resource configuration may be useful, for example, when a WTRU reconnects in a cell for which such configuration may be applicable (e.g., a cell in which the WTRU was previously active and/or a cell part of a group of cells with common configuration aspects).

Protocol state aspect(s) may include, for example, state variables, outstanding grants, semi-persistent grants, DRX state, pending transmissions/retransmissions/feedback/triggers (e.g., polls, status reports), status of buffers (e.g., ARQ buffer, HARQ buffer, discard buffer), security context, header compression context, status of timers (e.g., running, expired, stopped). Protocol state aspect(s) may be useful, for example, when a WTRU reconnects in a cell for which such state may still be applicable (e.g., a cell in which the WTRU was previously active and/or a cell part of a group of cells with common protocol instances towards a given WTRU).

Capabilities aspect(s) may include, for example, transport capability of the WTRU (e.g., maximum number of bits/transport blocks that a WTRU may transmit/receive within a time interval), beamforming capability, number of RF chains, number of antennas, security capability, support of simultaneous services (e.g., eMBB and/or URLLC), capability to connect to multiple transmitting points, supported bands, supported maximum bandwidth, supported TTIs, minimum time between data reception and feedback, etc. Capabilities aspect(s) may be useful, for example, when a WTRU reconnects to the radio access but may require/use reconfiguration for at least one aspect.

Handling a WTRU context (e.g., from a network perspective) may be a function of deployment and/or RAN architecture. For example, an architecture may include an edge control function and/or a central control function within the radio access network. A WTRU context may be distributed across different entities. A configuration that may require/use low latency and/or tight coupling to the transmission point (e.g., control of beam configuration/update) may be provided by the edge control function. A configuration that may require/use coordination between multiple transmission points may be provided by the central control function. A WTRU context related protocol status may be split between edge control and central control function. For example, a central control function may maintain an RRC protocol context, a flow/bearer split function, a reordering protocol state, a header compression state and/or a security context while an edge control function may maintain a beam process context, a layer 1 context, a HARQ context, etc.

A WTRU context may be dynamically placed between edge and central control functions. A placement may be specific to a WTRU, to a service/slice/flow, to a transmission point and/or to a central control function. A WTRU context (and/or portions thereof) may be stored at multiple locations. For example, context may be stored at the serving edge control function and/or at potential target edge control functions, e.g., to enable faster mobility. A clean separation of control and/or user functions may be provided, for example, where a WTRU may receive configuration for signaling flow from an entity different than entity that provides configuration for data flow.

Handling of a WTRU context may be a function of WTRU state. For example, handling of a WTRU context for a connected WTRU may be controlled by a network command (e.g., in a reconfiguration message, mobility command, etc.). For example, a WTRU may determine what part of a WTRU context survives a change of cell (and/or equivalent), e.g., as the outcome of a WTRU-autonomous procedure when in light connected state. For example, a WTRU may retain WTRU layer 2 state based on data transmission capability in light connected state (e.g., whether data transmission may be allowed in light connected state or not), for example, in case the WTRU may move to connected state for data transmission. A WTRU may complete the ongoing data transmission before going to light connected state, for example, when data transmission might not be allowed in light connected state. RLC may deliver the buffered (e.g., out of sequence SDUs) to PDCP, for example, when a WTRU enters a light connected state.

Control plane aspects of light connectivity may be provided. Light connectivity related functionalities and/or configurations may be provided. A transition may occur from light connectivity state to an active state (e.g., connected state).

A WTRU may enable a set of functions (e.g., after a well-defined period of inactivity), for example, when the WTRU determines its location to be within a logical area where the received light connectivity configuration may be valid.

A set of functions may correspond to state transition, e.g., transition to light connected state. A set of functions may perform operations corresponding to light connectivity (e.g., applying radio resource configuration applicable for light connectivity, performing measurements configured for light connectivity, monitoring a paging channel corresponding to light connected state, suspending data transmissions on the uplink, performing ran paging area updates, etc.)

A period of inactivity may correspond to absence or low volume of DL and/or UL data transmission for a duration greater than a preconfigured time duration, e.g., in terms of subframes, TTIs, DRX cycles, etc. Inactivity may be characterized by absence of grants, not enough grants and/or a reception of valid grants without data to transmit.

Location within a logical area may be determined as a function of a measured reference signal signature associated with a logical area and/or may be determined by reception of a broadcast identity associated with the logical area.

A WTRU may perform state transition as a function of a signature-specific measurement threshold. Thresholds may vary depending on active service(s), such as the most stringent service at the time the WTRU received the light connectivity configuration. One or more, or a plurality, of reference signals and/or associated thresholds may be configured. A (e.g., one or more, or each) reference signal may be associated with a different part and/or parts of a radio resource configuration. A WTRU may activate configuration and/or parts of configuration, for example, based on associated signature-specific measurements.

A WTRU may implicitly transition to a light connectivity state. A WTRU in connected mode/state may initiate transition to light connectivity. A transition may be implicit (e.g., it might not involve signaling to the network). A WTRU and a network may pre-agree on and/or preconfigure set of rules for implicit transition to light connectivity. A WTRU in a connected state may receive and/or store configuration aspects related to light connectivity. A WTRU may move to light connected state and/or activate the stored light connectivity configuration based on one or more rules. Examples of triggers for moving to and/or from a light connected state and/or INACTIVE state may include one or more of a period of inactivity, a transmission/reception of a volume of data transmission, occurrence of a configured behavior, activating and/or deactivating one or more services, etc.

An implicit transition may be based on a period of inactivity. A WTRU may be configured to enter light connectivity based on activity levels during connected mode. For example a WTRU (e.g., during connected DRX) may keep track of number of consecutive DRX cycles during which there was no DL and/or UL data transmission activity. A WTRU may enter light connected mode, for example, when there was no data transmission activity for n consecutive DRX cycles. A WTRU may be configured with an inactivity timer that may be (re) started whenever the UL and/or DL data activity may be completed. A WTRU may trigger entry to light connected mode, for example, when the value of an inactivity timer may be above a threshold.

An implicit transition may be based on a volume of data transmission. A WTRU may keep track of the volume of data (e.g., number of bytes and/or packets) transmitted over a predefined time interval. A WTRU may trigger entry to light connected mode, for example, when the data volume may be below a predefined threshold.

An implicit transition may be based on a configured behavior. A WTRU may (e.g., always) enter light connected state as a default state upon receiving a connection release message. A connection release message may or might not have an explicit indication for light connectivity. A WTRU may leave a light connected state, for example, when the WTRU leaves the cell and/or a validity timer expires, for example whichever may occur first.

An implicit transition may be based on active services. A transition may occur, for example, based on a combination of one or more other rules and/or active services at the WTRU. For example, a WTRU may enter light connectivity when MTC services may be active and/or when volume of data transmission may be below a predefined threshold. A WTRU might not enter light connected state, for example, when volume of data transmission may be low and/or when for example a URLLC service may be active.

An implicit transition may be a function of a subscription profile. For example, a WTRU may enter light connected state based on a configuration from a core network. For example, a configuration may be based on a WTRU subscription. A WTRU may receive a configuration, for example, in a registration response message and/or an attach accept message.

An implicit transition may be a function of time of day. For example, a WTRU may enter light connected state based on a time of day configuration from the core network. For example, a WTRU may receive a configuration to allow the use of a light connected state during a specific time period. For example, a WTRU may receive a configuration with an indication to allow the use of light connected state when the WTRU may be operating in low activity mode for a period (e.g., an end-user may configure a "do not disturb mode" period and/or a "night mode" period).

An implicit transition may be a function of power saving. For example, a WTRU may enter a light connected state based on a WTRU battery level and/or power saving settings. For example, a WTRU may enter light connected state when a battery level may be below a certain threshold. For example, a WTRU may enter light connected state based on a power saving settings/preferences (e.g., a WTRU may prioritize using light connected state for data transfers when configured to save power while the WTRU may prefer transitioning to a CONNECTED mode to maximize performance).

An implicit transition may be a function of WTRU capability. For example, a (e.g., low cost) WTRU may operate (e.g., only) in a light connected state and/or might not support a fully connected state and/or one or more functions associated with a fully connected state. For example, a WTRU may perform data transfer while staying in light connected state.

A network may initiate a light connectivity state. A WTRU in connected mode/state may transition to light connected mode, for example, based on a received network command. A WTRU may consider a received network command valid, for example, (e.g., only) when a valid security context may exist in the WTRU. A WTRU may perform actions as if an invalid configuration may be received, for example, when there is not a valid security context associated with a command. A WTRU may receive a network command via (e.g., a field in) a layer 3 message.

A command may be signaled in a variety of ways. For example, a command may be signaled by an RRC connection release with explicit indication for light connectivity (e.g., ReleaseCause as 'light connectivity setup').

A command may be signaled by an RRC connection reconfiguration with explicit state indication as light connectivity. A WTRU may infer a light connectivity indication from one or more aspects of RRC connection reconfiguration, which may include presence of a configuration specific to light connected mode, e.g., RAN PA configuration, DRX/ paging configuration specific to light connected mode, a WTRU ID to use in light connected mode and/or absence of a configuration that may be required/used for fully connected operation (e.g., dedicated physical channel configuration).

A command may be signaled by an RRC connection reconfiguration with mobility control information and/or state control information. For example, a WTRU may receive a handover command to a target cell along with state indication and/or a handover to a RAN PA. A WTRU may choose a best cell in a specified RAN PA. A WTRU may move to a target cell and/or may perform actions specified for entry to light connected state.

A command may be signaled by a dedicated RRC light connection setup message, which may include configuration aspects that may be specific to light connected mode. A WTRU may move from connected state to light connected in the same cell/transmission point.

A WTRU may receive a network command via layer 2 and/or layer 1 indication, such as one or more of the following: a MAC control element and/or a reserved logical channel ID; a DRX command that may activate a DRX configuration that may be specific to light connected mode; and/or a DCI message and/or PDCCH order to enter light connectivity.

For example, the WTRU may initiate a transition to a light connectivity state after one or more, or each, of the ongoing HARQ processes are, or become, inactive. For example, the HARQ processes may have completed successfully and/or may be HARQ processes that are suspended/paused. The determination that HARQ processes are complete/inactive may be a determination based on reception of HARQ ACK (and/or infernal thereof) and/or based on a received DCI.

For example, the WTRU may initiate a transition to a light connectivity state when there are no outstanding/pending RLC PDU(s) and/or segment thereof in the WTRU buffer. For example, the determination may be based on the DRBs and/or LCH and/or equivalent and/or based on certain DRBs, such as for example DRBs that remains configured for light connectivity operation.

A WTRU may transition to light connectivity state from an inactive state, which may correspond to RRC IDLE mode. A WTRU may support a transition from an inactive state to a light connected state.

A transition from inactive to light connectivity may be useful for a system supporting low latency and/or reduced signaling (e.g., for sparse data transfers from idle mode). A transition may reduce signaling overhead and/or latency/delays that may otherwise occur before a WTRU may perform a first transmission, for example, when they may be supported in a light connected state. A first transmission may include control plane messaging (e.g., to establish/resume an RRC connection). A first transmission may include MAC control information and/or similar (e.g., to indicate a use for further transmission resources). A WTRU with infrequent data transfers may utilize light connectivity instead of full connection, for example, when user plane data transfers may be supported in light connected state.

A transition from inactive to light connectivity may be useful for a system supporting idle mode for power on and/or light connectivity for inactive otherwise. A transition may be required/useful for a WTRU that powers on, performs IDLE mode procedures and/or an initial access (e.g., for registration to the network) and/or receives an indication to transit to a light connected state.

For example, a WTRU may indicate a request to move to a light connectivity state when it accesses the system (e.g., based on its capability and/or its type of service). A network may redirect a WTRU to light connected state, for example, based on a WTRU connection request.

DL paging may contain an explicit indication to push a WTRU to light connected state. For example, a network may (e.g., when mobile terminated services require/use low latency) proactively pre-configure a context for a WTRU and/or may provide indication in a paging message.

A WTRU may perform one or more actions upon entering light connectivity state. A WTRU may (e.g., upon entering light connected state) apply a radio resource configuration. A WTRU may (e.g., upon entering light connected state) start a validity timer that may be associated with a light connectivity operation/state. A WTRU may restart a timer, for example, upon reception and/or transmission of control signaling, control plane data (e.g., when user plane transmissions might not be supported in such state) and/or user plane data (e.g., when user plane transmission may be supported). Control information may be an area update message for the purpose of RAN-based paging. A WTRU may (e.g., upon timer expiration) determine that one or more aspects of the WTRU's configuration may be no longer valid. A WTRU may initiate a transition to a different state such as IDLE mode, for example, when the WTRU (e.g., further) determines that it has been inactive for some time. A timer-based action may be useful, for example, to enable a transition away from the light connected state without control signaling overhead when there may be a prolonged period of inactivity. For example, a WTRU may initiate a transition to a different state such as connected mode. A WTRU may receive a reconfiguration (e.g., for connected mode operation and/or for returning to light connected mode) and/or may update a newly invalidated configuration, which may be useful as a safeguard to avoid WTRU and/or network loss of synchronization in terms of reachability.

A WTRU may (e.g., upon entering light connected state) start a validity timer with common and/or dedicated resources associated with light connectivity, e.g., when configured. For example, a WTRU's associated behavior may be similar to the foregoing description.

A WTRU may (e.g., upon entering light connected state) stop monitoring an (e.g., any) applicable dedicated control channel(s) (e.g., with C-RNTI and/or equivalent), for example, when data transfer might not be allowed during light connected state and/or when a shared channel may be used for initiating a data transfer.

A WTRU may (e.g., upon entering light connected state) perform discontinuous reception according to a DRX cycle specific to light connected state.

A WTRU may (e.g., upon entering light connected state) monitor RAN paging specific to a RAN Paging area.

A WTRU may (e.g., upon entering light connected state) start a periodic RAN Paging area update timer. For example, a WTRU's behavior associated with a timer may be similar to other timers described herein and/or may be restarted, for example, when the WTRU successfully completes the location update procedure for the RAN-controlled paging. A WTRU may perform a location update procedure upon expiration of a timer, which may be useful as a safeguard to avoid WTRU and/or network loss of synchronization in terms of reachability.

A WTRU in light connected state may perform one or more actions.

A WTRU (e.g., in light connected state) may start performing measurements applicable for light connectivity.

A WTRU (e.g., in light connected state) may perform network configured, WTRU controlled mobility.

A WTRU may (e.g., when a validity timer expires) perform actions consistent with leaving light connectivity. A WTRU may (e.g., when in light connected state) restart a validity timer based on one or more conditions when data transfer may be allowed during light connectivity, such as when a WTRU receives RAN paging for DL data arrival and/or when a WTRU receives DL and/or UL grant for data transmission. A WTRU may (e.g., when in light connected state) restart a validity timer based on one or more conditions when data transfer might not be allowed during light connectivity, such as when a number of cell changes and/or RAN updates over a predefined time window may be below a preconfigured threshold.

A WTRU (e.g., in light connected state) may perform a RAN Paging area update and/or may perform other actions permitted during light connectivity.

A WTRU (e.g., in light connected state) might not (e.g., perhaps when system information applicable for RAN paging area may be configured) perform one or more of: acquire system information upon cell change within RAN Paging area; and/or monitor SI-RNTI and/or paging for system information update. This may be useful, for example, when a WTRU receives a notification of a change in system information and/or any change in applicable system information (e.g., using RAN-based paging and/or dedicated signaling).

A WTRU (e.g., in light connected state) may (e.g., when system information applicable for RAN paging area might not be configured and/or when a WTRU may determine a change of system information for a cell (and/or equivalent) that a WTRU may be camping on) perform one or more of the following: detect and/or acquire system information via periodic and/or on-demand methods; and/or monitor a paging channel, e.g., according to its idle mode DRX cycle for possible system information update.

A WTRU (e.g., in a light connected state) may monitor a change in location and/or may perform one or more other actions permitted in a light connected state, for example, based on reselecting to one or more of: a cell in the same RAN Paging area; a cell in a different RAN Paging area; a cell in a different Tracking area; and/or a cell not supporting light connectivity.

A WTRU in light connected state may perform different levels of data transfer supported for light connected mode.

Radio resources may be configured for light connectivity mode. A light connectivity configuration for a WTRU may include a radio resource configuration and/or aspects related to RAN paging (e.g., paging channel configuration, DRX configuration, and/or RAN PA configuration, and/or associated timers).

A WTRU in light connected state may be associated with an identity assigned by the RAN. An identity may be unique with a RAN Paging area. An identity may be unique for a given set of physical resources within an applicable RAN Paging area. For example, resources may correspond to a RAN-paging channel, to a control channel associated therewith and/or an aspect of a channel (e.g., a specific P-RNTI), to physical resources in time, to physical resources in frequency and/or to physical resources associated with a specific numerology. A type of multiplexing may be useful to scale the number of WTRUs that may be in a state for a given RAN Paging area, for example, in terms of paging load and/or in terms of type of service (e.g., low latency VS best-effort traffic for sparse intermittent user plane data). For example, a cell may support multiple instances of a RAN-based paging channel whereby different WTRUs may monitor different paging messages. An instance may be differentiated based on at least one of the aforementioned aspects.

A WTRU identity may uniquely identify a context associated with a light connected WTRU. For example, a WTRU may receive an identity in a reconfiguration message that may configure light connectivity. For example, an identity may be a combination of an identity of the cell (e.g., a PCell) where light connectivity may have been (e.g., first) configured and/or the C-RNTI that may have been used (e.g., just before entering light connected state for that cell). For example, a WTRU identity may be assigned by a RAN control function that may store/handle WTRU context during light connectivity. A WTRU identity may be assigned by a central control function, for example, in a distributed architecture with an edge control function and/or a central control function.

A WTRU may consider a light connectivity configuration to be valid for a plurality of cells under the same RAN paging area. A WTRU may consider a light connectivity configuration to be valid for (e.g., one or more, or all) cells that may be part of a RAN paging area (RAN PA). Validity may apply to multiple (e.g., one or more, or all) RAN paging areas that may be included in a WTRU's configuration. A WTRU may receive system information for a plurality of cells under the (e.g., same) RAN paging area, e.g., as a part of a light connectivity configuration.

A WTRU may (e.g., upon entering light connected state) apply a radio resource configuration, with or without an order.

A WTRU (e.g., when it was in connected state before entering light connected state) may (e.g., first) deactivate/remove/delete configurations that may be no longer applicable in light connected state. For example, the WTRU may deactivate one or more of the Scells, PScells, etc. The WTRU may consider remaining configuration from a connected state as a baseline configuration. The WTRU may (e.g., then) apply and/or overwrite a radio resource configuration that may be received via a command that triggered light connectivity. The WTRU (e.g., when one or more parameters might not be configured) may apply the common configuration from the system information that may be applicable for the whole RAN PA. The WTRU may acquire and/or apply a broadcast configuration from system information applicable for the current cell.

For example, one or more aspects of a configuration for light connectivity may be received using differential coding, whereby zero or more existing configuration parameters may retain the current value (e.g., in case the parameters might not be present in the reconfiguration message and/or the parameter may be applicable in light connectivity), zero or more existing configuration parameters may be updated (e.g., in case the parameters may be present in the reconfiguration message and/or zero or more configuration parameters may be configured, such as parameters that may be specific to the light connectivity state).

A default configuration may be predefined for a light connected state. A default configuration may be common to multiple (e.g., one or more, or all) WTRUs in a cell and/or in a RAN paging area.

A WTRU may update one or more aspects of stored configuration (e.g., including a radio resource configuration) that may be associated with a light connectivity state, for example, according to one or more of the following: based on a response received in association with a RAN PA update procedure; and/or based on cell specific information.

A response may be received in association with a RAN PA update procedure. A WTRU may trigger a RAN PA update, for example, when a stored configuration may no longer be applied in a cell (e.g., when a stored configuration violates/mismatches with a common configuration broadcast in a cell). This may happen, for example, when a control channel configuration/RAN paging configuration for a light connectivity state may be different from a broadcast configuration in a cell. A WTRU may set the cause in the RAN PA update indicating incompatible light connectivity configuration. A WTRU may store and/or apply a modified light connectivity configuration from a received RAN PA update response message.

Cell specific information may be available. A WTRU may use a stored configuration (e.g., provided at the time of entry to light connectivity) as a baseline and/or may update/overwrite parts of the stored configuration, e.g., according to access/broadcast information in a new cell. For example, a WTRU may update configuration related to an initial access configuration, for example, when the WTRU moves from one cell to another.

A WTRU may update a radio resource configuration associated with a connected state (e.g., from a received reconfiguration message), for example, when transitioning from light connected state to a connected state. Reconfiguration may include admission control aspects. For example, a WTRU may resume (e.g., only) a subset of bearers that may have been inactive during a light connected state.

A WTRU may be reachable during a light connectivity state. A RAN Paging Area (RAN PA) may be conceptually defined as a logical area composed of one or more transmission points (e.g., TRPs, TRPGs) and/or a logical abstraction thereof (e.g., one or more cells).

A RAN paging area may be applicable to a WTRU in light connected state. WTRU actions in a light connected state and/or INACTIVE state may be a function of, for example, the WTRU's location, reference signal measurement(s) associated with RAN paging area and/or WTRU context stored in the network. A RAN paging area may be associated with a radio resource configuration that may be preconfigured and/or stored. A WTRU may activate/apply different parts of a stored/received configuration, for example, when measurements of a reference signal associated with a RAN paging area may be above a predefined threshold.

A RAN Paging area may be materialized, for example, by a measurement of a system signature and/or reference signal.

A (e.g., one or more, or each) RAN paging area may associated with a (e.g., unique) system signature and/or reference signal. A WTRU may consider its location to be within a RAN paging area, for example, when a measurement of a reference signal and/or system signature associated with the RAN paging area may be above a threshold. A WTRU may determine a relationship between a transmission point and a RAN paging area, for example, based on measurements of a reference signal. For example, a (e.g., one or more, or each) RAN paging area may be associated with a base reference signal (e.g., a Zadoff-Chu (ZC) sequence). Transmission points within the same RAN paging area may use a cyclic shift of a base reference signal associated the RAN PA.

A RAN paging area may be a function of cell ID by broadcast signaling. A WTRU may determine a RAN paging area, for example, based on a logical identifier that may be transmitted as a part of cell ID. For example, part of cell ID may indicate the identity of a RAN paging area. For example, a cell ID may be N bits. The most significant M bits may indicate the RAN paging area and/or (N-M) bits may indicate the identity of the cell within the RAN paging area.

For example, a group of cells and/or transmission points belonging to the same RAN paging area may be indicated as an explicit list of cell IDs. A WTRU may receive the list of cell IDs in a system information broadcast.

A (e.g., one or more, or each) RAN paging area may be associated with an (e.g., a unique) identifier. A WTRU may receive a broadcast signaling in MIB and/or SIB with (e.g., unique) logical identity associated with a RAN paging area.

A RAN paging area may be materialized, for example, by connectivity to a control function. A WTRU may determine a RAN paging area as a function of reachability and/or connectivity to a control function. For example, a WTRU may determine its location to be within a RAN paging area, for example, when it may reach the RAN control function associated with the RAN paging area. For example, a WTRU may determine a change in RAN paging area, for example, when there may be a change in RAN control function and/or core control function.

A RAN paging area may be materialized, for example, by specific arrangement of physical resources. For example, a WTRU may determine that a carrier and/or frequency on which it may be operating on may be part of a RAN PA based on detection and/or reception of a signal. A signal may be a reference signal (e.g., PSS/SSS, NR-SS) and/or a channel state information-reference signal (e.g., CSI-RS). A signal may be a signature (e.g., a system signature). A signal may provide an identity (e.g., a cell/TRP/TRPG identity and/or an identity for a group thereof). For example, a WTRU's configuration may include one or more identities for a (e.g., one or more, or each) RAN PA applicable to the concerned WTRU in light connectivity. An identity may provide an identity of a RAN PA itself. A signal may be a general signal (e.g., a Positioning Reference Signal (PRS)) and/or a signal dedicated to this purpose.

For example, a WTRU's configuration may include a list of one or more identities for RAN PAs applicable to the concerned WTRU in light connectivity. A WTRU may receive a signal for the concerned carrier/frequency that may be used for monitoring RAN-based paging (e.g., a direct association between RAN PA and physical resources such as for RAN-based paging) and/or for a different carrier/frequency (e.g., an indirect association based on geo-location such as under the coverage of a macro cell while being reachable in other frequencies). Receiving a signal for a different carrier/frequency may result in fewer broadcast signals in the operating frequencies, which may result in providing additional resources in a RAN PA area that matches a macro cell deployment. Receiving a signal for the concerned carrier/frequency may provide more flexibility, e.g., in terms of definition and/or deployment of RAN PA areas.

A RAN Paging area may be specific to a WTRU and/or service/slice. A RAN paging area configuration may be flexible and/or may be adapted for diverse deployment scenarios and/or to meet different requirements. For example, a size of RAN paging area may be adjusted, e.g., to tradeoff between signaling overhead for paging and/or WTRU power consumption due to frequent RAN paging area updates.

A WTRU may be configured with one or more RAN Pas. Area definitions (e.g., in terms of cell identities for one or more, or each, area) may be provided to a WTRU, e.g., using dedicated signaling. A network implementation may determine whether (e.g., one or more, or all) WTRUs may be configured with same or different set of areas and/or with similar areas (e.g., in terms of cell identities for one or more, or each, area).

A RAN paging area may be WTRU specific. For example, a WTRU that may be stationary or with low mobility may be assigned a smaller RAN paging area while a WTRU with medium/high mobility may be configured with a larger RAN paging area.

A RAN paging area may be service/slice specific. For example, a WTRU that may support a (e.g., specific) service (e.g., URLLC and/or similar) and/or that may be configured with at least one bearer associated with the service may be configured with a specific and/or smaller RAN paging area that may include (e.g., only) cells/TRPs/TRPGs with suitable support for the requirements of concerned service(s). For example, a WTRU that may support a generic data transfer service (e.g., an eMBB service) may be configured with a different (e.g., larger) paging area. A RAN paging area may (e.g., similarly) be slice specific. A WTRU connected to multiple slices/services may, for example, consider the smallest RAN paging area among the active services/slices as the configured RAN paging area.

A WTRU may be configured so that a specific TRP/TRPG/eNB/cell may be associated with more than one RAN paging area. A WTRU may be (e.g., concurrently) configured with multiple RAN paging areas, where one or more, or each, may be associated with a different service and/or bearer type.

A RAN paging area may be applicable to a WTRU in a light connected state and/or may be characterized by one or more of the following.

A WTRU may support WTRU-autonomous mobility. For example, a WTRU may move between cells (and/or similar) in a RAN paging area, e.g., without notifying the network. Mobility and/or area may be network controlled based on configuration.

A WTRU may apply a DRX cycle and/or may determine paging occasions for RAN-based paging that may be specific to a (e.g., one or more, or each) RAN paging area and/or WTRU-specific (e.g., for load distribution).

A WTRU may have a paging channel configuration specific to a RAN paging area. A RAN paging area may include resources with one or more operational parameters that may have common characteristics (e.g., numerology, bandwidth, control channel configuration, and/or system information).

Support may be provided for service continuity. A WTRU in a light connected state may be reached by the network, for example, at a RAN PA granularity. A WTRU may (e.g., be required to) monitor a paging area change during WTRU autonomous cell changes. A WTRU may determine a change in paging area, for example, based on a (e.g., specific) realization of a RAN PA. For example, a WTRU may perform a determination based on measurements of a reference signal, a change in broadcast signaling and/or a change in connectivity control function. A WTRU may (e.g., upon detecting a change in a RAN paging area) perform a RAN paging area update procedure.

One or more RAN PA update procedures may be provided. One or more procedures may be triggered. A WTRU may initiate one or more RAN PA update procedures, for example, according to one or more of the following (e.g., triggers): a determination of change in a RAN PA area; an expiration of a periodic RAN PA update timer; upon receiving a RAN paging message with a RAN PA update trigger; a change in RAN PA configuration; detecting WTRU entrance into an NR cell from an LTE cell in a light connected state; detecting WTRU entrance into an LTE cell from an NR cell in light connected state; and/or performing a RAN PA update procedure at the WTRU. A WTRU may perform a RAN PA update procedure by one or more of: using data transfer mechanisms (e.g., while staying in the inactive state); performing a reconnection and/or resume procedure (for example, the reconnection and/or resume procedure may explicitly and/or implicitly indicate the RAN PA update from the WTRU; the WTRU may include one or more of: a WTRU identity, a source cell ID, and/or an identity of previous RAN area, etc. in the resume and/or reconnection message) perhaps for example when a RAN PA update is initiated; performing a RAN PA update in combination with a tracking area update procedure; and/or initiating a connection (re-)establishment (and/or equivalent) for the purpose of performing a RAN PA update.

A WTRU may take action after the reception of a RAN PA update response. A WTRU may transmit a RAN Paging Area update message. The WTRU may monitor the control channel (e.g., for a predefined time) for a RAN PA update response. A RAN PA update response message may, for example, include one or more of the following: common/dedicated resources for light connectivity, which may be valid for a short time and/or valid as long as the signature sequence/reference signal associated with the serving cell remains above a threshold; reconfiguration of a stored light connectivity configuration (e.g., possible change in DRX/paging channel configuration and/or update (such as, for example, updated security configurations (e.g., Nexthop Chaining Counter (NCC)))); dedicated system information, which may be valid over the entire RAN paging area; an indication to transition to a different state (e.g., to IDLE and/or CONNECTED mode and/or state); and/or an indication to remain in the current state (e.g., LIGHT CONNECTED mode).

An indication may be implicit and/or explicit. An indication may be combined with a timer value. A WTRU may start a timer using the received value and/or may perform further actions upon expiration of the timer value. A WTRU may (e.g., for data transfers associated with the services for which light connectivity is applicable), for example, restart a timer upon (e.g., successful) completion of the RAN paging area procedure and/or upon successful data transmission and/or reception. For example, a WTRU may initiate a transition to IDLE mode upon expiration of a timer. For example, a WTRU may initiate a RAN paging update upon expiration of a timer.

A relation may exist and/or may be created between a RAN Paging Area (PA) and a Tracking Area (TA). A geographical region corresponding to a tracking area and/or a list of tracking areas may be associated with the same logical core control plane function (e.g., a MME). A geographical region may correspond to one or more logical RAN Paging areas. A RAN paging area may be smaller or equal to a tracking area. A (e.g., single) RAN paging area may be mapped to one or more tracking areas and/or list(s) of tracking areas associated with a (e.g., single) core control plane function. A tracking area may be defined in terms of a group of RAN paging areas.

A WTRU may perform an area monitoring procedure while in light connected state. An area monitoring procedure may involve, for example, determining a WTRU location in terms of cell granularity, RAN paging area granularity and/or tracking area granularity. A WTRU may perform different actions, for example, based on a change in RAN paging area (e.g., only) and/or a change in RAN paging area and/or tracking area. For example, an area monitoring procedure may be executed on a (e.g., one or more, or each) cell change and/or a configuration update that may affect a RAN paging area and/or tracking area.

A WTRU may consider light connectivity to be valid within a RAN paging area and/or across multiple RAN paging areas, for example, when the RAN paging areas may belong to the same tracking area and/or core control function. A WTRU may exit light connectivity and/or may perform a tracking area update, for example, upon reselecting a cell that may belong to a tracking area different than the tracking area where the light connectivity may have been configured.

A WTRU in light connectivity may (e.g., upon entering a new tracking area under the same core control function) perform a joint RAN paging area update and tracking area update. A WTRU may transmit an RRC message (e.g., a RAN Paging area Update message) that may be piggybacked with a NAS message (e.g., Tracking area update). A WTRU may trigger (e.g., only) a tracking and/or paging area update, which may act as an implicit RAN paging area update.

A WTRU may take actions that may be related to RAN paging area handling. A WTRU may monitor notification(s) and/or paging from a RAN, for example, while in light connected state.

A WTRU may determine RAN paging channel resources. A WTRU may determine downlink (DL) resources that may be used to receive a RAN paging message, for example, based on a DL grant in a subset of control channel resources. For example, a WTRU may monitor a (e.g., specific) time/frequency region that may be associated with a downlink control channel for a (e.g., possible) RAN paging message. For example, a WTRU may be configured with a cell specific subset of control channel resources. For example, a WTRU may be configured with a subset of control channel resources that may be common to a RAN paging area.

A WTRU may monitor DL grants associated with a predefined and/or preconfigured RNTI (e.g., RANP-RNTI) for receiving RAN paging messages.

For example, a RANP-RNTI may be a predefined constant associated with a RAN paging message. For example, RANP-RNTI may take a predefined value (e.g., 0xFFFC).

For example, a RANP-RNTI may be specific to a WTRU and/or a group of WTRUs. For example, a WTRU may receive an assignment of RANP-RNTI, e.g., upon entering light connected state and/or as a part of on-demand system information.

For example, a RANP-RNTI may be specific to a RAN paging area. For example, a RANP-RNTI may be a function of system signature that may be associated with a RAN paging area.

For example, a RANP-RNTI may be specific to a service. For example, a WTRU with MTC traffic may be associated with a RANP-RNTI, which may be different from a WTRU with URLLC traffic. This may reduce power consumption (e.g., MTC devices may be transparent to frequent RAN paging for URLLC service).

A WTRU may be configured with an isolation mechanism, for example, to receive RAN paging messages and/or legacy paging messages. Isolation may reduce unnecessary overhead for a WTRU to receive and/or decode paging messages that might not be relevant to its operation and/or state.

For example, isolation may be achieved in terms of (e.g., based on) RNTI. A WTRU may monitor RANP-RNTI (e.g., to monitor RAN paging messages) and/or may monitor legacy P-RNTI (e.g., to monitor legacy and/or core network paging messages).

For example, isolation may be achieved in terms of (e.g., based on) time/frequency resources. A WTRU may be configured with overlapping and/or non-overlapping paging occasion for RAN paging and/or legacy paging.

A WTRU may be configured with an alignment between RAN paging and CN paging messages. Such an alignment may be in terms of RNTIs and/or in terms of paging occasions.

For example, a WTRU may monitor a (e.g., single) P-RNTI to receive CN paging and/or RAN paging messages.

A WTRU may receive a RAN paging message that may be carried in an enhanced legacy paging message. For example, a WTRU may differentiate a RAN paging message from a CN paging message, for example, using an IE such as a RAN domain indicator. This may avoid having a WTRU monitor two different P-RNTIs (e.g., one for monitoring RAN paging and/or another for monitoring for a sysinfo modification indication in legacy paging messages).

A WTRU may be configured with a RAN paging cycle, for example, as a function of active services. For example, a RAN paging cycle for URLLC service may be shorter than MTC service. For example, a RAN paging cycle may be smaller than a legacy paging cycle, for example, to reduce delay and/or enable faster transition to connected mode.

A WTRU may determine a RAN paging frame and/or RAN paging occasion, for example, based on WTRU identity associated with a light connection.

Figure 4:
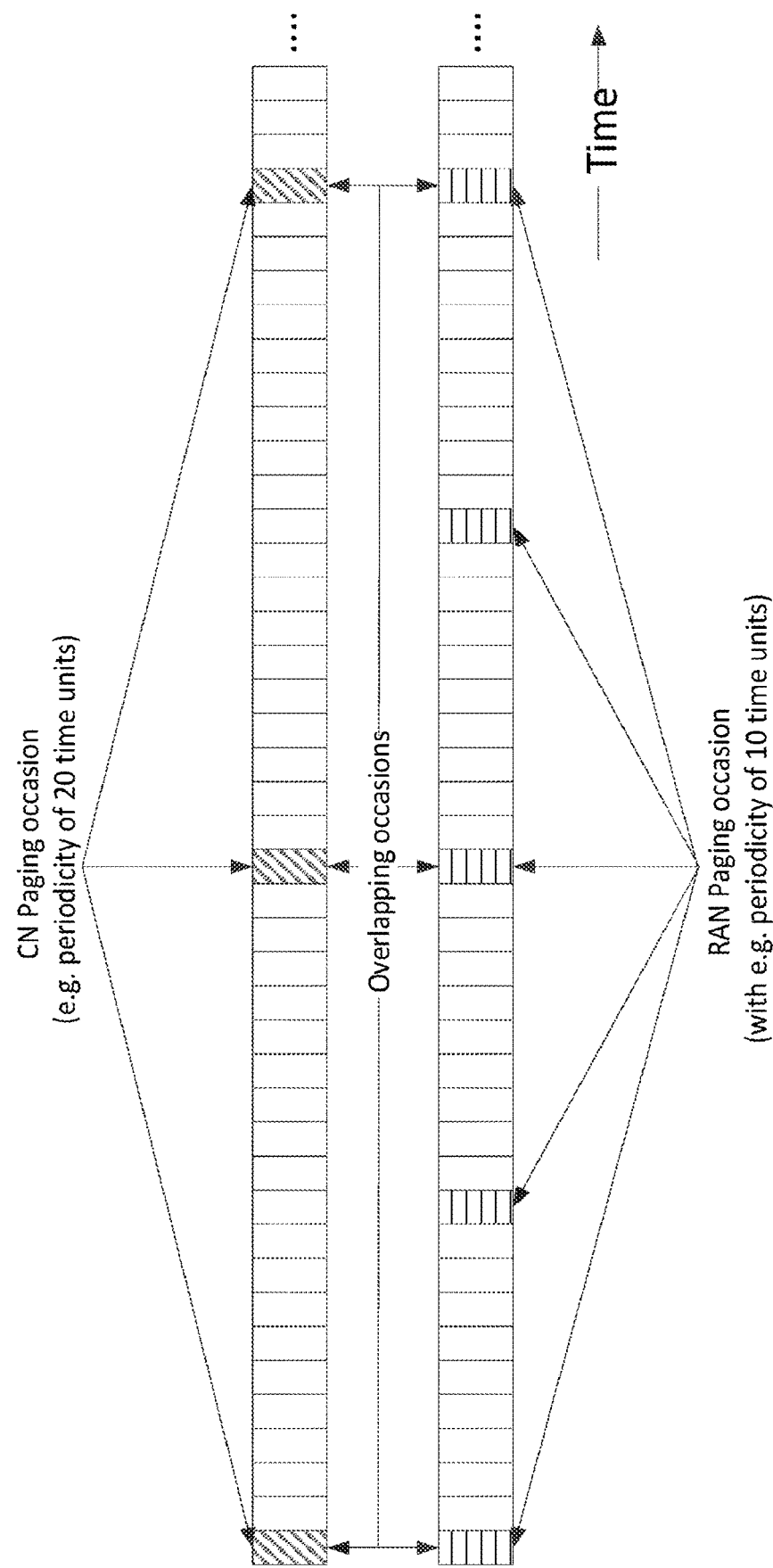
FIG. 4 is an example illustration of overlapping and/or non-overlapping paging occasions.

There may be a relationship between RAN paging and CN/legacy paging. A WTRU may be configured with a RAN paging cycle that may align with a CN/legacy paging cycle. An alignment may refer, for example, to an arrangement where a CN paging cycle may be an integer multiple of a RAN paging cycle (e.g., a CN paging occasion may overlap with a RAN paging occasion). For example, a WTRU may be configured to use the same WTRU ID (e.g., IMSI) for calculation of a RAN paging occasion and/or a CN paging occasion. The WTRU may determine the RAN paging occasion using a RAN paging factor. The RAN paging factor may indicate the number of RAN paging occasions between two (e.g., successive) CN paging occasions. For example, a value of n for a RAN paging factor may indicate a presence of n RAN paging occasions between two successive CN paging occasions (for example, in addition to the RAN paging occasions that coincide with the CN paging occasions). For example, a WTRU may apply a RAN paging cycle to be equal to a CN paging cycle divided by a RAN paging factor. For example, a RAN paging factor may be a power of 2. A WTRU may be configured with a RAN paging factor in a dedicated signaling. In the absence of dedicated signaling, a WTRU may determine a RAN paging factor from broadcast signaling and/or apply a RAN paging cycle equal to a CN paging cycle. An eNB may receive and/or store the CN paging cycle and/or the relevant bits of WTRU ID (e.g., IMSI) from the CN to determine and/or configure a RAN paging factor for a WTRU. FIG. 4 illustrates an example of overlapping and/or non-overlapping paging occasions.

In FIG. 4, a WTRU may determine a Radio Access Network (RAN) paging cycle.

The WTRU may determine a Core Network (CN) paging cycle. The WTRU may determine one or more overlapping occasions between the RAN paging cycle and the CN paging cycle. The WTRU may monitor, at the one or more overlapping occasions, for CN paging and/or RAN paging.

For example, a WTRU may be configured with a (e.g., one) paging cycle (e.g., a RAN paging cycle). A WTRU may monitor for a common paging message. For example, a common paging message may be an enhanced legacy paging message that may include a RAN and/or CN domain indicator. This may be beneficial, for example, when there may be a state mismatch between a light connected WTRU and a RAN. For example, a WTRU may miss RAN paging (e.g., due to an ongoing autonomous mobility event and/or on demand system information acquisition procedure and/or a RAN paging area update procedure). A WTRU and network may (e.g., as a result of missing RAN paging) have a different understanding of a WTRU state. For example, a network may assume and/or determine that a WTRU went to idle state while the WTRU may stay in light connected state. A network may reach a WTRU and/or may synchronize the WTRU state, for example, using a (e.g., single) paging cycle with a common paging message for CN paging and/or RAN paging.

A WTRU may be identified in a RAN paging message. A WTRU may determine that a RAN paging message may be addressed to it, for example, based on WTRU identity carried in a RAN paging message. A WTRU may search for a WTRU identity in one or more paging records present in a RAN paging message.

For example, a WTRU may search a RAN paging message for an identity associated with and/or assigned by a core network (e.g., a GUTI and/or STMSI).

For example, a WTRU may search a RAN paging message for an identity associated with the WTRU context stored during light connection.

For example, a WTRU may search a RAN paging message for an identity associated with a suspended RRC connection.

For example, a WTRU may search a RAN paging message for an identity associated with light connected state (e.g., an identity received/assigned by an anchor NB (e.g., an eNB) that may terminate a CN interface for the light connected WTRU).

For example, a WTRU may search a RAN paging message for a combination of RNTI and cell ID (e.g., an RNTI may be associated with a light connected state). For example, a cell ID may be associated with an anchor NB that may terminate a CN interface for a light connected WTRU.

Terms such as identity, WTRU identity, WTRU identity in the RAN paging message, WTRU identity associated with light connection, etc. may be used interchangeably.

A WTRU in an INACTIVE state may provide assistance for a reachability indication. For example, a WTRU may receive a RAN paging message and/or transmit a RAN paging response (for example, if the paging message carries a matching WTRU identity). A RAN paging message may indicate that WTRU may stay in an INACTIVE state while sending UL response. A RAN paging message may carry an UL grant for a RAN paging response. A WTRU may be configured to transmit a RAN paging area update message at a preconfigured periodicity. A RAN paging area update message may enable a RAN to provide a WTRU reachability indication to the core network. A RAN paging area update message may enable a RAN to update a RAN-CN interface.

A WTRU may receive DL data in while staying in an INACTIVE state. For example, a WTRU may receive DL data PDU based on a relation to a paging message. The paging message may carry the DCI with DL grant. The paging message may indicate that the WTRU may stay in an INACTIVE state to receive DL data. The paging message and/or DL data may have predefined offset in terms of time unit (e.g., TTI).

A WTRU may transition to connected mode with low latency and/or low overhead. A WTRU in light connected state may transition to fully connected state, for example, using a Reconnection procedure. A Reconnection procedure may be triggered by one or more events. A reconnection procedure (e.g., when data transfer might not be allowed during a light connected state) may be triggered upon on or more of: an arrival of UL data; an arrival of UL signaling, such as layer 3 and/or NAS (e.g., RAN PA update); and/or upon a reception of a RAN paging message that may indicate DL data arrival. A reconnection procedure (e.g., when a data transfer may be allowed during a light connected state) may be triggered upon one or more of: data activity that might not match restriction criteria; and/or an arrival of data that might not match a stored context.

A WTRU may reconnect with non-ASN signaling. 5G NR may support diverse deployment scenarios, including a flexible split of functionality between a central unit and a remote unit. Light connectivity may be supported in a distributed control plane and/or user plane architecture. A WTRU may establish context with a central control function. A light connected WTRU may autonomously move between edge control functions, e.g., while retaining layer 3 context and/or parts of layer 2 context. A WTRU may perform a reconnection procedure with an edge control function, for example, using non-ASN signaling (e.g., for layer 2 signaling). A target edge control function may (e.g., upon receiving a WTRU request for reconnection) interact with a source edge control function and/or central control function to retrieve WTRU context. A WTRU security context may be anchored at a central control function. A WTRU might not derive new keys upon a change in edge control function. For example, a WTRU may be configured with list of cells where the WTRU may apply a common security context. For example, the cells for which the WTRU may apply a common security context may be indicated in broadcast signaling (e.g., system information). In such case, for example, the WTRU may apply a common security context in some or all cells which broadcast the same security context ID, while the WTRU may initiate a security context refresh in the case where the WTRU moves to a cell with a different security context ID. For example, a use for a security context update may be determined by the cell ID itself, where some predetermined grouping of cell IDs may allow transmission with a common security context. A reconnection procedure may refer to a layer 3 connection procedure and/or a layer 2 reconnection procedure.

A WTRU may provide scheduling assistance to a network during a reconnection procedure. For example, a WTRU may include one or more of the following: a buffer status report (e.g., with a reconnection request); latency requirements/status (e.g., with a reconnection request); layer 2 status (e.g., RLC/PDCP status); a WTRU identity (e.g., associated with light connection); a context identifier (e.g., may be associated with the WTRU and/or a context for a WTRU); a reason for reconnection (e.g., mobile originated (mo)-signaling (such as RAN PA update and/or NAS signaling), mo-data and/or response to RAN paging); and/or an indication of the DRBs/flows to be resumed for data transfer.

A re-connection procedure may be optimized/parameterized/configured to achieve one or more of low latency and/or low overhead. Low latency may be provided, for example, by reducing the time taken from the arrival of data to the actual transmission of data for a WTRU in light connected state). Low overhead may be provided, for example, by reducing the amount of signaling overhead to transmit data PDU. For example, there may be a reduction in the number of message exchanges over the air interface to setup the connection.

A reconnection request may be provided with on-demand system information. A WTRU may (e.g., upon entering a new cell) acquire on-demand system information, e.g., before triggering a reconnection procedure. A WTRU may (e.g., to reduce latency due to sequential procedures) combine an on-demand system information request with a reconnection procedure. A network may provide (e.g., the most essential) system information for the type of service requested, for example, given that a reconnection request may include information about UL data arrival. For example, a WTRU may set a system information field as "true" in a reconnection request message.

A reconnection request may be provided with a RAN PA procedure. A WTRU may (e.g., upon entering a new RAN Paging area) perform a RAN PA update, e.g., before triggering a reconnection procedure. A WTRU may combine a RAN PA update procedure with a reconnection procedure, for example, to reduce latency due to sequential procedures. For example, a WTRU may set RAN PA update field to "tru" in a reconnection request message.

A fast reconnection procedure may be provided. A WTRU may (e.g., to reduce latency and/or overhead associated with a reconnection procedure) be configured to use dedicated resources in light connected state to perform a faster reconnection procedure.

A WTRU may transition to connected mode using one or more dedicated resources, for example, based on the existence of one or more factors, such as one or more of: where/when there may be an UL data arrival during a light connected state; when/where a WTRU may be configured with one or more dedicated resources for light connectivity operation and/or the validity of those resources has not expired; and/or a WTRU may determine its location to be within a validity region.

One or more radio resources that may be specific to light connectivity operation may be configured at the time a WTRU enters a light connected state (e.g., using a control message from the network), perhaps for example during a response to a RAN paging area update procedure and/or in the RAN Paging message. Radio resources may include, for example, a random access preamble, a random access time/frequency resource and/or a non-orthogonal resource. Radio resources may be dedicated to a WTRU, to a group of WTRUs, and/or may be common to (e.g., one or more, or all) WTRUs in a light connected state.

A validity timer may associated with a dedicated and/or common resource. A validity timer may be an absolute value and/or may be a function of WTRU activity. For example, a validity timer may be extended for example, when the WTRU may be highly active. A validity timer may be a function of a type of service. A URLLC service may be associated with a longer validity timer than an eMBB service.

A validity region may be associated with a dedicated resource configuration. For example, a validity region may be a cell from which a WTRU may receive a light connectivity configuration. For example, a validity region may correspond to a logical RAN paging area and/or a sub-area thereof. A validity region may be a function of a type of service and/or a WTRU mobility state.

A WTRU may release (e.g., stop transmission and/or reception on) a dedicated and/or common resource, for example, when a validity timer expires and/or when a WTRU moves out of a validity region.

A validity timer and/or validity region associated with a dedicated and/or common resource configuration may be different from a validity timer and/or validity region associated with a light connectivity state. For example, a WTRU may be configured with a validity timer for a dedicated and/or common resource configuration to be shorter or equal to a validity timer for a light connectivity state. A WTRU may be configured with a validity region for a dedicated and/or common resource configuration to be a subset of a validity region for a light connectivity state. A configuration may allow a WTRU to release a dedicated and/or common resource at a different time and/or place than an exit from a light connected state.

A reconnection request may be provided with a data PDU. A WTRU may determine whether a scheduling grant for sending a reconnection request may be greater than a predefined threshold. A scheduling grant may be greater than a predefined threshold, a WTRU may multiplex data PDU(s) and/or part of a data PDU, e.g., along with a reconnection request message.

For example, a WTRU (e.g., when it may have an excess grant) may include additional information along with a reconnection request, such as one or more of the following: data PDU and/or part of data PDU whose latency budget may be lower than a predefined threshold; piggybacked RRC/NAS message (e.g., on-demand SIB request, RAN PA update, and/or Tracking Area update, etc.); scheduling assistance information; and/or one or more (e.g., all) other data PDU and/or part of data PDU. For example, a WTRU may include a Data PDU (e.g., only) when an excess grant may allow for more than a predefined threshold (e.g., x bytes) of a data PDU to be transmitted.

A WTRU may be configured to perform a reconnection procedure with mobility information. For example, a WTRU may receive a RRC Reconnection Configuration message (and/or similar) with mobility control information as a response to a reconnection message. The RRC Reconnection Configuration message (and/or similar) with mobility control information may be used to update one or more configuration aspects (e.g., PHY/MAC configuration aspects) of the WTRU. The RRC Reconnection Configuration message (and/or similar) with mobility control information may be used to update the WTRU's security context. For example, the WTRU may perform derivation of new keys when it receives such message using the applicable key derivation mechanism and/or the security-related information in the message.

A WTRU may be configured to perform a reconnection procedure without mobility information. For example, a WTRU may receive a RRC Reconnection Configuration message (and/or similar) without mobility control information as a response to a reconnection message. The RRC Reconnection Configuration message (and/or similar) without mobility control information may be used to update one or more configuration aspects (e.g., PHY/MAC configuration aspects) of the WTRU, if such information elements are present in the message. The RRC Reconnection Configuration message (and/or similar) without mobility control information may be used, for example, when a WTRU is to continue security using the stored security context (e.g., the a WTRU might not perform derivation of new keys). Continuing with previous security keys may simplify a reconnection when the WTRU has not changed cell since the last time it was in CONNECTED mode.

Reconnection failure handling may be provided. A WTRU triggered re-connection procedure may fail, for example, when WTRU context might not be found in a network.

A WTRU and network (e.g., in case of a reconnection failure) may coordinate to establish an RRC connection, perhaps for example without having to start from random access again.

A WTRU may determine whether additional grants may be received with a reconnection failure message and/or whether valid grants may be present. A WTRU may use those grants to establish and/or re-establish an RRC connection. A WTRU may use a timing advance received from a random access procedure during a reconnection procedure for a RRC connection (re-)establishment procedure.

A WTRU context may be recovered based on a pre-existing RAN-Core interface. A WTRU may assist a RAN to recover an RRC context from a pre-existing RAN-Core interface and/or WTRU context at the core. A WTRU may trigger a core network to establish a WTRU context in RAN. A WTRU (e.g., upon reconfiguration failure) may perform NAS triggered RRC connection recovery (NRC), for example, rather than full establishment. A WTRU may use resources obtained as a result of a reconnection procedure to perform an NRC procedure. For example, a WTRU may transmit an NRC message (e.g., a Tracking area update) and/or an NAS message to trigger an NRC procedure. For example, an NRC procedure may be piggybacked with an RRC connection, reconnection and/or reestablishment procedure. A WTRU may include additional information in an NRC message. Additional information may be related to a core control function entity, WTRU identity allocated by the core network and/or a context/cookie with aspects related to preexisting core control plane context, etc. A RAN node (e.g., upon failure to recover a WTRU context at RAN level) may forward an NRC message to a core network. A core network may detect an NRC procedure, for example, when it receives a tracking area update and/or NRC message for a WTRU in ECM_CONNECTED state. NRC may be treated as an S1 handover, e.g., from a network point of view.

A light connection release procedure may be provided. A WTRU may exit a light connectivity state and/or may move to idle state, for example, when one or more of the following conditions may be satisfied/true.

For example, a condition/factor may be elapsed time, e.g., when data transfer might not be allowed and/or a WTRU may stay in light connected state without transition to connected state for a predefined period of time.

For example, a condition/factor may be inactivity, e.g., when data transfer may be allowed in light connected state and/or the volume of data transfer over a predefined time window may be below a threshold.

For example, a condition may be a WTRU mobility state. WTRU power consumption in light connected state may depend on a frequency of cell and/or paging area updates, which may be a function of WTRU speed. A WTRU may monitor the number of mobility events in a predefined time interval. A WTRU may exit light connected state, for example, when a number of mobility events may be higher than a predefined threshold. A WTRU may transition from light connected state to idle state, for example, when a number of cell changes and/or a number of RAN PA updates in a predefined time interval may be greater than threshold.

For example, a condition may be a WTRU location. Light connectivity state for a WTRU may be associated with a logical area. For example, a WTRU may exit light connected state upon leaving current cell, RAN PA and/or Tracking area. For example, WTRU location may be abstracted by a measurement of system signature/reference signal.

For example, a condition may be reselection to a new layer/RAT. For example, a light connected WTRU in NR layer may exit light connected state upon reselecting a RAT that might not support light connectivity (e.g., 3G, 2G cell) and/or might not support NR light connectivity interworking (e.g., LTE).

For example, a condition may be a received command from a network. For example, a command may be received in a RAN Paging message and/or RAN PA update response message.

For example, a condition may be arrival of UL/DL data for a service/slice/QoS that might not be supported by the stored light connectivity configuration.

For example, a condition may be a RAN paging failure. A WTRU in light connected state may monitor for a possible RAN paging message, e.g., at every RAN PA DRX cycle. A WTRU may exit light connected state, for example, when the WTRU is unable to monitor RAN paging (e.g., due to inability to reliably decode a control channel) for N or more occasions over a time interval. For example, a WTRU may declare a RAN paging failure, for example, when a WTRU did not monitor the RAN paging channel for N consecutive paging opportunities.

For example, a condition may be a system information update, e.g., a periodically broadcast update and/or an update initiated by a network through a paging message.

Core network load balancing may be provided for light connected WTRUs. A WTRU in a light connected state may be (e.g., still) considered as ECM CONNECTED, e.g., from a core network control function (e.g., MME) point of view. This mismatch in WTRU state may cause an issue for an MME triggered procedure that may assume a certain WTRU state. For example, an MME may (e.g., for load balancing purposes) trigger S1 CONNECTION release with release cause 'load balancing TAU required.' An eNB may (e.g., for a WTRU in RRC CONNECTED state) transmit RRC CONNECTION release with cause 'loadbalancingTAU required.' A WTRU may move to RRC IDLE and/or perform a TAU procedure. An eNB might not reach a WTRU that may be in light connected state with a dedicated RRC message, which may be addressed by other techniques.

A WTRU may release a light connectivity configuration, transition to idle state and/or perform tracking area update, for example, when it receives a RAN paging message with a TAU required/useful indication.

A core network may internally handle load balancing. A network may (e.g., to update a core-RAN interface) utilize a reachability function to trigger a WTRU to update its position. For example, a WTRU may trigger a RAN PA update procedure, for example, upon receiving a RAN Paging message with target MME information. A RAN node receiving a RAN PA update may interact with a target MME to setup a core-RAN interface.

A WTRU may take one or more actions upon leaving light connectivity, such as one or more of the following actions: delete stored configuration applicable to light connectivity; clear an outstanding RAN PA update, and/or RAN Paging response, etc.; stop a running validity timer associated with a light connectivity; stop a running validity timer associated with common and/or dedicated resources configured with light connectivity; and/or enter an IDLE state and/or a CONNECTED state, e.g., based on the scenario (e.g., a trigger that caused an exit from light connectivity).

A WTRU (e.g., upon transition to IDLE state) may take one or more of the following actions: reset L2 state and/or flush HARQ and/or ARQ buffers (e.g., when data transfer was allowed in a light connected state); release (e.g., stop transmission and/or reception on) any dedicated resources; trigger on-demand system information (e.g., when WTRU was based on stored configuration); and/or trigger a tracking area update (e.g., to reset the core-RAN interface and/or synchronize NAS state).

A WTRU (e.g., upon transition to a CONNECTED state) may take one or more of the following actions: retain layer 2 state (e.g., HARQ/ARQ buffers, and/or state variables, etc.); and/or overwrite a layer 2 configuration with the received dedicated radio resource configuration associated with the CONNECTED state.

A WTRU (e.g., exiting light connected state based on WTRU rules and/or entering IDLE state) may inform the network of the change in state. A WTRU may send a new and/or dedicated message and/or a modified RAN PA update message. For example, a WTRU indication may be required/useful, for example, when dedicated resources may be configured for the WTRU and/or a network may release radio resources and/or a core-RAN interface associated with the WTRU. For example, a WTRU may leave a light connected state without a network indication and/or a network may determine a state transition based on an absence of a RAN paging response. A network may (e.g., then) try to reach a WTRU, e.g., using CN paging based on an IDLE mode DRX cycle.

A WTRU may enter dormant light connectivity, for example, when it goes out of coverage and/or enters a cell that might not support light connectivity. A WTRU (e.g., in dormant light connectivity) may store a light connectivity configuration and/or may behave like an idle mode WTRU.

A WTRU (e.g., in dormant light connectivity) may reselect to a cell supporting light connectivity. A validity timer may (e.g., still) be running. The WTRU may re-enter light connected state, for example, when the cell belongs to the same RAN PA corresponding to the stored light connectivity configuration. The WTRU may perform RAN PA update procedure and/or may re-enter light connected state, for example, when indicated in the RAN PA update response message that the cell belongs to a different RAN PA. The WTRU (e.g., when the validity timer expires) may perform actions upon leaving a light connected state and/or may transition to idle state, e.g., as previously discussed.

A WTRU may store a light connectivity configuration, e.g., upon transition to connected state. A WTRU may activate a stored configuration upon leaving connected state and/or during a failure event in a connected state.

Measurement configuration and/or reporting may be provided. Targeted measurement resources may be provided. WTRU measurements on a default set of subcarriers over a minimum bandwidth might not be accurate in deployments, for example, where the operating bandwidth of neighbor cells and/or serving cells might not be same. RSRP/RSRQ measurements over central subcarriers may be optimistic and/or might not represent the true interference situation. Measurements may be performed over wider bandwidth, although WTRU power consumption may increase due to measurements over large system bandwidth (e.g., 80 Mhz for NR). A WTRU may account for difference in numerology between different parts of a serving cell BW and/or difference in numerology between serving and neighbor cells.

A WTRU may perform measurements over a targeted set of resources that may be dynamically configured per cell, for example, as compared to performing measurements over central subcarriers over minimum BW. Measurement resources may be chosen as a function of serving and/or neighbor load and/or may take into account WTRU capability to perform measurements that may be used to achieve a desired level of accuracy.

Targeted measurement resources may be a function of WTRU state. For example, WTRUs in light connected state may perform measurements over resources that correspond to RAN paging. RAN paging resources may include control channel resources that may schedule RAN paging and/or data channel resources that may carry a RAN paging message. WTRU measurements in light connectivity may (e.g., thus) be indicative of the quality of RAN paging resources. A WTRU may perform autonomous mobility, for example, such that the probability of receiving RAN paging may be above a predefined threshold.

A WTRU may (e.g., in addition to measurements related to radio link quality for RRM and/or mobility) measure aspects related to data transmission during light connectivity. For example, a WTRU may keep track of its data transmission activity during light connectivity and/or may report to the network based on pre-defined triggers, e.g., data volume exceeding a threshold, data volume below a threshold, etc. For example, a WTRU may monitor mobility events during light connectivity (e.g., a number of paging area updates over a time interval, etc.). A WTRU may report measurements, e.g., along with a paging area update message.

Power consumption may be reduced during light connectivity. WTRU measurement procedures in light connectivity may be optimized to reduce power consumption while maintaining reasonable measurement accuracy. For example, reference signals that may be used by a WTRU may perform RRM and/or mobility measurements, e.g., as a function of WTRU state. For example, a WTRU (e.g., in a connected mode) may perform measurements on cell specific reference signals (e.g., CRS and/or the like) and/or WTRU specific reference signals. For example, a WTRU (e.g., in a light connected mode) may perform measurements on reference signals specific to one or more groups of TRPs (e.g., a system signature and/or the like). For example, a system signature may be common to a RAN paging area.

A WTRU may limit the number of neighbor cells to measure and/or track in a light connected state. For example, a WTRU may (e.g., as a function of serving cell threshold) have different levels of measurements, for example, to restrict neighbor cells to (e.g., only) neighbors in the current RAN PA, restrict to best neighbor per RAN PA, etc. A WTRU may limit the number of neighbor cells to measure as a function of WTRU mobility state. A WTRU may avoid or minimize neighbor measurements, for example, when a WTRU may be stationary and/or a serving cell may be above an acceptable threshold. A WTRU may perform a neighbor measurement evaluation at a reduced rate (e.g., at a multiple of RAN paging cycle duration), for example, instead of every RAN paging cycle.

A WTRU may determine to perform inter-RAN PA autonomous mobility, for example, based on measurement results. For example, a WTRU may (e.g., first) shortlist the number of neighbor cells above a predefined threshold. A WTRU (e.g., when the number of shortlisted cells belonging to a non-serving RAN PA may be higher than the number of cells belonging to a serving RAN PA) may select the best cell in a non-serving RAN PA and/or may perform inter-RAN PA mobility. For example, inter-RAN PA mobility may be based on measurements on RAN PA specific system signature. For example, a WTRU may perform inter-RAN PA mobility, for example, when measurements of the system signature of a non-serving RAN PA may be offset above the serving RAN PA. A WTRU may add additional bias to neighbor cells belonging to a serving RAN PA, for example, to avoid additional overhead caused by a RAN PA update procedure. A WTRU may select a best neighbor cell, for example, based on measurement results. A WTRU may perform mobility action with or without indication (e.g., RAN PA update) to a network, for example, based on a selected cell's RAN PA (e.g., serving and/or non-serving).

Mobility may be provided during light connectivity. A WTRU may trigger autonomous mobility based on one or more of: an availability of a (e.g., better) cell from a link quality perspective (e.g., based on measurement results); an availability of a (e.g., better) cell from a service perspective (e.g., support of services associated with the light connectivity configuration); an availability of a better cell from a resource availability perspective (e.g., cells may broadcast average load of resources such as random access resources, number of active WTRUs in the cell, and/or average resource utilization in the cell, etc.) so that a WTRU may perform autonomous mobility towards the cell that may be lightly loaded; and/or availability of a better cell from a capability perspective (e.g., a WTRU may select cells that support wider bandwidth and/or shorter TTI, etc.).

A WTRU may perform an accessibility check on a target cell, for example, as a part of an autonomous mobility procedure. An accessibility check may include determination of barred status of the cell, verification of access class, etc. Access class may be a function of WTRU state. For example, a special access class may be defined that may determine whether a light connected WTRU may access the cell. A light connectivity access class may be interpreted by a WTRU in one or more ways alone and/or in any combination. A WTRU may determine whether it can consider a cell for autonomous mobility based on the light connectivity access class associated with that cell. A WTRU may determine whether it can perform WTRU triggered reconnection to a cell based on the light connectivity access class associated that cell. For example, a WTRU may (e.g., when a reconnection may be barred) perform RRC connection (re) establishment on the cell and/or wait for DL RAN paging. A WTRU may determine whether it can perform reconnection for signaling (e.g., only) and/or for signaling and/or data in a cell based on the light connectivity access class associated with that cell. For example, reconnection in a cell may be allowed (e.g., only) for signaling and/or not for data. A WTRU may determine whether it can perform reconnection for a specific service, for example, based on the light connectivity access class associated with that service. For example, reconnection in a cell may be allowed for URLLC service and/or not eMBB service.

A network may (e.g., perhaps instead of an explicit access class) perform admission control for light connected WTRUs, e.g., based on a received reconnection request. For example, a network may reject a reconnection. A WTRU may (e.g., then) move to idle mode, perform reselection and/or establish RRC connection from scratch. A WTRU may use redirection information in the reconnection reject, e.g., to resume the connection in a different cell.

Prioritized autonomous mobility may be provided. A WTRU (e.g., when performing autonomous mobility) may (e.g., perhaps in addition to quality of measurement results) prioritize cells using one or more criteria such as: prioritize cells from a current RAN PA and/or a (e.g., same) RAN control function, which may reduce performing a RAN PA update and/or RAN control plane context relocation; prioritize cells from a (e.g., same) tracking area and/or core control function, which may reduce performing a tracking area update and/or core control plane relocation; prioritize cells that may support one or more services that may be suspended (e.g., due to light connectivity); prioritize cells that may support light connectivity; and/or prioritize cells with a same type of radio interface (e.g., NR and/or LTE), same frequency, and/or same numerology, etc.

A WTRU may perform prioritization, for example, by applying a bias factor to the measurement quality of the cells.

A WTRU may (e.g., upon selecting a target cell for autonomous mobility) determine whether a target cell belongs to the same RAN PA as the source cell or a different RAN paging area. WTRU actions may depend on the target cell's RAN paging area. For example, a target cell may belong to the same RAN PA as the source cell. A WTRU may start to perform a light connectivity operation (e.g., monitor the target cell control channel for RAN paging message and/or trigger reconnection based on UL data arrival, etc.). A WTRU may perform a RAN paging area update procedure, for example, when a target cell may belong to a different RAN Paging area. A WTRU may perform an on-demand system information procedure to acquire relevant system information for a target cell, for example, when the WTRU does not have valid stored system information relevant for light connectivity operation in the target cell. A WTRU may monitor a paging channel on a source cell, for example, until completion of a RAN paging update procedure. A WTRU (e.g., upon successful completion of a RAN paging update procedure) may start to monitor a control channel on a target cell. A WTRU may wait for completion of a RAN paging update procedure (e.g., when there may be a UL data arrival during the procedure) before triggering a reconnection and/or using common/dedicated resources in a target cell that may be available during light connected state.

A WTRU may determine what part of stored configuration remains valid during an autonomous mobility procedure. A WTRU may make a determination without an explicit signaling exchange with the network. For example, a WTRU may remember/store a linkage between a configuration and a control function that may have triggered a configuration. A WTRU (e.g., upon a change in the entity associated with a control function) may consider a corresponding configuration to be invalid. For example, a WTRU may consider a configuration received from an edge control function to be invalid upon autonomous mobility to a different edge control function. For example, a WTRU may remember/store an association between a received configuration and a transport mechanism used for a configuration. For example, a WTRU may associate a configuration received via layer2/layer1 signaling with a transmission point and/or may associate a configuration received via layer3 signaling with a RAN paging area. A WTRU (e.g., upon autonomous mobility to a different transmission point) may invalidate/release a configuration received via layer2/layer1 signaling while maintaining a configuration received via layer3 signaling. Configuration in this context may include configuration applicable to a (e.g., any) protocol layer. Longevity of a configuration may be determined, for example, by a transport mechanism used to transmit/receive the configuration.

A WTRU may determine what portions of a WTRU protocol state may persist during an autonomous mobility procedure using one or more of procedures alone and/or in any combination.

A WTRU may determine what portions of a WTRU protocol state to persist based on a relation with a reference signal. A relation with a reference signal transmitted by a TRP may indicate how much WTRU context may be shared between TRPs. For example, a reference signal may be a cell specific reference signal and/or a logical identity associated with a reference signal sequence (e.g., cell ID and/or similar).

A WTRU may determine what portions of a WTRU protocol state to persist based on broadcast information. For example, an access table and/or system information broadcast may indicate a relationship with a neighbor cell (e.g., whether HARQ buffer may be shared, an ARQ may be shared and/or a security may be shared).

A WTRU may determine what portions of a WTRU protocol state to persist based on location. A WTRU may determine layer 2 handling, for example, based on the location of a transmission point and/or cell. For example, a WTRU may retain a layer 2 context upon autonomous mobility to a cell in the same RAN paging area. A WTRU may reset a layer 2 context upon autonomous mobility to a cell to a different RAN paging area.

A WTRU may assume that a portion or all of a stored configuration and/or WTRU state may survive irrespective of autonomous mobility. A WTRU may hold on to a context until it receives a response to reconnection request. A reconnection response may indicate what part of a configuration and/or WTRU context to retain. A WTRU may delete/reset the parts of a WTRU context that are not indicated in a reconnection response. This approach may hide the network deployment/architecture and/or backhaul/fronthaul implementation, e.g., from the WTRU point of view.

A mobility paradigm for a WTRU may be a function of WTRU state and/or allowance of data transfer in that state. For example, a WTRU may perform autonomous mobility without notifying the network, for example, when data transfer might not be allowed in a light connected state. A WTRU may transition to a connected state to perform data transfer and/or in connected state WTRU mobility may be controlled by the network. For example, a WTRU may perform autonomous mobility and/or may indicate to the network (e.g., after a mobility event) when data transfer may be allowed in light connected state. A WTRU may transmit an indication to a target cell while being connected to the source cell. An indication may include additional information for a target cell to acquire a WTRU context from a source cell.

WTRU autonomous mobility and/or data transfer in light connected state may result in data PDUs buffered at different network nodes.

A WTRU may delay autonomous mobility, for example, until data transfer is completed while in a light connected state. For example, a small offset factor may be added to serving cell quality, for example, when data transmission is active during light connected state.

A WTRU may suspend data transmission, for example, when autonomous mobility may (e.g., does) result in a cell change. A WTRU may resume a data transfer in a target cell, for example, after completion of autonomous mobility. Completion of autonomous mobility may include system information acquisition in the target cell, a RAN paging area update and/or availability of a (e.g., valid) UL timing advance.

A WTRU may indicate the identity of a source cell and/or availability of data PDUs at the source cell, for example, upon resumption of data transfer in a target cell.

A WTRU may perform autonomous mobility (e.g., only) within an allowed area. For example, a WTRU may perform light connected mobility within one or more (e.g., all) RAN paging areas of a tracking area associated with a central control function. A WTRU (e.g., upon moving to a cell outside of an allowed area) may exit a light connected state, perform actions when leaving light connected state, perform tracking area update when applicable and/or may (e.g., subsequently) move to idle state. A WTRU may restrict its autonomous mobility to transmission points with the same type of radio interface (e.g., NR and/or LTE), same frequency, same numerology, etc.

For example, the WTRU may initiate the RRC Connection Re-establishment procedure upon determining that the WTRU has moved outside a RAN Paging Area of its configuration. If the WTRU is configured with multiple RAN paging areas, when the WTRU determines that it is outside any of the RAN Paging Areas of its configuration, the WTRU may initiate an RRC Connection re-establishment procedure. For example, the WTRU may determine that the WTRU has moved outside a RAN Paging Area if the WTRU does not detect a suitable cell associated with one of its configured RAN paging area(s). Performing RRC Connection Re-establishment when the WTRU moves outside its RAN paging area may help avoid loss of synchronization between the WTRU and the network (e.g., as a consequence of the RAN no longer knowing where to reach the WTRU within an applicable RAN Paging Area and/or as a consequence of the MME not managing the concerned WTRU as an IDLE mode WTRU (e.g., the MME may be unaware of the WTRU no longer being managed by the RAN at least until the RAN can make such determination, e.g., following timer expiration as described above and/or similar).

LTE and/or 5G NR may be (e.g., tightly) integrated for light connectivity. A WTRU may be light connected in one RAT and/or light/fully connected in another RAT. Interworking between RATs may be defined according to RRC states, e.g., inter-RAT reselection between EUTRAN and non-EUTRA RATs for IDLE WTRUs and/or inter-RAT handover between EUTRAN and non-EUTRA RAT for CONNECTED WTRUs. LTE and/or NR may have tighter modes of interworking, e.g., to allow for a phased deployment of NR. WTRUs in light connected state may perform mobility similar to idle mode mobility between LTE and NR. A reselection based mechanism may result in service interruption and/or cause a WTRU to setup a context from scratch.

A WTRU context available in one RAT may be reused, for example, when the WTRU moves to another RAT. Inter-RAT light connected mobility (e.g., from a core network point of view) may seem like an inter-RAT handover. Different levels of reuse may be defined. For example, a context may be shared, transferred and/or converted.

A WTRU in a light connected state may perform inter-RAT mobility using one or more procedures alone and/or in any combination.

A WTRU in a light connected state may perform inter-RAT mobility, for example, using Inter-RAT Re-connection. A WTRU may move from one RAT (NR/LTE) to another RAT (LTE/NR) while staying in light connected state. A WTRU (e.g., upon reselecting to a new RAT) may perform a reconnection procedure that may be defined for the new RAT. For example, an RRC connection resume may be used for reconnection in LTE RAT. A WTRU may include source RAT information (e.g., cell ID, RAT type, WTRU context ID, etc.) in an inter-RAT Re-connection message. A target RAT may obtain a WTRU context from a source RAT, add/delete/modify the light connectivity configuration (e.g., as per the needs/capabilities of the target RAT) and/or may transmit a re-connection response.

A WTRU in a light connected state may perform inter-RAT mobility, for example, using Inter-RAT RAN PA update. A WTRU (e.g., upon entering a new RAT) may perform a RAN PA update, for example, when RAN Paging areas between LTE and NR may be independent. A WTRU may include source RAT information (e.g., similar to a re-connection). A RAN PA response may contain paging configuration, services to be resumed in the target RAT, etc.

A WTRU in a light connected state may perform inter-RAT mobility, for example, using Inter-RAT Re-establishment. A light connected WTRU in NR RAT may enter LTE RAT, may perform an RRC Re-establishment and/or (e.g., upon successful reestablishment) transition to a connected state. A WTRU may do this, for example, when light connection might not be supported in LTE RAT. A WTRU may include source RAT information. A WTRU may, for example, set the contents of an RRCConnectionReestablishmentRequest message as follows: set C-RNTI in ReestabWTRU-Identity as a predefined value (e.g., from FFF4-FFF9), for example, to indicate that a WTRU may be coming from NR and/or that a context ID may be used to fetch the WTRU context; set physCellId to the identity of the last NR cell; and/or set reestablishmentCause as lightmobilityfromNR.

A WTRU in a light connected state may perform inter-RAT mobility, for example, using an enhanced RRC connection request. A light connected WTRU in an NR RAT may enter LTE RAT, transition to idle mode and/or may perform an enhanced RRC connection request. A WTRU may do this, for example, when light connection might not be supported in LTE RAT. A WTRU may include source RAT information and/or establishmentCause as lightmobilityfromNR.

A WTRU in a light connected state may perform inter-RAT mobility, for example, using WTRU assisted handover. A WTRU in light connected state in a source RAT (e.g., upon discovering a better and/or high priority target RAT) may transmit a measurement report that may contain the target RAT information. The source RAT may trigger handover to the target RAT, which may be seen as inter-RAT handover (e.g., from the target RAT and/or WTRU point of view).

A WTRU in an RRC state associated to a first RAT (e.g., in a source cell) may receive a reconfiguration that may include specific parameters. The WTRU may determine from the parameters what RRC state (e.g., a target RRC state) to use in the second RAT (e.g., in a target cell). For example, the WTRU may perform autonomous mobility between two different RATs while in an INACTIVE state and/or a light connected state.

The WTRU may determine that the received reconfiguration enables a specific state such as RRC INACTIVE (and/or light connected state) (for example, if the proper configuration is included (e.g., the presence of WTRU context ID), and/or based on the RRC message received, and/or based on the procedure followed for such reconfiguration. For example, a WTRU in a connected state associated with a source RAT (e.g., LTE/NR) may receive a mobility-command in a RRC reconfiguration message and/or a RRC connection release message with a redirection information.

A WTRU in an INACTIVE state in NR, and/or light-connected state in LTE, may receive a mobility-command in a RAN paging message and/or in a response to resume request from the WTRU, e.g., as a result of UL data arrival and/or response to RAN paging.

The mobility-command may include a target RAT type (e.g., NR/LTE) and/or a transparent container indicating radio resource configuration applicable for the target RAT (e.g., NR/LTE), including the radio bearer configuration and/or target cell information. The WTRU may determine one or more of the following aspects from the mobility-command: a target RRC state, an area configuration for the target RAT, and/or a type of core network. A target RRC state may be a RRC state applicable for the target RAT after the mobility event, e.g., may indicate CONNECTED or IDLE mode or INACTIVE/Light connected as applicable for the target RAT. The RRC state in target state may be implicit from the message carrying the mobility-command, e.g., the WTRU may assume that the RRC state in the target RAT is an IDLE state (for example, if no explicit state information is present in RRC connection release message). An area configuration for the target RAT may be provided. For example, if the cell in the target RAT belongs to the same RAN area as the source cell and/or a different RAN area, logical identifier and/or a list of cells belonging to a RAN area in the target RAT etc. A WTRU may be configured only with a target RAT frequency without a target cell information (e.g., when target RRC state is INACTVE, light connected and/or IDLE). A WTRU may select a suitable cell in the configured RAN paging area of the target RAT. Type of core network (e.g., EPC and/or NGC) may be supported in the target RAT. A WTRU may assume that a source RAT and a target RAT belong to a common core network (for example, if source and target cells belong to same RAN area). If the target RAT is NR, then a WTRU may receive configuration aspects related to numerology, control channels, beamforming configuration, etc.

Upon receiving the mobility-command, the WTRU may take one or more of the following actions: reset MAC (including, for example, SCG MAC if established) associated with source RAT; re-establish RLC (including, for example, SCG RLC if established) for one or more, or all, SRBs and/or DRBs; perhaps if the target RRC state is INACTIVE and/or Light connected: store CRNTI, PCI and/or cell-identity of source cell, WTRU context identity, source RAT type, and/or identity of control plane entity in the CN, etc.; and/or perhaps if the target RRC state is IDLE: release one or more, or all, radio resources associated with a source RAT, including release of the RLC entity, the MAC configuration and/or the associated PDCP entity for one or more, or all, established RBs; and/or indicate the release of the RRC connection to upper layers perhaps together with the release cause.

A WTRU may apply the radio resource configuration received in the mobility-command for the target RAT. For configuration aspects not present in the mobility-command, the WTRU may apply a default configuration pre-defined for the target RAT. The WTRU may perform DL synchronization towards the target cell (e.g., if not performed already). The WTRU may determine the criteria for success or failure of the mobility procedure as a function of RRC state configured for the target RAT. For example, if the target RRC state is INACTIVE state and/or Light connected: the WTRU may acquire system information from the configured target cell (and/or from a suitable cell selected in the target RAT), e.g., if not already provided in mobility-command. The WTRU may determine that the mobility procedure is successful if the WTRU is able to acquire system information required/useful for operation in the target RAT. The WTRU may instantiate SRB(s) and/or one or more DRB(s) according to the bearer configuration in the received mobility-command. The WTRU may activate one or more SRB(s)/DRB(s) if data transfer is supported by the target RAT in the target RRC state, otherwise the WTRU may suspend the configured radio bearers. If the target RRC state is CONNECTED state: the WTRU may determine that the mobility procedure is successful if a random access procedure is completed in the target RAT. If the target RRC state is IDLE state: the WTRU may determine that the mobility procedure is successful if the WTRU is able to camp on the configured cell and/or a suitable cell in the target RAT.

Upon a successful mobility procedure towards the target RAT, a WTRU may release some or all radio resources associated with a source RAT, including release of the RLC entity, the MAC configuration, and/or the associated PDCP entity for some or all established RBs. The WTRU may perform a confirmation procedure that is a function of WTRU state in the target RAT. If the target RRC state is INACTIVE state and/or Light connected: the WTRU may perform RAN area update procedure defined for the target RAT (e.g., if the target cell is in a different RAN area). The WTRU may include the type of source RAT, cell ID of the source cell, WTRU context identity received in the source RAT. The WTRU may include the identity of CN control plane entity. If the target cell is in the same RAN area as the source cell, the WTRU might not perform RAN area update procedure. If UL data is pending for transmission, the WTRU may use one or more access methods defined in the target RAT to transmit UL data (e.g., if UL data transmission is allowed in the target RAT while in INACTIVE and/or Light connected state). The WTRU may use the WTRU context identity received as an outcome of RAN area update procedure if applicable and/or WTRU context identity received from source RAT. The WTRU may perform a resume procedure and/or transition to CONNECTED state to perform data transmission.

A WTRU may perform procedures defined for INACTIVE and/or Light connected operation in the target RAT, e.g. paging monitoring, system information update monitoring, autonomous mobility, etc. The WTRU may receive a RAN paging message in the target RAT and/or transmit a paging response to confirm the success of the mobility procedure. If the target RRC state is CONNECTED state: the WTRU may transmit RRC connection reconfiguration complete to the target cell. If the target RRC state is IDLE state: the WTRU may perform a tracking area update procedure in the target RAT (e.g., if the type of core network is different between source and target RAT). The WTRU might not perform any UL signaling transmission as a result of mobility procedure, with the exception of a tracking area update procedure. The WTRU may perform procedures defined for IDLE mode operation in the target RAT, e.g. paging monitoring and/or system information update monitoring etc.

A WTRU may consider that the mobility procedure has failed if the WTRU cannot comply with one or more aspects of a received mobility-command and/or the criteria for success cannot be met within a predefined timer (e.g., started when the mobility-command is received). Upon failure of mobility procedure towards the target RAT, WTRU may take one or more actions as a function of a target RRC state and/or source RRC state. For example, if the target RRC state is IDLE state, the WTRU may find a suitable cell in source RAT and/or camp on such cell. If the source RRC state is CONNECTED, the WTRU may revert back to the configuration used in the source cell and/or initiate the connection re-establishment procedure. If the source RRC state is INACTIVE and/or light connected, the WTRU may revert back to the configuration used in the source cell and/or initiate the connection resume procedure. A connection resume message may carry the reason for failure of the mobility procedure.

A WTRU in INACTIVE state in NR, and/or Light connected state in LTE, as a result of autonomous mobility (e.g., reselection) to a cell of a different RAT (e.g., LTE and/or NR), may transition to a RRC state applicable to that RAT. For example, a WTRU may trigger autonomous mobility based on presence of a suitable cell in a high priority RAT and/or based on quality of the current serving cell below a threshold. The WTRU may determine the RRC state applicable in the target cell based on one or more of the following criteria: presence of radio resource configuration applicable for the target RAT, type of core network, and/or relation between source cell and target cell to a logical area.

The presence of radio resource configuration applicable for the target RAT: If the WTRU has a stored configuration applicable for the target RAT (e.g., identity associated with WTRU context, bearer configuration for target RAT, security context etc.), the WTRU may transition to Light-connected state (e.g., if LTE is target RAT) and/or INACTIVE state (e.g., if NR is target RAT). If the WTRU does not have a stored configuration applicable for the target RAT (e.g., identity associated with WTRU context, bearer configuration for target RAT, security context etc.), the WTRU may transition to IDLE state in the target RAT and/or indicate release of RRC connection to higher layers. The WTRU may convert the radio resource configuration received in the source cell to be applicable in the target RAT. For example, the WTRU may convert one or more, or each, QoS flows in a NR RAT to DRB when transitioning to a LTE RAT, if LTE does not support QoS granularity at flow level.

Determining one or more types of core networks is described herein. The WTRU may determine the type of core network associated with the target cell from the system information. If the source cell and target cell are associated with the same core network, the WTRU may transition to Light-connected state (e.g., if LTE is target RAT) and/or INACTIVE state (e.g., if NR is target RAT). If the source cell and target cell are associated with a different core network, the WTRU may transition to IDLE state in the target RAT and/or indicate release of RRC connection to higher layers. The WTRU may perform a tracking area update procedure applicable for the core network associated with the target RAT. If the source cell and target cell belong to a different CN level logical area (e.g., tracking area) and/or are associated with two different core control plane entities, the WTRU may transition to IDLE state in the target RAT and/or indicate release of RRC connection to higher layers. The WTRU may perform a tracking area update procedure applicable for the core network associated with the target RAT.

Relationships between a source cell and a target cell to a logical area are described herein. For example, perhaps if the source cell and target cell belong to the same RAN area, a WTRU may transition to Light-connected state (e.g., if LTE is target RAT) and/or INACTIVE state (e.g., if NR is target RAT). For example, perhaps if the source cell and target cell belong to a different RAN area, the WTRU may perform a RAN area update in the target cell, by transitioning to connected state if data transfer is not allowed in INACTIVE/Light-connected state.

User plane aspects of light connectivity may be provided. Layer 2 processing with light connectivity may be provided. The terms layer2 configuration, layer2 state and/or layer2 context may be defined as follows (e.g., for L2 handling in light connectivity) unless stated otherwise.

A Layer 2 configuration may include parameters that may be received by a WTRU and/or may be pre-defined for a WTRU. Parameters may stay constant for the duration of a light connection unless changed by the network and/or internally by the WTRU (e.g., based on changes in state and/or link condition). For example, layer2 configuration may include QoS configuration (e.g., flow and/or bearer configuration), logical, transport and/or physical channel configuration, resource configuration, and/or beam process configuration, etc.

A Layer 2 state may represent a snapshot of a layer 2 status that may change over time. Status may include state variables, buffer status, timer status, outstanding feedback, triggers, received grants, header compression context, etc. A Layer 2 context may include a combination of layer 2 configuration and layer 2 state.

A layer 2 may be reset (e.g., a WTRU may forget some or all layer 2 configuration and/or may delete the layer 2 state) for example, when a WTRU moves from connected to idle state. A WTRU may forget part of layer 2 context such as a lower sub-layer of layer 2 (e.g., RLC/MAC), for example, in case of connected mode when entering a target cell. WTRU handling of layer 2 may be different for a light connected state for NR. A WTRU may determine the status of layer 2 during light connected mobility scenarios. For example, a WTRU may determine the status of layer 2 without interaction with the network.

NR may support diverse deployment scenarios, including a flexible split of functionality between a central unit and a remote unit. A layer 2 configuration for a WTRU may be determined, for example, by a central control function, by an edge control function and/or may be split between central and edge control functions. A layer 2 state for a WTRU may be maintained by a central unit, by remote unit, and/or may be split between central and remote units.

A WTRU (e.g., when entering light connected state from a connected state) may, for example, completely reset layer 2 context, reset part of layer 2 context or maintain a whole layer 2 context. A WTRU may determine how much layer 2 context to maintain, for example, based on one or more of the following: location, deployment, service/slice/flow, validity time and/or data transfer during light connectivity.

A WTRU may determine how much layer 2 context to maintain, for example, based on Location (e.g., within the same cell, within the same RAN PA, different RAN PA and/or different tracking area).

A WTRU may maintain layer 2 configuration and/or layer 2 state, for example, when entering light connected state and/or remaining in the same cell where the WTRU was in connected mode.

A WTRU may maintain a layer 2 configuration, but may reset the (e.g., entire) layer 2 state and/or may reset (e.g., only) the state of lower sub-layers of layer 2, for example, while in light connected state and/or entering a different cell within the same RAN PA.

A WTRU may maintain a layer 2 configuration, but may reset the (e.g., entire) layer 2 state, for example, while in light connected state and/or entering a different cell in a different RAN PA, but within the same tracking area.

A WTRU may reset the (e.g., entire) layer 2 context, including layer 2 configuration and/or layer 2 state, for example, while in light connected state and/or entering a different tracking area.

For example, WTRU mobility within a current RAN PA may be transparent from layer 2 perspective. A WTRU may consider layer 2 context to be valid within the current RAN PA and/or may reset the layer 2 context upon leaving layer 2 context.

A WTRU may determine how much layer 2 context to maintain, for example, based on Deployment (e.g., based on functional placement between a central unit and a remote unit, based on reachability to a central control function, and/or based on type of connectivity (e.g., standalone NR and/or multi-connectivity with another layer/RAT).

A WTRU may maintain a layer 2 state, for example, as a function of reachability to a last serving edge control function before entering light connected state.

A WTRU may maintain a layer 2 configuration, for example, as a function of reachability to a last serving central control function before entering light connected state.

A WTRU may determine how much layer 2 context to maintain, for example, based on Service/Slice/flow (e.g., based on latency, reliability, and/or interruption time requirements of the service, such as different handling of layer 2 contexts associated with URLLC, eMBB and/or mMTC.).

A WTRU may reset (e.g., entire) layer 2 context associated with cMBB service/slice/flow. A WTRU may maintain a layer 2 configuration, but may reset the layer 2 state associated with mMTC service/slice/flow. A WTRU may maintain a layer 2 state and/or a layer 2 configuration associated with URLLC service/slice/flow.

A WTRU may determine how much layer 2 context to maintain, for example, based on Validity time (e.g., WTRU handling of layer 2 context may be a function of a validity timer).

A WTRU may maintain a layer 2 context across different cells, for example, when contexts may be valid. This may be useful, for example, when a WTRU enters a previous serving cell before expiration of the validity timer. A combination of location and validity timers may be used. A validity timer may be stopped, for example, when a WTRU changes location before timer expiration.

A WTRU may store a layer2 configuration up to a first validity timer. A WTRU may maintain a layer 2 state up to a second validity timer. A first validity timer may be larger than a second validity timer.

A WTRU may determine how much layer 2 context to maintain, for example, based on data transfer during light connectivity. A WTRU handling of layer 2 context may depend on whether data transfer may be allowed/configured/possible in light connectivity. For example, a WTRU may retain a layer 2 configuration and/or a layer 2 state upon entry into a light connected state, for example, when data transfer may be allowed in light connected state. A WTRU (e.g., when data transfer might not be allowed/configured/possible in light connectivity) may delete a layer 2 state, but may retain layer 2 configuration during entry to light connected state.

A WTRU may re-use the status of a layer 2 context (e.g., parts of a layer 2 configuration and/or a layer 2 state that may have been stored/maintained during the light connected state), for example, during re-connection (e.g., transition from light connected to connected state).

A WTRU (e.g., when performing data transfer in light connected state) may consider a received layer2 configuration applicable for a (e.g., whole) RAN paging area. A WTRU may acquire and/or may apply a default service/slice for data transfer in light connected state. For example, a WTRU may reset a layer2 state for a (e.g., one or more, or each) stream of packet activity. For example, a stream of packet activity may be determined by the DRX state of the WTRU. A WTRU may retain a layer 2 state, for example, while the WTRU stays in on-duration and/or when there may be active data transmission. A WTRU may perform partial layer 2 reset upon entering DRX. A partial layer 2 reset may involve one or more of the following: suspension of RLC/MAC timers, reset of RLC state variables, flush of HARQ buffer, initialization of logical channel prioritization, etc. A WTRU (e.g., upon waking up from DRX) may apply a layer2 configuration, e.g., including security configuration, key derivation, etc. Use of a common layer 2 configuration and/or simplified layer 2 state handling may reduce X2 signaling to synchronize WTRU layer 2 state with a plurality of transmission points.

Data transfer may be provided during light connectivity. A WTRU may perform data transfer without leaving light connected state. A WTRU may use configured resources (e.g., grant-less and/or periodic resources) and/or may acquire resources (e.g., using a random access and/or a scheduling request). For example, a WTRU may transmit control plane messages while in light connected state, but may transition to connected state, for example, to transmit user plane data. For example, a WTRU may determine to transition to a connected state as a function of PDU size, type of PDU, and/or other criteria described in (e.g., restricted) data rules. A WTRU may perform a RAN paging area update without leaving light connected state. For example, a WTRU may perform RACH, send an RRC message for RAN PA update in msg3, etc. A WTRU may receive successful acknowledgment from a network, e.g., in a msg4 and/or similar. A WTRU may perform a RAN PA update using one or more of the data transfer mechanisms while staying in INACTIVE state. A RAN PA update procedure might not include a change in WTRU state. This approach may eliminate sending a connection request and/or subsequent overhead associated with establishment and/or release of a connection. A WTRU may avoid random access and/or may (e.g., directly) perform a RAN paging area update, for example, using a separate access method (e.g., non-orthogonal access, RSMA, CB-PUSCH, asynchronous access and/or similar).

Different levels of data transfer may be allowed/configured for a WTRU in light connectivity, for example, restricted data transfer and/or no data transfer.

A level of data transfer may be restricted data transfer. A WTRU may perform data transfer without leaving light connected state. A WTRU may perform autonomous mobility and/or may be tracked at RAN PA granularity. A WTRU may perform QoS enforcement during light connected state. A WTRU may perform QoS enforcement, for example, by restricting data transfer activity during light connected state. The WTRU may initiate a procedure to (re-)establish an RRC connection with the network, perhaps for example when data becomes available for uplink transmission, but does not otherwise match the criteria for transmission while remaining in the current state (e.g., the amount of data exceeds, and/or its type does not match) the restriction criteria). Restrictions may be in terms of one or more criteria individually and/or in any combination.

Restriction criteria (e.g., for data transfer) may comprise allowed data rate and/or data volume over a time period. For example, a WTRU may be configured with maximum data volume over a time period. A WTRU may transition to connected state, for example, when actual data volume may exceed a preconfigured threshold. A WTRU may be configured with a buffer size threshold indicating allowed data volume for transmission without initiating a L3 procedure (e.g., a (re-)connection request) that may lead to a state transition. A WTRU may measure a transmitted data volume metric during light connected state. A metric may be maintained at the WTRU across cell changes, e.g., to avoid extensive network coordination.

For example, a WTRU may be configured to perform single shot data transmission in light connected state. A WTRU may perform data transfer in light connected state if the number of data PDUs to be transmitted is below a preconfigured number (e.g., 1). A WTRU may perform data transfer in light connected state if the data PDU fits within the available and/or configured UL resources.

For example, a WTRU may be configured to perform initial transmission of data in light connected state. A WTRU may stay in the light connected state if an acknowledgement is received from the network. A WTRU may transition to connected state if a configured number of retransmissions are exceeded and/or if a negative acknowledgement is received.

Restriction criteria (e.g., for data transfer) may comprise validity time associated with configured resources. A WTRU may consider the validity of configured common and/or dedicated resources as an indication to perform data transfer. For example, a WTRU may perform data transfer in light connected state while the validity timer of common and/or dedicated resources may be running.

Restriction criteria (e.g., for data transfer) may comprise elapsed time from the last network interaction. A WTRU may perform data transfer while a preconfigured time might not be elapsed from previous network interaction. Network interaction may be a signaling transaction (e.g., transmission/reception of signaling message such as a RAN PA update) and/or data transaction (e.g., transmission/reception of data PDU). Elapsed time from a last network transaction may be associated with a UL time alignment timer.

Restriction criteria (e.g., for data transfer) may comprise a type of service. For example, data belonging to a (e.g., specific) service/slice/flow may be allowed (e.g., URLLC and/or MTC type of traffic may be allowed) while a WTRU may transition to connected state for eMBB. For example, such restrictions may be realized as data transfer without state transition applicable only for subset of DRBs.

Restriction criteria (e.g., for data transfer) may comprise a direction of transfer. For example, a DL transfer and/or feedback may be allowed. A WTRU may transition to connected mode for UL data transfer.

Restriction criteria (e.g., for data transfer) may comprise a type of PDU. For example, a WTRU may restrict data transfer to type of PDU (e.g., L3 signaling L3 and/or NAS signaling may be allowed. A WTRU may transition to connected state for data PDU). A restriction may be enforced at a radio bearer/flow level. For example, a data transfer in light connected state may be restricted to signaling radio bearers/flow.

Restriction criteria (e.g., for data transfer) may comprise a location. For example, a WTRU may be allowed to perform data transfer while within a cell and/or RAN paging area where it entered light connected state.

Restriction criteria (e.g., for data transfer) may comprise an access control. For example, a WTRU may be configured to determine the possibility of data transfer while in INACTIVE state based on an access control indication from the network. An access control indication may be a function of WTRU state, for e.g., a WTRU may be configured with different access control parameters for idle and/or INACTIVE states. Access control may be enforced by broadcast signaling. The access control indication may restrict the use of data transfer in the presence of the indication. The access control indication may specify a period of time over which data transmission may (e.g., should) be delayed. The WTRU may probabilistically (e.g., based on random selection) determine whether and/or an amount of time to delay/avoid data transmission in an INACTIVE state based on a comparison of the randomly selected value with the access control indication.

Restriction criteria (e.g., for data transfer) may be based on one or more other criteria. A WTRU may perform a data transfer without leaving a light connected state, for example, when received higher layer data may be allowed by other restriction criteria. A WTRU may trigger a transition to a connected state and/or may (e.g., subsequently) transmit data to the network, for example, when higher layer data may be restricted by other criteria.

A level of data transfer may be no data transfer. For example, data transfer might not be allowed in light connected state. A WTRU may transition to connected state to perform data transfer.

A WTRU may be configured with common and/or dedicated resources to perform data transfer while staying in a light connected state. Common resources associated with light connectivity may be provisioned by configuration that may be applicable to more than one cell. For example, common resources and/or dedicated resources may be grantless resources. A WTRU may perform contention based data transfer, for example, when resources may be common to a plurality of WTRUs. For example, resources may be semi-static resources. For example, resources may be asynchronous resources, wherein a WTRU might not be time synchronized on an UL to use light connectivity resources. A WTRU may consider common and/or dedicated resources to be associated (e.g., only) with a serving cell where the WTRU entered light connected state. A WTRU may release and/or stop using resources, for example, upon leaving a serving cell. A WTRU may consider common and/or dedicated resources to be multi-cell (e.g., associated with a RAN paging area). A WTRU may consider resources to be valid while a WTRU may be in light connected state and/or within a RAN paging area where the WTRU entered light connected state. A WTRU may perform cell update upon a (e.g., one or more, or each) cell change, for example, when resources may be associated with RAN paging area. Common and/or dedicated resources may be associated with validity time.

The WTRU in RRC INACTIVE state (e.g., light connected and/or equivalent) may transmit a single transport block that may include an amount of data. For example, the amount of data that the WTRU may transmit in RRC INACTIVE state may be an amount of data no larger than a specific threshold x. For example, transmission in RRC INACTIVE state may further include an identity of the WTRU and/or of the WTRU context. For example, such amount of data x may be an aspect of the WTRU configuration (e.g., such as a value indicated by L3/RRC signaling during a configuration procedure, a reconfiguration procedure, a RAR message, and/or in a RAN PA update response). A WTRU may be configured with the value x as a threshold associated with WTRU buffer size. For example, the WTRU may determine the value of x as a function of downlink signal quality. For example, such amount of data x may represent and/or corresponds to user plane data, but not control plane data (e.g., control plane data might not count toward the data limit for transmission in RRC INACTIVE). For example, data transmission in RRC INACTIVE may include an amount y of control plane data such as generated for the purpose of reporting measurements, RAN PA update, and/or the like. For example, the WTRU may transmit such amount x of data within a certain period of time t. Such period of time t may be an aspect of the WTRU configuration (e.g., such as a value indicated by L3/RRC signaling during a configuration and/or a reconfiguration procedure).

For example, the WTRU may start a timer using value t one or more, or each, time it performs a transmission when in the RRC INACTIVE state (e.g., light connected and/or equivalent). For example, the WTRU may be configured to refrain from performing further transmission in the RRC INACTIVE state while the timer running. For example, the WTRU may start the timer for transmissions that contain user plane data, but for transmission that have just control plane data. In this manner, the timer may be used to enable transmission of a specific amount of user plane data without involving a L3/RRC state change and/or perhaps the use of L3/RRC signaling (e.g., except possibly to convey an identity associated with the WTRU and/or the WTRU's context). This may be useful to enable transmission of control plane data such as measurements and/or other uplink control information without involving any L3/RRC state change. Such transmission may be performed as part of a random access procedure. For example, such transmission may be performed using a resource associated with the transmission of a preamble, with a contention-based grant and/or with a grant received as part of a response to the transmission of a preamble. For example, such transmission may be included in msg3 (and/or equivalent) of a random access procedure.

Initial access messages may refer to a message exchange between a WTRU and a network, for example, before the WTRU enters a fully connected state. For example, initial access messages may include MSG1 (e.g., transmission on a random access channel and/or a transmission on a contention based channel and/or the like), MSG3 (e.g., a higher layer message on a signaling bearer/flow and/or a data PDU on a data bearer/flow), MSG2/MSG4 (e.g., an indication from a network where a WTRU may obtain a timing advance, a temporary identity, UL resource and/or an indication to enter connected state).

Data transmission may be performed, for example, using one or more initial access messages. A WTRU may perform data transfer in light connected state without entering a fully connected state. Performing data transfer within light connected state may reduce overhead for small data PDU transmissions. Small data transmissions may include, for example, background traffic in smartphones, sporadic signaling messages, a RAN PA update message, etc.

A WTRU in light connected state may use one or more initial access messages to transmit a data PDU without leaving light connected state.

Data transmission may be performed, for example, using a random access resource. A WTRU may use one or more characteristics/properties of a random access resource to perform data transfer in light connected state.

For example, a WTRU may select a random access resource that may belong to a random access channel format. A random access channel format may allow for data transmission along with random access preamble transmission. A predefined relation in terms of time and/or frequency may exist between a data payload and a preamble sequence. A random access channel format may (e.g., also) define a modulation and/or coding scheme to be applied for data transmissions. A WTRU may be configured with one or more random access channel formats with flexible and/or configurable sizes of payloads and/or MCS and/or preamble lengths, and/or presence/characteristics of synchronization signal and/or presence/characteristics of demodulation reference signal and/or cyclic prefix lengths and/or guard period lengths etc.

For example, a WTRU may determine whether to perform data transmission using a random-access resource and/or to perform random access to enter connected mode based on a size of the data PDU. For example, a WTRU may perform data transmission using a random access resource that may allow for a payload size greater than or equal to the size of a data PDU. A WTRU may (e.g., otherwise) select a random access resource without a data payload, e.g., for a subsequent reconnection/resume procedure.

For example, a WTRU may determine whether to perform data transmission using a random access resource and/or to perform random access to enter connected mode based on the quality of the serving cell. For example, an RSRP/RSRQ associated with a serving cell may be above a threshold and/or a path loss of a serving cell may be below a threshold. A WTRU may perform data transmission using an appropriate random access resource.

For example, a WTRU may select a random access resource for data transmission based on the status of timing alignment. For example, a WTRU may select a random access resource with a longer preamble and/or a longer cyclic prefix, e.g., when the WTRU may no longer be timing aligned on the uplink. For example, a WTRU may select a random access resource with a shorter preamble and/or shorter cyclic prefix, e.g., when the WTRU has a valid timing advance.

For example, a WTRU may transmit demodulation reference signals when performing data transmission on a random access resource. For example, a WTRU may (e.g., also) transmit a demodulation reference signal multiplexed with data in time and/or frequency with the data payload.

For example, a WTRU may perform data transmissions on a plurality of random access resources. For example, a repetition factor may be associated with a RACH resource. A plurality of RACH resources that may be separated by time and/or frequency may be grouped together. For example, a WTRU may repeat data PDU transmissions, for example, by cycling through different redundancy versions in different RACH resources that may belong to a RACH resource group.

Data transmission may be performed on a contention based resource. For example, a WTRU may use a contention based resource to perform data transfer in light connected state.

One or more procedures for a random access based resource may be applicable to a contention based resource (e.g., the term random access resource may be replaced with the term contention based resource).

For example, a WTRU may determine a configuration (e.g., time/frequency resources) of a contention based resource based on a DL grant associated a predefined RNTI.

For example, a WTRU may be configured with a modulation and/or coding scheme that may be used for data transmission in a contention based resource. A WTRU may use a predefined MCS scheme and/or a MCS scheme that may be dynamically indicated in a DL grant associated with a contention based resource.

A WTRU may (e.g., when a contention based resource and/or a random access resource are available) determine which resource to use, for example, based on one or more of type of service, size of data PDU, status of UL timing advance, link quality, path loss metric, channel occupancy, etc. For example, a WTRU may use a contention based resource, for example, when it has a valid UL timing advance.

A WTRU may fall back to a random-access channel, for example, when a contention based resource might not be used, when an acknowledgement for a data PDU transmission might not be received within a predefined time interval, and/or when a number of retransmissions on a contention based resource may exceed a threshold.

WTRU identity may be associated with a data transmission. A WTRU may indicate an identity, for example, when performing data transmission in a random access resource and/or a contention based resource. For example, an identity may uniquely identify a WTRU and/or WTRU context associated with a UL data transmission.

For example, a WTRU may indicate an identity using a choice of random access preamble. For example, a WTRU may be configured with a dedicated random access preamble. For example, a dedicated sequence may be unique within a RAN paging area.

For example, a WTRU may indicate an identity using a synchronization signal sequence, a demodulation reference signal sequence and/or a signature sequence. For example, a WTRU may be configured with a dedicated signal sequence. A dedicated sequence may be unique within a RAN paging area.

For example, a WTRU may indicate an identity using a MAC control element that may be included with a random access payload.

For example, a WTRU may include a WTRU identity with data (e.g., in MAC PDU), for example, when performing data transmission in light connected state.

For example, a WTRU may include a WTRU identity with a reconnection request and/or similar (e.g., in a RRC PDU), for example, when transitioning to a fully connected state for data transfer.

A WTRU may determine the type and/or size of WTRU identity based on whether data transfer is performed within the same anchor eNB and/or a different eNB in the same RAN area. For example, the WTRU may use a shorter identity within the same anchor eNB. A shorter identity may be explicitly assigned by the eNB (e.g., a RNTI) and/or a function of WTRU identity in INACTIVE state.

WTRU assistance may be provided for data transfer in light connected state. A WTRU in light connected state may use one or more initial access messages to convey an indication to the network. An indication may include, for example, a WTRU's desire to perform data transfer without a transition (e.g., to light connected state) and/or the size of grant to transmit a data PDU in light connected state.

For example, a WTRU may indicate the size of grant (e.g., that may be used to transmit a data PDU in light connected state) in the payload of a random access resource. For example, a WTRU may include a grant size in a MAC control element in a random access payload and/or a contention based resource.

For example, a WTRU may indicate a (e.g., need for) data transmission in light connected state, for example, using a choice of preamble sequence and/or other characteristic(s) of a random access resource. A choice may indicate a WTRU's desire to transmit data without leaving a connected state and/or may assist a network in determining a grant for the transmission.

A WTRU may handle MSG2 (e.g., RAR). A WTRU may declare a successful contention resolution, for example, when a WTRU ID included with a data transmission in MSG1 (e.g., RACH and/or contention based resource) may be (e.g., is) present in MSG2.

A WTRU may perform data retransmission using, for example, a random access resource and/or a contention based resource, e.g., when a WTRU ID might not be present in MSG2 and/or when the WTRU might not have received a MSG2 within a predefined time interval.

For example, a WTRU may receive in MSG2 an acknowledgement for a data PDU transmitted in MSG1. For example, a WTRU may determine a status of an uplink (UL) data transmission based on presence of a grant in MSG2.

A WTRU may determine that data transmitted in MSG1 was received successfully, for example, when MSG2 has a WTRU ID and/or no further UL grant. A WTRU may determine that data may be retransmitted, for example, when MSG2 has a valid WTRU ID and/or an UL grant.

For example, a WTRU may receive an indication in MSG2 to transition to fully connected state for data transmission. A WTRU may use a UL grant in MSG2 to perform a reconnection procedure.

For example, a WTRU may receive a UL grant in MSG2 for a contention based resource. A WTRU may perform (re-)transmission on a contention based resource. The WTRU may adjust the UL timing based on the timing advance command received in MSG2.

For example, a WTRU may receive in MSG2 a notification to stop using a contention based resource for a predefined time period. A WTRU may receive a notification, for example, when a contention based resource may be (e.g., is) overloaded.

Data transmission may be performed using MSG3. For example, a WTRU may perform data transmission using a MSG3 while staying in light connected state.

A WTRU may receive in MSG2 an indication to perform data transfer using MSG3 without entering fully connected state.

A WTRU may autonomously determine whether to transmit data in MSG3 and/or a reconnection message in MSG3 in MSG3, for example, based on the size of UL grant received in MGS2.

A WTRU may directly transmit data PDU in MSG3, for example, when a UL grant may be greater than or equal to a data PDU plus headers.

A WTRU may perform a reconnection procedure using MSG3 and/or transition to connected state for data transmission, for example, when a UL grant received in MSG2 is not sufficient for data PDU transmission.

For example, a WTRU may include a reconnection message in MSG3 and/or based on remaining available resource, the WTRU may also include data PDU in the MSG3.

A WTRU may determine whether to transmit data in MSG3 and/or a reconnection message in MSG3, for example, based on the status of contention resolution.

For example, a WTRU may directly transmit data PDU in MSG3, for example, when the WTRU determines that contention is resolved based on indication and/or presence of its identity in MSG2.

For example, a WTRU may transmit a higher layer signaling message, e.g., a reconnection message, if the WTRU cannot unambiguously determine that the contention is resolved based on MSG2 reception.

A WTRU may indicate (e.g., using MAC headers) the presence of a data PDU in an MSG3 transmission (e.g., including a LCID associated with the data PDU).

A WTRU may include an identity associated with a WTRU in light connected state and/or an identity associated with a WTRU context, for example, when transmitting data in MSG3.

A WTRU may apply a preconfigured security configuration (e.g., security key, security algorithm) to cipher a data PDU, for example, when a WTRU transmits data in an initial access message.

A WTRU might not perform segmentation of data PDUs, for example, when using initial access messages for data transfer.

A WTRU may use a reconnection procedure to enter a connected state and/or (e.g., subsequently) perform unrestricted data transfer.

A WTRU may process MSG4, for example, MSG4 may be received following UL transmission and/or transmission of MSG3. A WTRU may receive a reconfiguration message as part of MSG4 and/or perform reconfiguration of its RRC parameters related to light connected behavior. Such parameters may include any parameter and/or subset of parameters provided in the initial light connected configuration, such as, but not including, security parameters, thresholds/rules defining the decision to move to connected, new WTRU ID, etc.

In one example, the WTRU may receive a new WTRU ID to be used for transmission of data and/or reception of paging messages. The WTRU may apply this new WTRU ID for future transmissions, in calculation of its paging occasions, and/or in processing PDCCH for reception on the control channel.

For example, the WTRU may receive a new security context, such as any of new keys and/or any parameters required/useful for computation of new keys, such as NCC. The WTRU may compute a new (e.g. fresh and/or previously unused) set of keys based on the NCC provided in MSG4 and/or may utilize the new keys for ciphering and/or integrity protection in future UL transmissions.

A WTRU may further receive such reconfiguration, and/or indication to initiate reconfiguration in a DL message following MSG4, such as during an extended scheduling period.

A WTRU may receive, in MSG4, an indication to initiate an RRC procedure which may reconfigure the WTRU and/or move the WTRU to connected mode.

For example, the WTRU may receive an indication in MSG4, and/or in subsequent scheduling, an indication from the network to initiate a resume procedure and/or similar procedure to perform transition to connected mode.

For example, the WTRU may receive an indication in MSG4, and/or in subsequent scheduling, an indication from the network to initiate a request for reconfiguration. Such request may be similar to a resume request, with a response providing reconfiguration parameters.

For example, the WTRU in an INACTIVE state may maintain a first security context. A first security context may be applicable to transmission when in the INACTIVE state. A first security context may include one or more security keys, security algorithms, and/or sequencing information (e.g., a COUNT value for bearers applicable to the INACTIVE state). Sequencing information may be specific to the INACTIVE state. Sequencing information may be common for one or more, or all transmissions associated with the concerned bearer (e.g., independently of what state the WTRU is when a transmission is performed). Security keys may include a key for the integrity protection of RRC signaling ($K_{RRCinactive\_int}$), one for the ciphering of RRC signaling ($K_{RRCinactive\_enc}$), and/or one for the ciphering of user data ($K_{UPinactive\_enc}$). Security context may be associated to the INACTIVE state only. The WTRU may perform management of security context as a function of the RAN paging area. For example, the WTRU may derive a new set of keys for the first security context upon a change of RAN paging area (e.g. the security context may be paging-area specific). A separate key $K_{p\_area}$ may be used for the INACTIVE state. A key $K_{p\_area}$ may derived from the $K_{ASME}$ key taken into use with the latest successful NAS security mode command/activation (SMC) procedure. A key $K_{p\_area}$ may be derived from the key used for the CONNECTED state ($K_{eNB}$) and/or a RAN paging area counter may be used to ensure freshness. A WTRU may derive new keys as part of the RAN-paging area update procedure.

A RAN-paging area update procedure may include an exchange of security-related parameters (e.g., such as a next area chaining count (NACC) which may be similar to the legacy next hop chaining count parameter NCC (and/or NHCC) for the CONNECTED state). A RAN-paging area update procedure may also indicate new integrity and/or ciphering algorithms (e.g., security algorithms may be area-specific). A WTRU may use the integrity protection and/or ciphering of the first message (for UL and/or DL transmissions) for transmission in the INACTIVE state based on the security configuration last updated. A WTRU use the integrity protection and/or ciphering of the RRC message for a paging-area update based on the security configuration used prior to the paging-area update procedure. From the network perspective, security may be applied based on the "source" paging area. An explicit key change indication may be received upon RAN-paging area update and/or indicate whether the WTRU may use the keys associated with the $K_{ASME}$ key taken into use with the latest successful NAS security mode command/activation (SMC) procedure.

A first security context may be applied to transmissions until a second security context may be used and/or activated. For example, the WTRU may use ciphering of a data message for a transmission while in the INACTIVE state using the first security context. The WTRU may use the first security context for subsequent such transmissions. The WTRU may use the integrity protection and/or ciphering of the RRC message from the network while in the INACTIVE state using the first security context. The WTRU may activate (and/or reactivate) a second security context from the reception of such RRC message (e.g., associated to a connection establishment procedure). A WTRU may use the integrity protection and/or ciphering of the RRC message for initiating a transition to the CONNECTED state and/or receive the response from the network while in the INACTIVE state using the first security context. The WTRU may activate (and/or reactivate) a second security context from the reception of the response. Activation of a second security context may correspond to a transition to the CONNECTED state. A second security context may correspond to the AS security context also applicable for transmission while in the CONNECTED state (e.g., using four AS keys ($K_{eNB}$, $K_{RRCint}$, $K_{RRCenc}$ and/or $K_{UPenc}$) and/or applicable security algorithms).

Systems, methods, and/or instrumentalities have been disclosed for light connectivity and/or autonomous mobility. A WTRU may, for example, have an inactive/idle mode, a light connected/loosely connected/Inactive mode and/or a connected/fully connected/Active mode. A WTRU in light connected mode may have a WTRU context stored in a RAN. A WTRU may perform an area monitoring procedure while in light connected state. A WTRU may engage in autonomous mobility during light connectivity. A WTRU may move within a logical area (e.g., a RAN paging area) without notifying the network, but may provide notice when it has moved outside a logical area (e.g., update RAN paging area). Mobility in light connected state may be network controlled (e.g., to enable handover when data transfer may be allowed and/or ongoing).

A WTRU may be reachable during a light connectivity state. A WTRU may engage in autonomous mobility during light connectivity. A WTRU may perform data transfer without leaving light connected state. A WTRU may implicitly transition to a light connectivity state. A network may initiate a light connectivity state. A transition from inactive to light connectivity may reduce signaling overhead and/or latency/delays that may otherwise occur before a WTRU may perform a first transmission in active mode. A WTRU may transition to connected mode with low latency and/or low overhead. A WTRU in a light connected mode may perform a data transfer without entering an active mode, for example, using one or more initial access messages between the WTRU and/or the network before the WTRU enters the active mode.

Figure 2:
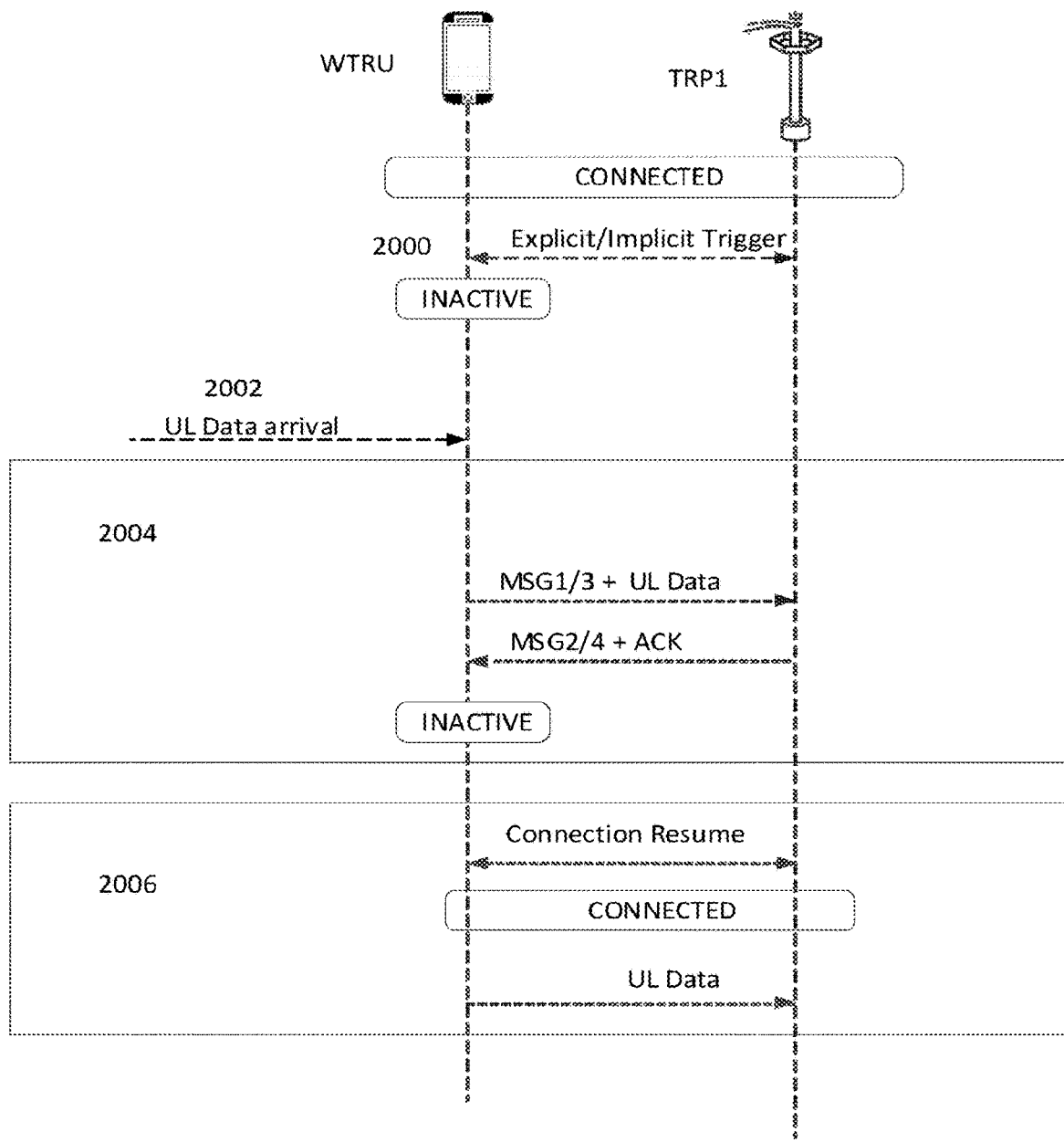
FIG. 2 is an illustration of an example technique of uplink (UL) data transmission in an INACTIVE state and/or CONNECTED state.

In view of the techniques described herein, FIG. 2 illustrates an example technique of a WTRU engaging in UL data transfer in an INACTIVE state and/or a CONNECTED state. At 2000, the WTRU may be triggered (e.g., implicitly and/or explicitly) to enter an INACTIVE state. At 2002, the WTRU may determine that UL data is to be transmitted. At 2004, perhaps upon consideration of one or more factors as described herein, such as the size of the UL data relative to a threshold, the WTRU may send the UL data to TRP2 while in the INACTIVE state, else/and/or, at 2006, after entering a CONNECTED state. For example, at 2004, the WTRU may transfer the UL data in the INACTIVE state in consideration of one or more of, but not limited to, the following factors: if the size/amount of the UL data is less than a threshold; a size of an available UL grant (e.g., relative to the size/amount of the UL data); a location of the WTRU (e.g., an absolute location/specific area and/or a location relative to the TRP1 and/or TRP2); and/or a logical channel (LCH) (e.g., identity and/or availability) for which data becomes available, etc.

For example, at 2004, the WTRU may transfer the UL data in the INACTIVE state in consideration of one or more of: a determination that an amount of the UL data is less than a predetermined threshold; a determination that a size of an available UL grant can accommodate the amount of the UL data; a determination that the WTRU is within at least one of: a specified area, or a predetermined area; and/or a determination that a logical channel identity associated with the UL data is at least one of: available, or applicable.

Figure 3:
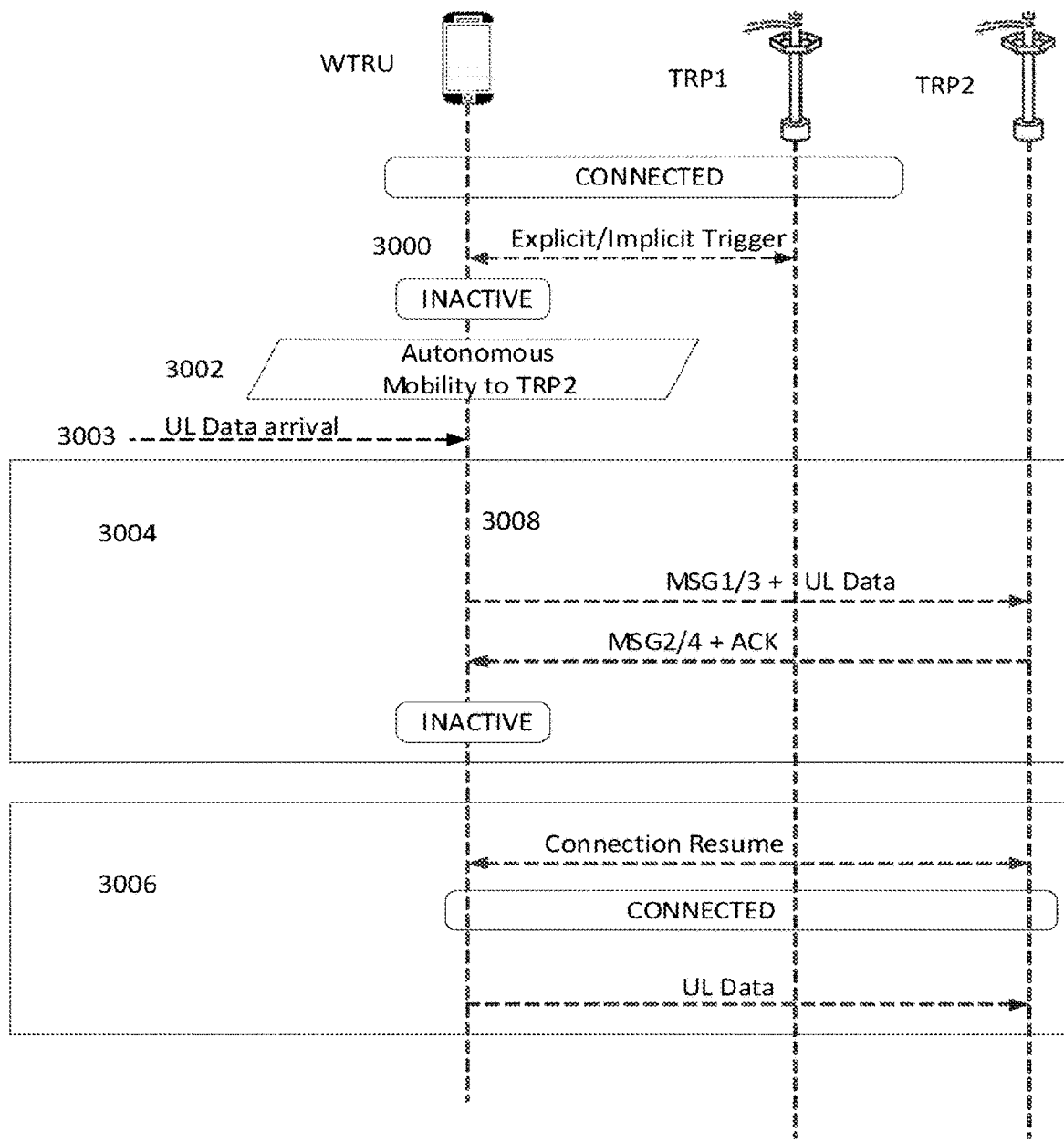
FIG. 3 is an illustration of an example technique of autonomous mobility and/or uplink (UL) data transmission in an INACTIVE state and/or CONNECTED state.

In view of the techniques described herein, FIG. 3 illustrates an example technique of a WTRU engaging UL data transfer in an INACTIVE state and/or CONNECTED state. At 3000, the WTRU may be triggered (e.g., implicitly and/or explicitly) to enter an INACTIVE state. At 3002, the WTRU may (e.g., autonomously) determine to engage in mobility between TRP1 and TRP2. At 3003, the WTRU may determine that UL data is to be transmitted. At 3004, perhaps upon consideration one or more factors as described herein, such as the size of the UL data relative to a threshold, the WTRU may send the UL data to TRP2 while in the INACTIVE state, else/and/or, at 3006, after entering a CONNECTED state. For example, at 3004, the WTRU may transfer the UL data in the INACTIVE state in consideration of one or more of, but not limited to, the following factors: if the size/amount of the UL data is less than a threshold; a size of an available UL grant (e.g., relative to the size/amount of the UL data); a location of the WTRU (e.g., an absolute location/specific area and/or a location relative to the TRP1 and/or TRP2); and/or a logical channel (LCH) (e.g., identity and/or availability) for which data becomes available, etc. At 3008, the WTRU may determine and/or apply at least one security level as described herein, before the UL data is transmitted in the INACTIVE state.

For example, at 3004, the WTRU may transfer the UL data in the INACTIVE state in consideration of one or more of: a determination that an amount of the UL data is less than a predetermined threshold; a determination that a size of an available UL grant can accommodate the amount of the UL data; a determination that the WTRU is within at least one of: a specified area, or a predetermined area; and/or a determination that a logical channel identity associated with the UL data is at least one of: available, or applicable.

The processes and/or instrumentalities described herein may apply in any combination, may apply to other wireless technologies, and/or for other services.

A WTRU may refer to an identity of the physical device, and/or to the user's identity such as subscription related identities, e.g., MSISDN, SIP URI, etc. WTRU may refer to application-based identities, e.g., user names that may be used per application.

A WTRU may be configured with a different transmission profile for data transfer in INACTIVE state. The transmission profile may include one or more of the following: access type; access resource; and/or message type. A WTRU may be configured with plurality of access types for data transfer in INACTIVE state (e.g., 2-step random access, 4-step random access, contention based access, grant-less access, scheduled access etc.). A WTRU may be configured with plurality of resources in time and/or frequency and/or code associated with one or more, or each, access type. A WTRU may be configured with data transfer in MSG1, MSG3, and/or a subsequent message. A WTRU may determine if the message carrying data is/has multiplexed zero or more RRC messages.

A WTRU may determine a specific transmission profile for an initial data transmission attempt. For example, the WTRU may determine the data transmission profile as a function of one or more of the following: WTRU buffer size threshold, serving cell quality, status of WTRU UL timing alignment, WTRU location (e.g. in the anchor eNB, different eNB in the same RAN area etc.), availability of resources associated with the transmission profile (e.g., earliest occurring resource in a time interval), quality of service associated with the data, WTRU identity (e.g., WTRU may select access resource as a function of WTRU identity in INACTIVE state) etc.

A WTRU may be configured to perform a pre-defined number of retransmissions with the same transmission profile. The WTRU may switch to a different transmission profile based on the status of previous data transmission, e.g., success or failure data transmission with a previous transmission profile and/or based on an explicit indication in a response message from the network.

A WTRU may be configured to report the statistics associated with the usage of different transmission profiles. For example, a WTRU may keep track of number of failures/transmission attempts for one or more, or each, transmission profile. A WTRU may report such statistics associated with data transmission in INACTIVE state to the network. A WTRU may report such statistics upon entering connected state. This may aid the network configure access resources and/or WTRU buffer thresholds for resource utilization.

WTRU behavior during an extended scheduling period in inactive state may be provided. For example, an extended scheduling period in NR-INACTIVE may be provided. An initial transmission in INACTIVE state may trigger one or more subsequent transmissions. For example, such subsequent transmission may include one or more of: acknowledgements from radio protocol layers; higher protocol layers; one or more response PDUs from application layer; one or more response packets from radio protocol layers (e.g., for control messages); and/or subsequent arrival of one or more data PDUs in the same direction as initial transmission. Delivery of subsequent DL transmission may be delayed if the WTRU is reachable only during paging occasions after initial UL data transmission. Delivery of subsequent UL transmissions may be delayed if the WTRU performs a subsequent UL transmission on channels that involve contention, e.g., RACH and/or msg3 and/or any other contention based channel, perhaps if the contention may have (e.g., already) been resolved during the initial transmission.

A data transfer method that supports transmission of more than one TB in the downlink and/or in the uplink while in the RRC NR-INACTIVE state may be provided. A WTRU, upon performing initial transmission using any access method, may enter an extended scheduling period.

The WTRU in NR-INACTIVE state may initiate the random-access procedure, for example, in response to a received paging message and/or because new (e.g., UL) data becomes available for transmission. The WTRU may generate applicable L3 message (and/or L2 message) e.g., including an identity of the WTRU and/or of the WTRU's context if the logical channel(s)/bearer(s) for which new data is available for transmission is applicable/available for data transfer while NR-INACTIVE state. The WTRU may initiate a L3 procedure to move to a connected state, e.g., a connection and/or a reconnection request.

The usefulness/need for extended scheduling may be signaled/indicated. Initially, the WTRU in NR-INACTIVE may determine that there is new data available for transmission. The WTRU may generate a BSR that includes data available for transmission in the WTRU's buffer. The BSR may be only for logical channels/bearers for which such transmission method is applicable. The WTRU may include such BSR in the first transmission (e.g., msg3) following the reception of a first uplink grant (e.g. in RAR); possibly, only if the WTRU cannot accommodate one or more, or all data being reported in the BSR in the corresponding TB.

While the data transfer procedure is ongoing, the WTRU in NR-INACTIVE may determine that there is a RACH procedure, a data transfer, and/or an extended scheduling period ongoing. The WTRU may determine that there is new data available for transmission applicable to such data transfer method. The WTRU may include a BSR in the earliest possible uplink transmission. The WTRU may initiate, and/or restart (e.g., by performing a new preamble transmission) a new random access procedure if it determines that the total amount of data included in one or more, or all TBs for which the WTRU has already assembled a MAC PDU and/or initiated a first (e.g., HARQ) transmission is equal or less than the total amount of data last reported e.g., in the last transmitted BSR and/or since the WTRU has received a positive HARQ feedback for the transmission that included such BSR.

The WTRU may report a certain level (e.g., one of a finite set of values) of data available for transmission as a function of a selection of PRACH resources (e.g., preamble value, preamble group, PRACH resource in time and/or frequency, preamble duration, numerology and/or the like) for the transmission of a preamble as described (e.g., instead of a BSR as described).

The WTRU may (e.g., implicitly) indicate certain level (e.g., one of a finite set of values) of data available for transmission and/or an indication that additional scheduling resources may be useful as a function of a selection of a grant e.g., one out of a plurality (e.g., two grants) of grants e.g., received in a RAR (and/or in a plurality thereof) for the transmission of MSG3. The gNB may perform blind decoding of transmission accordingly.

Scheduling opportunities may be determined. The WTRU may receive an indication in a downlink transmission that scheduling occasions may be available for a certain period of time. Such period of time may extend beyond the successful reception of the last message associated with the access method (e.g., beyond the reception of msg2/4 in case of a 2-step RACH procedure, beyond the reception of msg2 in case of a contention-free RACH procedure, and/or beyond msg4 in case of a contention-based RACH procedure, etc.). For example, such indication may be received in a RAR response, in msg4, and/or based on status of un-sustained data transfer. Such indication may correspond to a timer value e.g., the WTRU may receive an index to a finite set of values of a given time unit e.g., a frame, a subframe, a slot, a mini-slot, a TTI, a PDCCH opportunity, and/or a value in ms. A WTRU may determine the index based on adjusting the periodicity of RAN paging cycle and/or WTRU identity in INACTIVE state.

The WTRU may start a timer Tschext with the received value. The WTRU may then monitor the applicable control channel(s) e.g., for DCI(s) on PDCCH while the timer is running. The WTRU may restart the timer when it successfully decodes control information (e.g., for a certain type of control information (e.g., a DCI associated with the WTRU's identity, a search space, a set of resources, etc.). The WTRU may update the timer value according to the applicable time unit e.g., every lapse of a frame, a subframe, a slot, a mini-slot, a TTI, a PDCCH opportunity, and/or a value in ms.

A WTRU in an extended scheduling period may be configured to monitor the control channel for a WTRU identity, for example, the WTRU identity may be a function of WTRU identity associated with INACTIVE state and/or a temporary identity assigned during an access procedure (e.g., a RNTI).

A WTRU in an extended scheduling period may continue monitoring for RAN paging messages, e.g., if the RAN paging occasions occur during the extended scheduling period.

Procedures for the expiration of extended scheduling period may be provided. The WTRU may stop monitoring for control information when the timer expires and/or is no longer running. The WTRU may stop the timer when it initiates a random access procedure. The WTRU may stop the timer when it initiates a transition to a state different than the NR-INACTIVE state. The WTRU may stop the timer upon autonomous mobility event, e.g., a cell change. The WTRU may stop the timer when it receives an explicit indication from the network. The WTRU may be configured to stop the timer when one or more, or all, UL buffers are empty. For example, the WTRU may be configured to stop the timer when one or more (or all) UL buffers are empty for a determined/preconfigured duration. At the expiry of an extended scheduling period, the WTRU may stop monitoring for a WTRU specific identity (e.g., a C-RNTI and/or temporary C-RNTI and/or any other identity used for the purposes of data transmission). The WTRU may continue and/or start monitoring using a P-RNTI (e.g., for paging reception) while in an INACTIVE state.

The WTRU may be configured with one or more functions associated to the RRC CONNECTED state when in NR-INACTIVE state. The WTRU may be configured with dedicated resources for scheduling request (e.g., D-SR on PUCCH and/or equivalent). The WTRU may use such resource if the WTRU has valid uplink timing alignment (e.g., instead of initiating the transmission of a preamble). The WTRU may consider such configuration invalid if it determines that it no longer has valid uplink timing alignment, and/or when the extended scheduling period has ended (e.g., the timer Tschext has expired).

A WTRU may be configured to perform security handling regarding aspects of a Light Connectivity/INACTIVE state. For example, an RRC message, RRC signaling, RRC PDU, RRC SDU, control message, control signaling, control, may be used to generally refer to any control data (e.g., including such that may be carried within a MAC CE, if applicable) and/or data associated with a signaling radio bearer (SRB). Methods described herein may be applicable to other arrangements. For example, data, data PDU and/or data SDU may generally refer to any user plane data (e.g., including MAC CE e.g., for BSR, PHR, etc.) and/or data associated with a DRB. Methods described herein may be applicable independently of state. Methods described herein may be applicable to CONNECTED state, and/or a similar state.

A security level may be associated with UL data transmission. A WTRU may autonomously determine and/or apply a security level associated with a UL data transmission in INACTIVE state based on preconfigured rules.

Security levels may be different. Different security levels may be determined by the extent and/or coverage of integrity protection. Different security levels may be determined by the extent and/or coverage of confidentiality protection. The extent and/or coverage of confidentiality protection may be determined by a security key material (for example, the freshness of the security key material, etc.).

Preconfigured rules may be provided. Preconfigured rules may be a function of WTRU location, type of data, WTRU configuration aspect (for example, as received from the network), time aspect (for example, associated with the security context, data activity, INACTIVE state etc.

For example, the security level may be associated with the extent and/or coverage of integrity protection. For example, a WTRU may be configured to integrity protect a complete transport block associated with the initial data transmission. A WTRU may be configured to integrity protect (e.g., only) a portion of the transport block, and/or provide different levels of integrity protection for different portions of a transport block. A WTRU may be configured to integrity protect (e.g., only) the signaling message (e.g., RRC and/or data associated with a SRB) portion and/or the part of transport block carrying control fields (e.g., WTRU identity/WTRU context identity). A WTRU may be configured to transmit a code associated with integrity protection (e.g., MAC-I), wherein the length of the code (e.g., zero, short, normal etc.) may be determined by one or more preconfigured rules. A WTRU may be configured to transmit a MAC-I calculated over the locally stored ASN.1 encoded fields which may include WTRU identity, and/or identity of the source cell, etc.

For example, the security level may be associated with the extent and/or coverage of integrity protection. For example, a WTRU may be configured to integrity protect the complete transport block associated with the initial data transmission. A WTRU may be configured to integrity protect (e.g., only) a portion of the transport block, and/or a different level of integrity protection for different portions of a transport block. A WTRU may be configured to integrity protect (e.g., only) the signaling message (e.g., RRC and/or data associated with a SRB) portion and/or the part of transport block carrying control fields (e.g., WTRU identity/WTRU context identity). A WTRU may be configured to transmit a code associated with integrity protection (e.g., MAC-I), wherein the length of the code (e.g., zero, short, normal etc.) may be determined by one or more preconfigured rules. A WTRU may be configured to transmit a MAC-I calculated over the locally stored ASN.1 encoded fields which may include WTRU identity, identity of the source cell, etc.

For example, the security level may be associated with the extent and/or coverage of confidentiality protection. For example, a WTRU may be configured to encrypt the complete transport block associated with the initial data transmission. A WTRU may be configured to provide different levels of confidentially protection for different portions of transport block. A WTRU may be configured not to encrypt the signaling message (e.g., RRC message and/or data associated with a SRB) and/or parts of transport block carrying control fields (e.g., WTRU identity/WTRU context identity), but to encrypt the data portion of the transport block.

For example, the security level may be associated with the characteristics of a security context and/or type of security key and/or security algorithm.

For example, the security level may be associated with the freshness of a security key material. For example, a WTRU may be configured to use the same key and/or security context used in the source cell based on a preconfigured rule. When using the same key as source cell, the WTRU may be configured store the PDCP COUNT value prior to entering INACTIVE state and/or continue the PDCP sequence number for data transmissions in INACTIVE state. A WTRU may be configured to derive a new key when initial data transmission in triggered while in INACTIVE state, for example, when the WTRU is not in an extended scheduling period and/or when a signaling procedure is not ongoing. The WTRU may derive a new key based on stored security context and/or one or more additional parameters, for example a NCC (Next Hop Chaining Count) parameter associated with the cell in which data transmission is triggered (e.g., EARFCN, PCI), identity associated with WTRU in INACTIVE state (WTRU context ID and/or resume ID etc.), identity associated with an area (e.g., RAN area ID). When deriving the new key, the WTRU may be configured to reset the PDCP COUNT to 0.

A security level may also be associated with the order in which encryption and/or integrity protection is applied. For example, the WTRU may apply ciphering (thus excluding e.g., A MAC-I field and/or setting the corresponding bits to a specific value e.g., 0). A WTRU may apply integrity protection for a first uplink transmission after key derivation is performed. A WTRU may apply ciphering, for example, before integrity protection, and/or conversely otherwise. For example, the WTRU may perform integrity protection verification and/or may apply deciphering (thus excluding e.g., A MAC-I field and/or setting the corresponding bits to a specific value e.g., 0) for a downlink transmission after key derivation is performed.

For example, a WTRU may be configured with one or more or combination of above methods to realize a specific security level.

For example, the preconfigured rule may include an aspect associated with WTRU location. For example, WTRU may apply a security level for a data transmission in the same cell in which WTRU entered the INACTIVE state. This may be different than a security level for data transmission in any other cell. A WTRU may apply a security level for a data transmission in the cells of a cell group in which the WTRU entered INACTIVE state, different than the security level for data transmission in any other cell group. For example, such cell group may a configuration aspect of the WTRU. Such cell group may e.g., correspond to cells of a same eNB, and/or correspond to cells with a common PDCP anchor. A WTRU may apply a security level for a data transmission in a logical area (e.g., RAN area) in which the WTRU entered INACTIVE state, different than the security level for data transmission in any other logical area (e.g., RAN area).

A WTRU may determine the applicable security level (and/or applicable security parameters) as a function of whether the transmission is using resources of a cell (and/or associated with a cell group) that corresponds to a cell (and/or a cell group) in which the WTRU last successfully performed a transmission with a given security level. A WTRU may determine that the same security level and/or the same security context is applicable when such is the case, possibly if other criterion (e.g., security context validity, type of data, and/or required security level equal or less than the last used security level, etc.) are also met. A comparison may be triggered upon arrival of control and/or user plane data at the WTRU for which security is applicable in the UL and/or DL direction.

For example, the preconfigured rule may include an aspect associated with prior WTRU activity in the cell and/or cell group. For example, a WTRU may apply a previous security level that is equal or higher than the one determined for the transmission, if that security level is still valid. For example, if the WTRU can determine it is performing a transmission in the same cell and/or cell associated to a cell group. A WTRU may apply the security level applied for a signaling procedure (e.g., an area update procedure) for the future data transmission procedure in the same cell.

For example, the preconfigured rule may include an aspect associated with a type of transmission in the cell. For example, a WTRU may apply a security level for data transmission for initial transmission in a cell different than the security level for subsequent/future data transmission in the same cell and/or cell group, e.g., as a function of the received response and/or scheduling.

For example, the preconfigured rule may be a function of type of data to transmit. For example, a WTRU may apply a security level for control plane signaling different than the user plane data. A WTRU may apply a different security level for different types of control signaling based on message type (e.g., resume and/or re-establishment) and/or bearer on which the specific control message is transmitted, e.g., SRB0 and/or SRB1. A WTRU may apply a security level for a user plane data multiplexed with control plane signaling different from user plane data (e.g., by itself).

For example, the preconfigured rule may be a function of freshness criteria. For example, a WTRU may determine to apply a specific security level (e.g., derive a new security key) when a determined/preconfigured time elapses since the WTRU was in an INACTIVE state. A WTRU may determine to apply a specific security level when a determined/preconfigured time elapses since the last key derivation. A WTRU may determine to apply a specific security level when a specific PDCP COUNT value has already been used for this specific key and/or radio bearer. A WTRU may determine to apply a specific security level when a preconfigured time elapses since a last data transmission. A WTRU may determine to apply a specific security level as a function of another freshness criteria, e.g., when the WTRU determines from such criteria that a specific security level may be applied and/or that the WTRU may derive a new set of key(s).

For example, a WTRU may receive control signaling that indicates that the WTRU may (e.g., should) transition to, or remain in, the INACTIVE state. The control signaling may include a next hop chaining count, e.g., for new key derivation. The WTRU may determine that new security keys may (e.g., should) be generated when a transmission (e.g., DL and/or UL) is initiated following a determination that the WTRU may (e.g., should) re-establish the PDCP entity. The WTRU may determine that new security keys may (e.g., should) be generated when the WTRU determines that a specific PDCP COUNT value associated with a transmission has already been used for the current key for the concerned radio bearer. When the WTRU determines that a specific PDCP COUNT value associated with a transmission has already been used for the current key for the concerned radio bearer, among other scenarios, the WTRU may initiate a recovery procedure e.g., if key derivation might not be performed. For example, the recovery procedure may be a connection establishment procedure and/or a re-establishment procedure. For example, the WTRU may activate of a new security context with the network using a connection establishment procedure and/or may derive new security keys using a re-establishment procedure.

A WTRU may assume the new key generated as a result of elapsed key freshness criteria as the key used for a most recent successful transmission with security applied. A WTRU may trigger a UL signaling message when the freshness criteria associated with the stored security context is elapsed. A WTRU may either receive a new key as a result of such signaling procedure and/or assume that the autonomously derived key is valid upon successful competition of such signaling procedure.

For example, the preconfigured rule may be explicitly configured. For example, a WTRU may receive a configuration. A WTRU may receive a security level configuration specific to DRBs. A WTRU might not transmit an RRC message if a DRB is configured to be of a lower security level. A WTRU may be configured not to perform integrity protection for UL data transfers without a RRC message. A WTRU may determine to use the highest security level for the transmission associated with data included in the transmission, for example, when different security levels may be configured for different type of data.

A WTRU may be configured with one or more (and/or a combination of) methods described to determine a security level associated with data transmission in an INACTIVE state.

A WTRU may be configured to determine a PDU structure for UL data transmission in an INACTIVE state based on a security level associated with such transmission. A PDU structure may imply one or more of the following: presence/absence of fields, values of fields (e.g., indication of aspect related to security level), lengths of fields, etc. A WTRU may transmit an indication of security key material used for protection (e.g., integrity and/or ciphering) for a data transmission in the INACTIVE state using information. For example, a WTRU may indicate whether integrity protection and/or ciphering is applied to the UL data and/or parts thereof during data transmission in INACTIVE state. Such indications may be transmitted in an element of RRC message and/or PDCP header and/or MAC CE.

For example, a WTRU in an INACTIVE state upon arrival of UL data may apply the same security algorithm that was used in the most recent successful data transmission with security applied. A WTRU may perform such determination, irrespective of whether the current serving cell supports such security algorithm. A WTRU may perform such determination irrespective of the security level associated with the data for the transmission. A WTRU may perform such determination if such associated security level is equal or less than the security associated with such most recent successful data transmission with security applied.

For example, a WTRU in an INACTIVE state upon arrival of UL data, may determine a (e.g., useful) presence of an RRC message in one or more of the following, where a WTRU may transmit UL data: without an RRC message, perhaps for example if the current serving cell is the same as the cell and/or cell group in which it last performed a successful transmission with security applied; without an RRC message, perhaps for example if no RRC message (e.g., area update) is pending for transmission; in a DRB without an RRC message, perhaps for example if indicated in an explicit configuration for such DRB; without an RRC message, perhaps for example if the size of UL resources (e.g., preconfigured and/or received in a RAR and/or in any other scheduling grant) cannot fit a RRC message. A WTRU may determine the length of a MAC-I to be included with the UL data as a function of the UL grant; without an RRC message, perhaps for example, if a freshness criteria associated with the security context is not elapsed; with an RRC message, perhaps for example if one or more of the aforementioned factors are not satisfied; and/or with an RRC message, perhaps for example upon a failure of a previous transmission without an RRC message.

For example, a WTRU in an INACTIVE state upon arrival of UL data, may determine to perform key derivation as a function of one or more of the following. A WTRU may derive a new key, perhaps for example, if the UL data is transmitted with the RRC message. A WTRU may derive a new key, perhaps for example, if the UL data is a signaling message. A WTRU may use a stored key, perhaps for example, if the current serving cell is same as the cell and/or cell group in which it last performed a successful transmission with security applied. A WTRU may derive a new key otherwise. A WTRU may derive a new key, perhaps for example, if one or more of a preconfigured freshness criteria/rules are elapsed. A WTRU may derive a new key, perhaps for example, if it receives an explicit command, e.g., as a response to previous transmission with stored key. A WTRU may be configured to derive a new key by default for one or more, or all, UL transmissions in an INACTIVE state.

A WTRU in INACTIVE state derive a new key in one or more ways. The WTRU may be configured with a NCC as a part of INACTIVE state context, and/or the WTRU may compare the NCC value associated with INACTIVE state with the NCC value associated with the most recent successful transmission with security applied. The NCC values may be equal, and/or the WTRU may perform horizontal key derivation (e.g., using current $K_{eNB}$ to derive the $K_{eNB*}$). A WTRU may perform vertical key derivation (e.g., using NH to derive the new $K_{eNB*}$). A WTRU may derive the integrity and/or ciphering keys associated with the new key.

The WTRU might not be configured with NCC as a part of INACTIVE state context and/or one or more rules may require/use a new key, and/or the WTRU may perform horizontal key derivation (e.g., using current $K_{eNB}$ to derive the $K_{eNB*}$). A WTRU may derive the integrity and/or ciphering keys associated with the new key.

A WTRU in an INACTIVE state upon arrival of UL data may reset the PDCP COUNT value if a new key is generated. The WTRU may continue the PDCP COUNT value if an old/stored key is used.

A WTRU in an INACTIVE state upon arrival of UL data may attach a WTRU identity with the UL data transmission in one or more of the following ways. UL data may be multiplexed with a RRC message, and/or the WTRU may include the WTRU identity associated with INACTIVE state in the RRC message. The RRC message, and/or the part with the WTRU identity, might not be ciphered. UL data might not be multiplexed with a RRC message. The WTRU may include the WTRU identity associated with an INACTIVE state in a PDCP header. The part of the PDCP PDU with the WTRU identity might not be ciphered. UL data might not be multiplexed with a RRC message, and/or the WTRU may include the WTRU identity associated with INACTIVE state in a MAC CE and/or add a MAC sub-header with a LCID indicating the type of MAC CE carrying WTRU ID. The MAC CE and/or MAC sub-header might not be ciphered.

A WTRU may be configured to provide confidentiality and/or integrity protection for the UL data transmission in one or more of the following ways.

UL data may be multiplexed with a RRC message. A WTRU may calculate the MAC-I over the ASN.1 encoded portion of a local variable that may include a WTRU Identity associated with the INACTIVE state and/or PCI, Cell ID and/or cell group identity associated with the cell where the WTRU last performed a successful data transmission with security applied and/or any other identity known at the WTRU and/or the network. For calculating MAC-I, the WTRU may assume that COUNT, BEARER, and/or DIRECTION are set to binary ones and/or value associated with current transmission and/or any other predefined value. The WTRU may include the calculated MAC-I in the RRC message. The WTRU may determine the length of MAC-I based on the security level associated with the data transmission.

UL data may be multiplexed with a RRC message. A WTRU may cipher the data as part of the PDCP PDU associated with the DRB. A WTRU may deliver the RRC message over SRB0.

UL data might not be multiplexed with a RRC message. A WTRU may calculate a MAC-I over the PDCP header including the WTRU identity and/or the data part of the PDCP PDU, perhaps for example before encryption. The WTRU may append such a MAC-I, and/or others, to the end of the data part of PDCP PDU.

A WTRU may calculate the MAC-I over the ASN.1 encoded portion of a local variable that may include a WTRU Identity associated with INACTIVE state and/or PCI, Cell ID and/or cell group identity associated with the cell where the WTRU last performed a successful data transmission with security applied with COUNT, BEARER, and/or DIRECTION set to binary ones and/or value(s) associated with current transmission and/or any other predefined value. The WTRU may append such a MAC-I, and/or others, to the end of the data part of PDCP PDU.

A WTRU may transmit MAC-I in a MAC CE and/or indicate the type of MAC CE carrying MAC-I, perhaps for example using a reserved LCID in the MAC sub-header.

A length of a MAC-I may be zero or substantially zero. For example, the length of the MAC-I may be zero, short, or normal based on the security level associated with the data transmission. A WTRU might not apply integrity protection to the UL data transmission.

A WTRU may cipher the data part of the PDCP PDU associated with the UL data and/or the MAC-I if included.

Similar methods may be applied for reception of downlink data when applying security-related processing (e.g., deciphering, and/or integrity protection verification, etc.).

One or more methods for handling response to UL data transmission may be provided. A WTRU might not receive a response to an initial UL data transmission. The WTRU may retry the UL data transmission for a predefined number of times, perhaps using same security context (e.g., keys, and/or COUNT value, etc.) used for the initial transmission.

A WTRU may be configured to verify the authenticity of the response to the UL data transmission in an INACTIVE state. The WTRU may perform an integrity check on the received response using one or more of the following methods, the WTRU may receive a response PDU with a MAC-I attached in a MAC CE and/or PDCP PDU and/or in a RRC message. The WTRU may calculate MAC-I using the same security context as UL, over the ASN.1 encoded portion of a local variable and/or over the parts of received DL PDU that includes WTRU Identity associated with INACTIVE state and/or PCI, Cell ID and/or cell group identity associated with the cell where the WTRU last performed a successful data transmission with security applied and/or PCI, Cell ID and/or cell group associated with the current serving cell and/or any other identity known at the WTRU and/or the network with COUNT, BEARER and/or DIRECTION set to binary ones and/or a value associated with a current transmission and/or any other predefined value.

The WTRU may consider the received response to be authentic, perhaps for example, if the calculated MAC-I matches with the received MAC-I. The WTRU may identity ciphered elements using the same security context as in the UL. The WTRU may consider the received response to be authentic, perhaps for example if the decrypted WTRU Identity matches with the WTRU identity transmitted with the UL data.

A WTRU may receive a response indicating a security failure and/or if the WTRU might not verify the authenticity of the received response, the WTRU may do one or more of the following. The WTRU may delete the new key (e.g., if derived) and/or fall back to the old key and/or security context. The WTRU may consider the current cell as barred, perform autonomous mobility to a different cell, and/or retry the UL data transmission while in the INACTIVE state. The WTRU may be configured to report such failures in a UL signaling message; exit the INACTIVE state; delete the WTRU context associated with an INACTIVE state (e.g., including new and/or old keys); and/or perform a connection establishment. The WTRU may provide a reason for connection establishment (e.g., security failure in an INACTIVE state). The WTRU may indicate the WTRU identity associated with the INACTIVE state in the connection establishment.

A new key derivation may be performed during UL data transmission. A WTRU may consider the key derivation to be successful, perhaps for example upon verifying the authenticity of the response to such UL transmission. A WTRU may consider the UL data transfer to be successful, perhaps for example upon verifying the authenticity of the response to such UL transmission. The WTRU may use the verified security context for further key derivation and/or data transmission in the INACTIVE and/or CONNECTED state.

Methods for determining a security level associated with DL data transmission may be provided. A WTRU may be configured to receive and/or process encrypted and/or integrity protected DL data while staying in INACTIVE state. A WTRU may determine a security level associated with the DL data transmission to decrypt and/or verify the authenticity of received DL data transmission in an INACTIVE state based on one or more preconfigured rules.

A WTRU may receive DL paging with DL data and/or may send a response indicating successful reception of paging message and/or successful reception of DL data and/or successful security processing of DL data in one or more UL response message. A WTRU may be configured with a predefined time/frequency relation between DL paging and DL data.

A WTRU may receive DL paging and/or may transmit a UL response before receiving DL data. A WTRU may perform security processing for the UL response. For example, a WTRU may integrity protect and/or cipher parts and/or whole paging response message with old and/or new keys.

For example, a WTRU may employ one or more methods where DL data may be considered as a DL paging message and/or a UL response may be construed as a UL paging response.

In order to process DL data, a WTRU may apply the same security algorithm that was used in the most recent successful data transmission with security applied. A WTRU may perform such determination irrespective of whether the current serving cell supports such security algorithm. A WTRU may perform such determination irrespective of the security level associated with the data for the transmission. A WTRU may perform such determination if such associated security level is equal or less than the security associated with such most recent successful data transmission with security applied.

For example, a WTRU in an INACTIVE state upon arrival of DL data and/or DL paging addressed for the WTRU may determine to derive a (e.g., new and/or previously unused) key under one or more circumstances, such as one or more of the following. The WTRU may use a stored key, perhaps for example if the current serving cell is same as the cell and/or cell group in which it last performed a successful transmission with security applied. WTRU may derive a new key, perhaps for example if the DL data and/or DL paging message includes a NCC. The WTRU may derive a new key, perhaps for example if the DL data is transmitted with a RRC message. The WTRU may derive a new key, perhaps for example if (e.g., explicitly) indicated in the DL data PDU (e.g., in a PDCP header and/or MAC CE/header). The WTRU may derive a new key, perhaps for example if the DL paging associated with the DL data transmission indicates that the DL data PDU is encrypted. The WTRU may derive a new key, perhaps for example if one or more of preconfigured freshness criterion/rules elapsed before the DL data transmission. The WTRU may be configured to derive a new key, perhaps for example by default for one or more, or all, DL transmissions in INACTIVE state.

For example, a WTRU in an INACTIVE state may derive a new key in one or more of the following ways, for example if the WTRU determines new key may be useful.

The WTRU may be configured with a NCC as a part of INACTIVE state context and/or the DL transmission might not include a NCC value. The WTRU may compare the NCC value associated with the INACTIVE state with the NCC value associated with the most recent successful transmission with security applied.

The WTRU may compare the NCC value associated with the INACTIVE state with the NCC value associated with DL data transmission.

The WTRU may compare the NCC value received in the DL transmission with the NCC value associated with the most recent successful transmission with security applied.

One or more rules may use a new key. The NCC values may be equal and/or may be considered to be equal. The NCC values may be equal. The WTRU may perform horizontal key derivation. (e.g., using current $K_{eNB}$ to derive the $K_{eNB*}$). The NCC values might not be equal. The WTRU may perform vertical key derivation (e.g., using NH to derive the new $K_{eNB*}$). The WTRU may derive the integrity and/or ciphering keys associated with the new key. The WTRU may use the stored key and/or the associated integrity and/or ciphering key.

For example, a WTRU in an INACTIVE state upon arrival of DL data may reset the PDCP COUNT value if a new key is generated. The WTRU may continue the PDCP COUNT value if an old/stored key is used.

For example, a WTRU may be configured to perform an integrity check on the received DL PDU using one or more of the following methods.

A WTRU may receive a DL PDU with MAC-I attached in a MAC CE and/or PDCP PDU and/or in a RRC message. The WTRU may calculate MAC-I using the same security context as UL, over the ASN.1 encoded portion of a local variable, and/or over the parts of received DL PDU that may include an WTRU Identity associated with an INACTIVE state and/or PCI, Cell ID, and/or cell group identity associated with the cell where the WTRU last performed a successful data transmission with security applied and/or PCI, Cell ID and/or cell group associated with the current serving cell and/or any other identity known at the WTRU and/or the network with COUNT, BEARER and/or DIRECTION set to binary ones and/or a value associated with current transmission and/or any other predefined value. The WTRU may consider the received response to be authentic, perhaps for example if the calculated MAC-I matches with the received MAC-I.

A WTRU may receive a DL PDU with the WTRU identity ciphered using the same security context as in the UL. The WTRU may consider the received DL PDU to be authentic if the decrypted WTRU Identity matches with the WTRU identity associated with INACTIVE state.

For example, the WTRU may be configured to decipher the data part of the PDCP PDU associated with the DL data, and/or the MAC-I if included.

A WTRU may employ a transmission of a response to a DL transmission. For example, perhaps upon receiving a DL PDU, a WTRU may be configured to indicate one or more of the following in the UL response: an acknowledgement indicating successful reception of DL paging message (e.g., if present/applicable); an acknowledgement indicating a successful reception of the DL data PDU; may (e.g., implicitly) indicate the reception of a paging message, perhaps for example, if an acknowledgement of DL data PDU is included in the UL response; a success and/or failure associated with the outcome of security processing of the received DL data; and/or a parameter/code (e.g., MAC-I) to prove the authenticity of the WTRU. A WTRU may (e.g., implicitly) indicate the success of security processing by inclusion of the MAC-I in the UL response message.

Upon verifying the integrity of the DL data, a WTRU may transmit a response on the UL including a MAC-I determined using methods described herein. A WTRU may derive a new key based on parameters received in the DL data, perhaps to determine the MAC-I included in the UL response message.

For example, the WTRU may transmit a UL response in a RRC message if DL data was multiplexed with a RRC message. For example, the WTRU may transmit a UL response in a MAC CE if DL data was not multiplexed with RRC message. For example, the WTRU may transmit a UL response in a RRC message if a new security key was derived for processing DL data.

Perhaps for example upon a security failure (e.g., an integrity check fail) associated with the DL data reception, a WTRU may perform one or more of the following, the WTRU may: delete the new key (perhaps for example, if derived) and/or fall back to the old key and/or security context. The WTRU may consider the current cell as barred and/or perform autonomous mobility to a different cell. The WTRU may be configured to report such failures in a UL signaling message; and/or exit the INACTIVE state, delete the WTRU context associated with INACTIVE state (e.g., including new and/or old keys) and/or perform a connection establishment. The WTRU may provide a reason for connection establishment (e.g., security failure in INACTIVE state). The WTRU may indicate the WTRU identity associated with the INACTIVE state in the connection establishment.

A WTRU may be configured to handle and/or recover from one or more unexpected security-related events. A WTRU may determine that a specific security level may (e.g., should) be applied. When the WTRU does not perform and/or complete one or more steps to enable the specific security level, the WTRU may initiate a recovery procedure.

For example, a WTRU might not have sufficient, valid, and/or up-to-date security parameters for performing a proper key derivation. For example, the WTRU may determine that one or more security parameters are insufficient, invalid, and/or outdated. The one or more security parameters may be associated with a key derivation. The WTRU may initiate a recovery procedure based on the determination that one or more security parameters are invalid, insufficient, and/or outdated. The WTRU may determine that data is being retransmitted using a different key but with the same count value (e.g., different keys may be used without re-initialing a COUNT value). The WTRU may determine that data is being retransmitted using a same key but with a different count value. The WTRU may determine that a count value has already been used for a bearer (e.g., a concerned bearer) since the last time the WTRU has performed a key update. The WTRU may determine that a count value has already been used for a bearer (e.g., a concerned bearer) since the last time the WTRU has performed a key derivation. The count value may be applicable to a transmission. The WTRU may determine that the count value has wrapped around the bearer since the last time the WTRU has performed a key update.

The WTRU may determine that the count value has wrapped around the bearer since the last time the WTRU has performed a key derivation. The WTRU may determine that one or more security parameters for a security level (e.g., a concerned security level) are no longer valid and/or up-to-date based on the reception of a system signature. The WTRU may determine that one or more security parameters for a security level (e.g., a concerned security level) are no longer valid and/or up-to-date based on a change in the applicable system signature. The WTRU may determine that one or more security parameters for a security level (e.g., a concerned security level) are no longer valid and/or up-to-date based on a change in the applicable area (e.g., tracking area and/or the likes). The WTRU may determine that one or more security parameters for a security level (e.g., a concerned security level) are no longer valid and/or up-to-date based on an indication in the System Information.

The WTRU may determine that one or more security parameters for a security level are no longer valid and/or up-to-date after (e.g., upon) expiration of a validity period. The WTRU may determine that one or more security parameters for a security level are no longer valid and/or up-to-date based on an indication (e.g., in a response) from the network. For example, the WTRU may determine that one or more security parameters for a security level are no longer valid and/or up-to-date based on reception of a random access response. For example, the WTRU may determine that one or more security parameters for a security level are no longer valid and/or up-to-date based on a reception of a response during the area update procedure.

For example, a recovery procedure may be a connection establishment procedure (e.g., that may use the activation of a new security context with the network) and/or a re-establishment procedure (e.g., that may enable the derivation of one or more new security keys).

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, terminal, base station, RNC, and/or any host computer.

What is claimed is:

1. A wireless transmit/receive unit (WTRU) comprising: a receiver, a transmitter, and a processor, wherein:
the receiver is configured, while in a radio resource control (RRC) Connected state, to:
receive, from a network entity, (i) an indication to the WTRU to transition to a RRC Inactive state and (ii) any one or more of an indication of (a) one or more logical channels (LCHs) or (b) one or more radio bearers that are configured for uplink (UL) transmission while the WTRU is in the RRC Inactive state;
the processor is configured to:
transition the WTRU from the RRC Connected state to the RRC Inactive state; and
the transmitter is configured to:
in accordance with (1) the WTRU being in the RRC Inactive state, (2) UL data associated with at least one of the indicated one or more LCHs or radio bearers being available for transmission, (3) a time associated with a time alignment timer having not elapsed, (4) an RSRP measurement being above a first threshold, and (5) the UL data satisfying a criterion that a total amount of the UL data is less than a second threshold, transmit the UL data, while remaining in the RRC Inactive state.

2. The WTRU of claim 1, wherein the transmitter is further configured to:
transmit an identity of the WTRU while in the RRC Inactive state.

3. The WTRU of claim 1, wherein the transmitter is further configured to:
on condition that the WTRU is in the RRC Inactive state, and UL data associated with a LCH not among the at least one of the indicated one or more LCHs is available for transmission, transmit an identity of the WTRU and an RRC message to request the WTRU to transition back to the RRC Connected state.

4. The WTRU of claim 1, wherein the transmitter is further configured to:
on condition that the WTRU is in the RRC Inactive state, and UL data associated with a radio bearer not among the at least one of the indicated one or more radio bearers is available for transmission, transmit an identity of the WTRU and an RRC message to request the WTRU to transition back to the RRC Connected state.

5. The WTRU of claim 1, wherein the transmitter is configured to:
on condition that the WTRU is in the RRC Inactive state, and UL data associated with the at least one of the indicated one or more LCHs or radio bearers is available for transmission, and the UL data is greater than the second threshold, transmit a RRC message to request the WTRU to transition back to the RRC Connected state.

6. The WTRU of claim 1, wherein the UL data is in a buffer of the WTRU when the UL data is available for transmission.

7. The WTRU of claim 1, wherein the UL data further satisfies a criterion that a size of an available UL grant can accommodate the total amount of the UL data.

8. The WTRU of claim 1, wherein the processor is further configured to monitor a control channel for a time duration after the UL data is transmitted in the RRC Inactive state.

9. The WTRU of claim 5, wherein the transmitter is further configured to:
transmit an identity of the WTRU while in the RRC Inactive state.

10. A method used by a wireless transmit/receive unit (WTRU) for wireless communications, the method comprising:
receiving, from a network entity, while in a radio resource control (RRC) Connected state, (i) an indication to the WTRU to transition to a RRC Inactive state and (ii) any one or more of an indication of (a) one or more logical channels (LCHs) or (b) one or more radio bearers that are configured for uplink (UL) transmission while the WTRU is in the RRC Inactive state;

transitioning the WTRU from the RRC Connected state to the RRC Inactive state; and in accordance with (1) the WTRU being in the RRC Inactive state, (2) UL data associated with at least one of the indicated one or more LCHs or radio bearers being available for transmission, (3) a time associated with a time alignment timer having not elapsed, (4) an RSRP measurement being above a first threshold, and (5) the UL data satisfying a criterion that a total amount of the UL data is less than a second threshold, transmitting the UL data while remaining in the RRC Inactive state.

11. The method of claim 10, further comprising:
transmitting an identity of the WTRU while in the RRC Inactive state.

12. The method of claim 10, further comprising:
on condition that the WTRU is in the RRC Inactive state, and UL data associated with a LCH not among the at least one of the indicated one or more LCHs is available for transmission, transmitting an identity of the WTRU and an RRC message to request the WTRU to transition back to the RRC Connected state.

13. The method of claim 10, further comprising:
on condition that the WTRU is in the RRC Inactive state, and UL data associated with a radio bearer not among the at least one of the indicated one or more radio bearers is available for transmission, transmitting an identity of the WTRU and an RRC message to request the WTRU to transition back to the RRC Connected state.

14. The method of claim 10, further comprising:
on condition that the UL data associated with the at least one of the indicated one or more LCHs or the indicated one or more radio bearers is available for transmission, and the UL data is greater than the second threshold, transmitting a RRC message to request the WTRU to transition back to the RRC Connected state.

15. The method of claim 10, wherein the UL data is in a buffer of the WTRU when the UL data is available for transmission.

16. The method of claim 10, wherein the UL data further satisfies a criterion that a size of an available UL grant can accommodate the total amount of the UL data.

17. The method of claim 10, further comprising:
monitoring of a control channel for a time duration after the UL data is transmitted in the RRC Inactive state.

18. The method of claim 14, further comprising:
transmitting an identity of the WTRU while in the RRC Inactive state.

* * * * *